United States Patent [19]
Taguchi et al.

[11] Patent Number: 5,497,657
[45] Date of Patent: Mar. 12, 1996

[54] TIRE AIR PRESSURE DETECTING DEVICE

[75] Inventors: Takeyasu Taguchi, Obu; Toshiharu Naito, Okazaki; Hiromi Tokuda, Nagoya; Yuuichi Inoue, Tokai; Shusaku Fujimoto, Okazaki; Kenji Fujiwara, Kariya, all of Japan

[73] Assignee: Nippondenso Co., Ltd., Kariya, Japan

[21] Appl. No.: 133,440

[22] Filed: Oct. 8, 1993

Related U.S. Application Data

[63] Continuation-in-part of Ser. No. 87,703, Jul. 9, 1993, abandoned.

[30] Foreign Application Priority Data

| Nov. 11, 1991 | [JP] | Japan | 3-294622 |
| Feb. 4, 1992 | [JP] | Japan | 4-18983 |
| Feb. 10, 1992 | [JP] | Japan | 4-57521 |
| Mar. 16, 1992 | [JP] | Japan | 4-55942 |
| Apr. 17, 1992 | [JP] | Japan | 4-125623 |
| Apr. 17, 1992 | [JP] | Japan | 4-125624 |
| Apr. 17, 1992 | [JP] | Japan | 4-125624 |
| Apr. 20, 1992 | [JP] | Japan | 4-128078 |
| Apr. 20, 1992 | [JP] | Japan | 4-128079 |
| May 30, 1992 | [JP] | Japan | 4-164186 |
| Oct. 8, 1992 | [JP] | Japan | 4-297969 |
| Oct. 9, 1992 | [JP] | Japan | 4-297843 |

[51] Int. Cl.$^6$ .......................... B60C 23/00; B60C 23/02
[52] U.S. Cl. .......................... 73/146.2; 340/448
[58] Field of Search .................. 73/146, 146.2, 73/146.5, 146.8; 340/445, 448

[56] References Cited

U.S. PATENT DOCUMENTS

| 3,815,407 | 6/1974 | Lavery . | |
| 4,254,398 | 3/1981 | Matsuda et al. | 73/146.8 |
| 4,300,118 | 11/1981 | Matsuda et al. | 340/448 |
| 4,574,267 | 3/1986 | Jones . | |
| 4,630,470 | 12/1986 | Brooke et al. | 73/146.2 |

FOREIGN PATENT DOCUMENTS

| 0083771 | 7/1983 | European Pat. Off. . |
| 2905931 | 8/1980 | Germany . |
| 3541494 | 5/1987 | Germany . |
| 3741818 | 5/1989 | Germany . |
| 59-85908 | 6/1984 | Japan . |
| 62-87909 | 6/1987 | Japan . |
| 62-149503 | 7/1987 | Japan . |
| 62-149502 | 7/1987 | Japan . |
| 63-138229 | 6/1988 | Japan . |
| 63-305011 | 12/1988 | Japan . |
| 296613 | 4/1990 | Japan . |
| 8803878 | 6/1988 | WIPO . |
| 9114586 | 10/1991 | WIPO . |

OTHER PUBLICATIONS

Patent Abstract of Japan, vol. 11, No. 380, Dec. 11, 1987.
Patent Abstract of Japan, vol. 10 No. 41, Feb. 18, 1986.
Patent Abstract of Japan, vol. 12 No. 227, Jun. 28, 1988.

*Primary Examiner*—Richard Chilcot
*Assistant Examiner*—William L. Oen
*Attorney, Agent, or Firm*—Cushman, Darby & Cushman

[57] ABSTRACT

It is an object of the present invention to detect a tire air pressure indirectly with high detection precision.

A tire air pressure detecting device includes a speed sensor for outputting a signal corresponding to a rotational speed of a tire, and an electronic control unit which inputs the signal from the speed sensor and performs predetermined arithmetic operations on that signal. The electronic control unit calculates a wheel speed based on the output signal of the speed sensor, performs a frequency analysis for the calculated vehicle speed, and derives a resonance frequency corresponding to the unsprung mass in the vertical and longitudinal directions. The tire air pressure is then detected based on this resonance frequency.

24 Claims, 69 Drawing Sheets

FIG.85
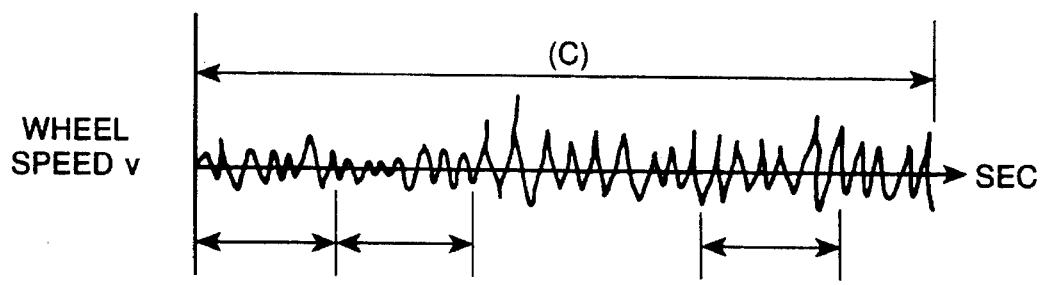
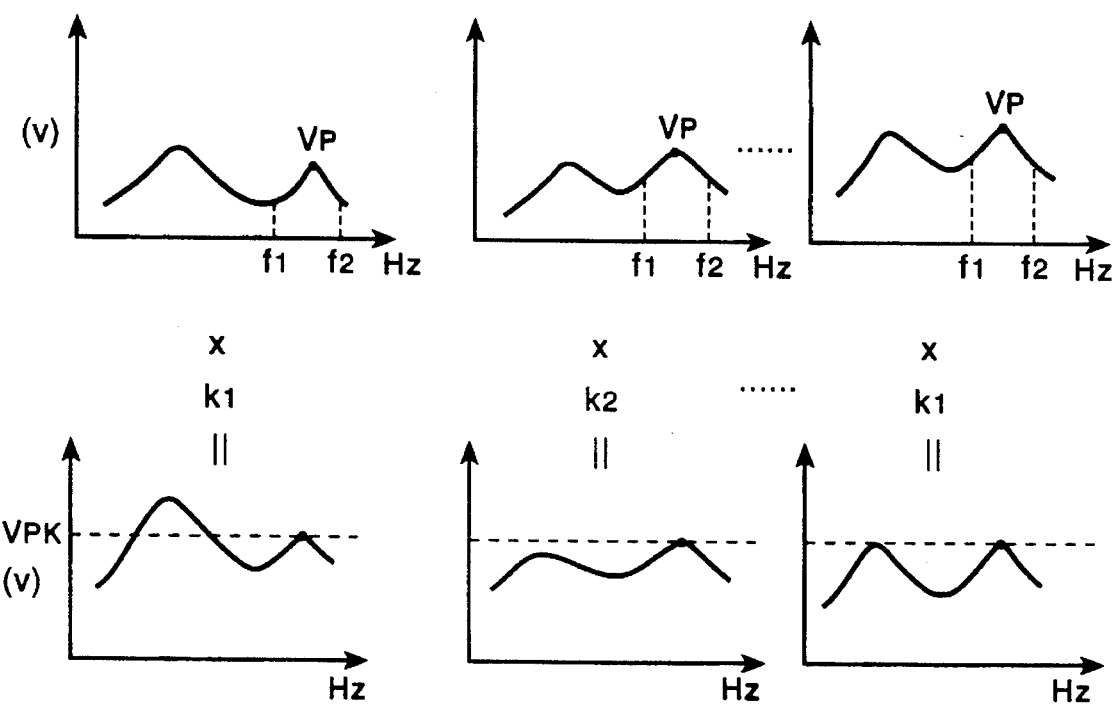

//5,497,657

TIRE AIR PRESSURE DETECTING DEVICE

This is a continuation-in-part application of application Ser. No. 08/087,703 filed Jul. 9, 1993 now abandoned, which, in turn, is based on PCT application PCT/JP92/01457 filed Nov. 10, 1992.

TECHNICAL FIELD

The present invention relates to an air pressure detecting device which detects an air pressure condition in a vehicular tire.

BACKGROUND ART

Conventionally, as a device for detecting an air pressure in a vehicular tire, there has been proposed a direct detection device which uses a pressure responsive member within the tire. However, because the pressure responsive member must be provided within the tire, this device results in complicated construction and high costs.

Therefore, there has been proposed a device for indirectly detecting the tire air pressure which is based on a detection signal from a wheel speed sensor. This detection signal represents a wheel speed for each wheel which is based on a relationship between the tire radius and the tire air pressure. For instance, when the tire radius becomes smaller, the tire air pressure is decreased.

The tire radius may be affected by differences in each tire which are due to tire wear or traveling conditions such as cornering, braking, starting or so forth. Furthermore, the radius of many tires does not change responsively to changes in the tire air pressure. For instance, when the tire pressure is decreased at a rate of 1 Kg/cm$^2$, the corresponding tire radius deformation magnitude may be only 1 mm. For these reasons, the method for indirectly detecting the tire air pressure based on the deformation magnitude in the tire radius, is problematic in that it cannot always provide accurate tire air pressure detection.

SUMMARY OF THE INVENTION

The present invention is presented to provide accurate tire air pressure detection in view of the problems set out above. Accordingly, it is an object of the present invention to provide a tire pressure detecting device which indirectly detects the tire air pressure with high detecting precision.

In order to accomplish the above-mentioned object, a tire air pressure detecting device, according to the present invention, detects the air pressure of a tire by generating, monitoring, and adjusting to changes in a signal which contains a vibration frequency component corresponding to the tire. Variations within a tire vibration frequency pattern are determined based on that signal. More specifically, when the tire air pressure varies, the associated tire spring constant also varies. Consequently, because the tire vibration frequency component pattern in the signal containing the tire vibration frequency component is varied through spring constant variation, the tire air pressure condition can be determined based on the variation of this pattern.

BRIEF DESCRIPTION OF THE DRAWINGS

FIG. 85 is an illustration of the gain adjustment in the twenty-ninth embodiment;

DETAILED DESCRIPTION OF THE PREFERRED EMBODIMENTS

The present invention will be explained hereinafter with reference to the drawings.

Figure 1:
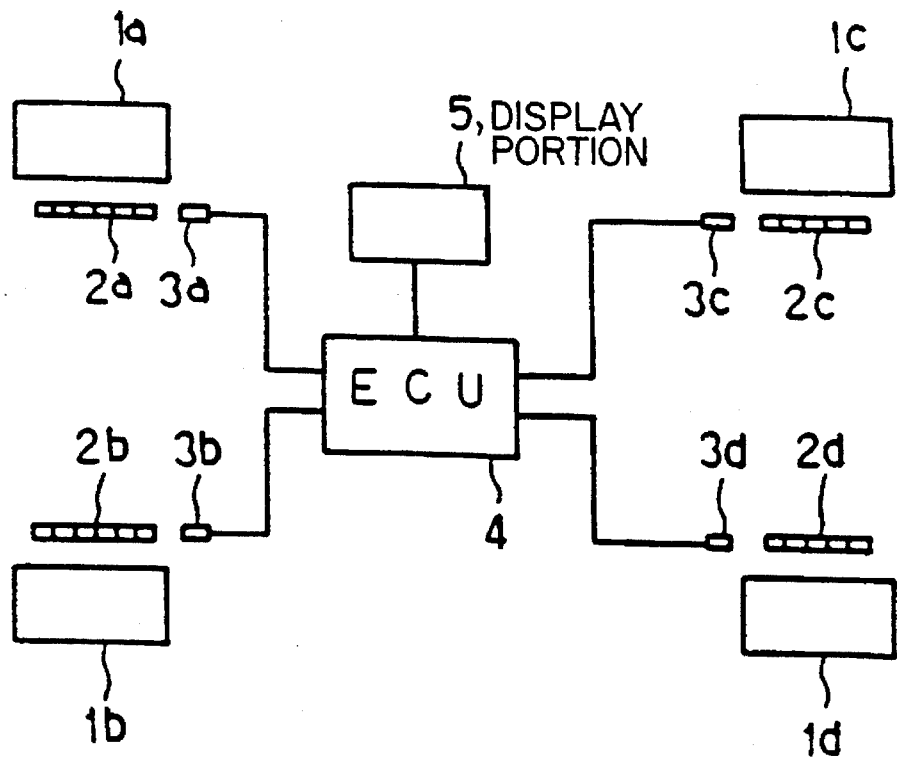
FIG. 1 is an illustration showing the orientation of the first embodiment of the invention.

As shown in the overall construction of the first embodiment illustrated by FIG. 1, wheel speed sensors are provided for each tire $1a \sim 1d$ of a vehicle. Each wheel speed sensor comprises gears $2a \sim 2d$ and pick-up coils $3a \sim 3d$. The gears $2a \sim 2d$ are coaxially mounted on a rotary shaft (not shown) of each tire $1a \sim 1d$, and are made from disc-shaped magnetic bodies. The pick-up coils $3a \sim 3d$ are positioned in close proximity to the gears $2a \sim 2d$ with a predetermined gap therebetween for outputting an alternating current (AC) signal which has a period corresponding to the rotational speed of both gears $2a \sim 2d$ and tires $1a \sim 1d$. The AC signal output from pick-up coils $3a \sim 3d$ is input into a known electronic control unit (ECU) 4 comprising a wave shaping circuit, ROM, RAM and so forth. A predetermined signal processing, which includes wave shaping, is performed. The result is input into display portion 5 which indicates the air pressure condition of each tire, $1a \sim 1d$, to the driver. The display portion 5 may either display the air pressure condition of each tire independently, or it may provide an alarm lamp which is turned on when the air pressure of a tire is lowered below a reference air pressure.

The tire air pressure detecting device will now be explained according to the present embodiment.

When a vehicle travels on a paved asphalt road, for example, the tire is subject to upward and downward (also known as vertical), forward and backward (also known as longitudinal) forces due to the fine undulation on the road surface. These cause the tire to vibrate, where forward and backward references will be referred to as longitudinal, and upward and downward references will be referred to as vertical throughout the remainder of the specification.

Figure 2:
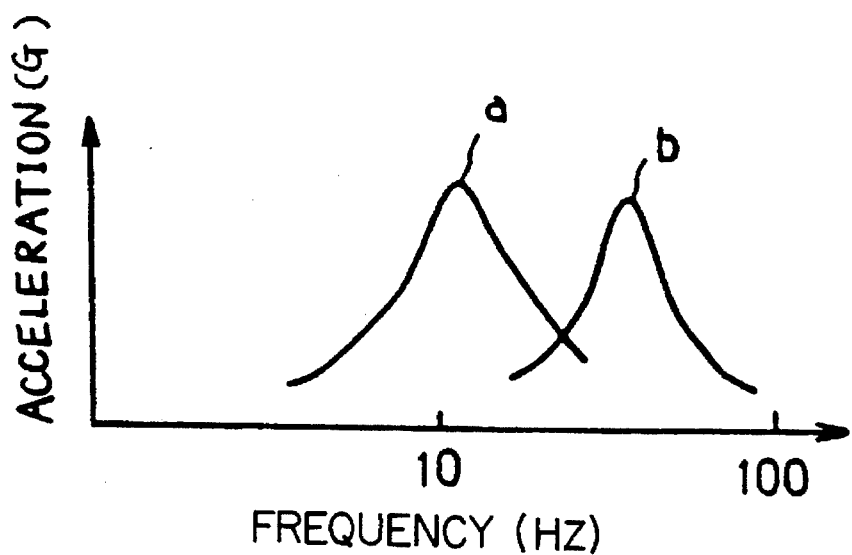
FIG. 2 is a characteristic chart showing a frequency characteristics of acceleration for an unsprung mass of a vehicle.

FIG. 2 shows a frequency characteristic of the acceleration of the unsprung mass of a vehicle during tire vibration. As shown in this figure, the frequency characteristic of the acceleration has peak values at two points. Point 'a' represents the resonance frequency of the unsprung mass of the vehicle in vertical directions, and the point 'b' represents the resonance frequency of the unsprung mass of the vehicle in the longitudinal directions.

Figure 3:
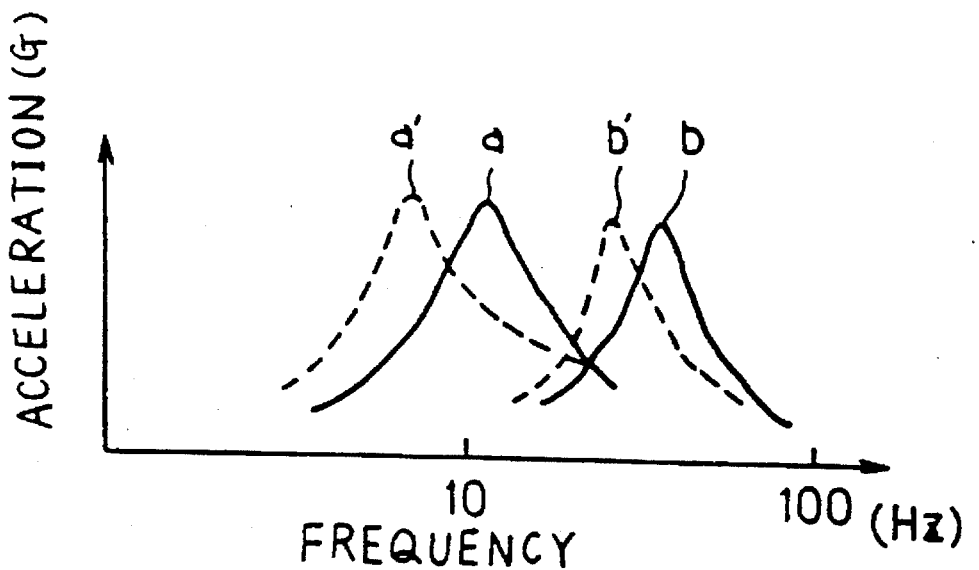
FIG. 3 is a characteristic chart showing variation of resonance frequencies of the unsprung mass of the vehicle due to variation of a tire air pressure in vertical and longitudinal directions.

Since the rubber portion of the tire has a spring constant, the vertical and longitudinal resonance frequencies are both varied with variations in tire air pressure. For instance, as shown in FIG. 3, when the tire air pressure is lowered, the spring constant of the rubber portion of the tire is also lowered. Consequently, the resonance frequencies are lowered in both the vertical and longitudinal directions. Accordingly, by extracting at least one of the resonance frequencies in those directions from the tire vibration frequency, the corresponding tire air pressure condition can be detected.

Figure 4:
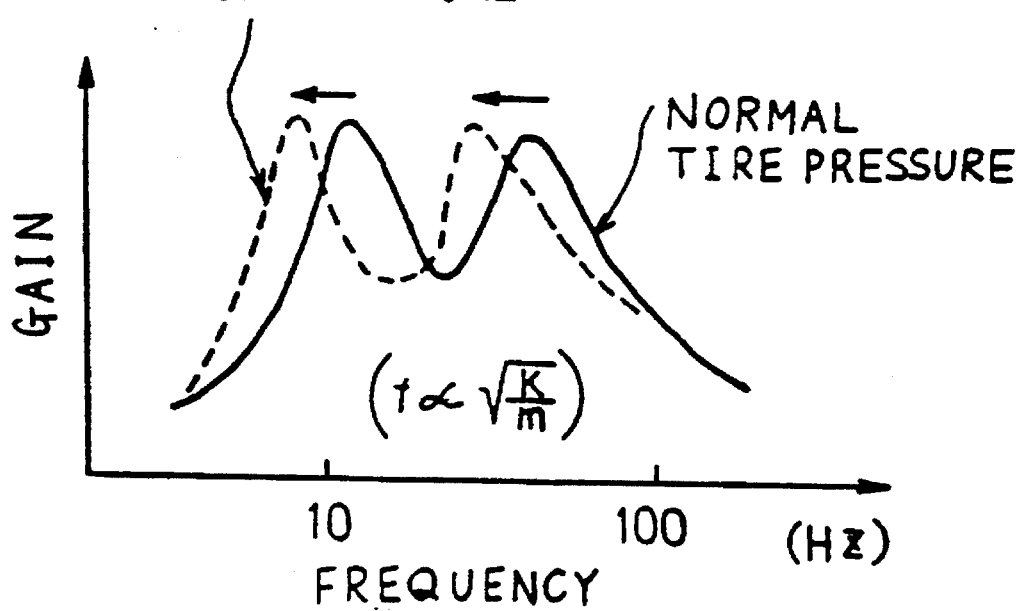
FIG. 4 is an illustration of the principle of detection of the tire air pressure in the first embodiment.

Therefore, in the present embodiment, the resonance frequencies corresponding to the vertical and longitudinal directions of the unsprung mass of the vehicle are extracted from a detection signal of the wheel speed sensor. This is because, as a result of extensive study made by the inventors, it has been found that a detection signal of a wheel speed sensor includes a frequency component of tire vibration. Namely, as a result of frequency analysis of the wheel speed sensor detection signal, it has been determined that two peak values exist as shown in FIG. 4, and that the two peak values decrease in magnitude when the tire air pressure is lowered.

In recent years, an increasing number of vehicles have been equipped with anti-skid control systems (ABS). Since these systems already have wheel speed sensors for each tire, tire air pressure within those tires can be detected without any additional sensors. It should be noted that because most resonance frequency variations are directly related to tire spring constant variations which are due to variations in tire air pressure, tire air pressure can be stably detected without concern for other tire factors, such as wearing and so forth.

Figure 10:
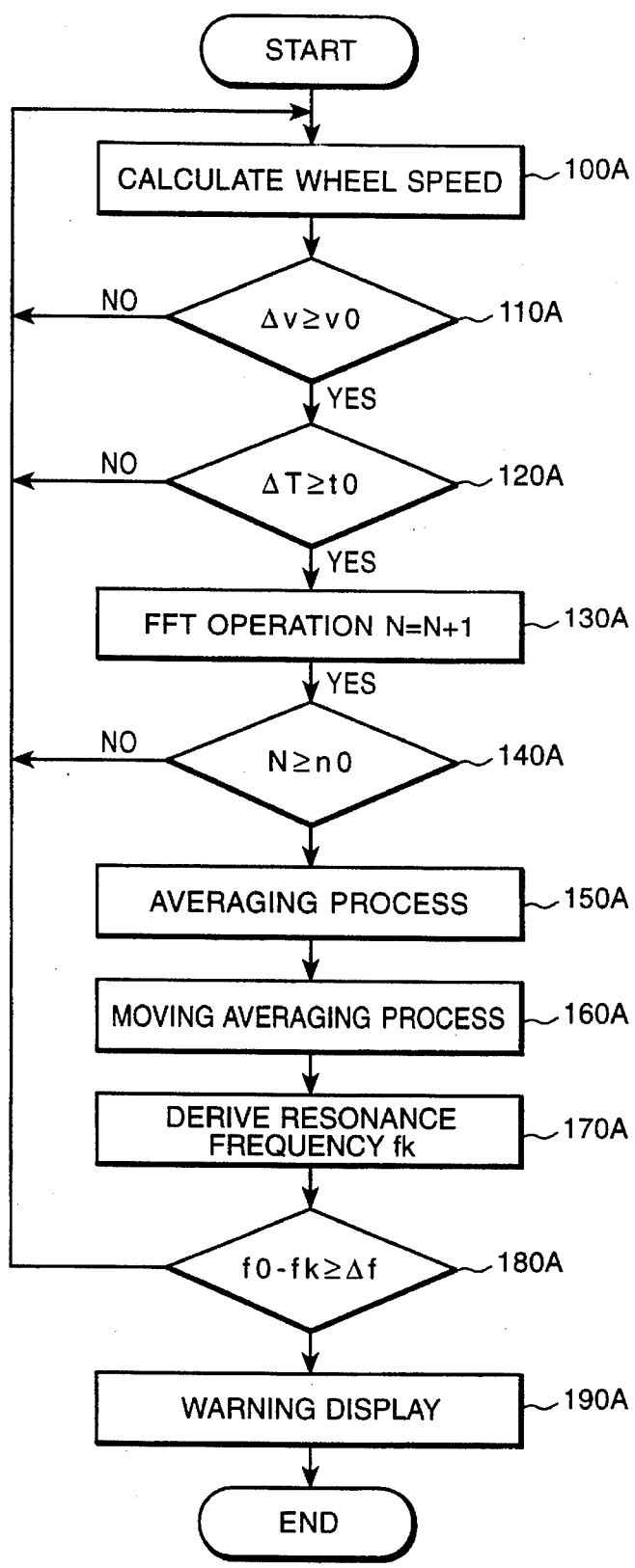
FIG. 10 is a flowchart showing a process of an electronic control unit of the first embodiment.

In FIG. 10, there is illustrated a flowchart which shows a process that is executed by ECU 4. Although ECU 4 performs similar processes for wheels $1a \sim 1d$, the flowchart of FIG. 10 shows the flow of the process with respect to a single wheel. Further, in the explanation given hereinafter, suffixes for respective reference numerals are omitted. In the flowchart shown in FIG. 10, there is illustrated a particular example in which an alarm is provided for the driver when the air pressure of the tire decreases to a level below, or equal to, a reference value.

Figure 5:
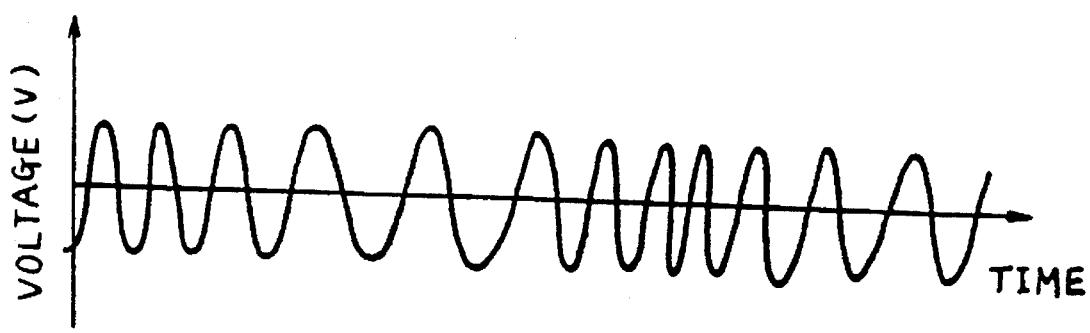
FIG. 5 is a chart showing a waveform of an output voltage of a wheel speed sensor.
Figure 6:
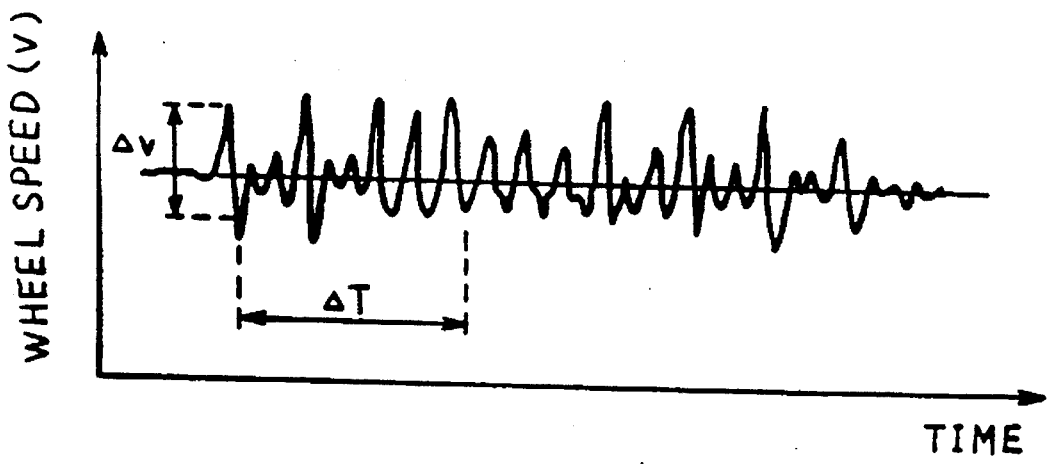
FIG. 6 is a chart showing a waveform showing a varying condition of a wheel speed v which is calculated on the basis of a detection signal from the wheel speed sensor.

In FIG. 10, at step 100A, wheel speed v is calculated by waving shaping the AC signal output from pick-up coil 3 (shown in FIG. 5) to form a pulse interval, and by dividing the pulse interval with the elapsed period therein. As shown in FIG. 6, wheel speed v normally contains a large number of high frequency components including the vibration frequency component of the tire. At step 110A, variation magnitude $\Delta v$ of calculated wheel speed v is compared to reference value $v_0$. If $\Delta v$ is greater than, or equal to $v_0$, the result is positive, and the process is advanced to step 120A. At step 120A, the period $\Delta T$, within which variation magnitude $\Delta v$ of wheel speed v is held in excess of the reference value $v_0$, is compared a predetermined period, $t_0$. A positive result is obtained when $\Delta T$ is greater than, or equal to, $t_0$.

The processes of the above-mentioned steps 110A and 120A determine whether the road surface permits detection of the tire air pressure according to the detection method of the present embodiment. Namely, in the present embodiment, detection of the tire air pressure is performed on the basis of a variation of the resonance frequency contained in the vibration frequency component of the tire. Therefore, unless the variation in wheel speed v is continuously greater than a certain magnitude, sufficient data for calculation of the above-mentioned resonance frequency cannot be obtained. It should be noted that in the comparison of step 120A, period $\Delta T$ corresponds to the period during which variation magnitude Δv of wheel speed v is equal to, or greater than, reference value $v_0$. Also, measurement of period ΔT is continued when variation magnitude Δv of wheel speed v is again equal to or greater than reference value $v_0$.

If steps 110A and 120A produce positive results, the process is advanced to step 130A. On the other hand, if either one of steps 110A and 120A are negative, the process returns to step 100A.

At step 130A, a frequency analyzing operation (FFT) is performed with respect to the calculated wheel speed so that the cycles of operation N are counted. One example of the result of FFT operation is shown in FIG. 7.

Figure 7:
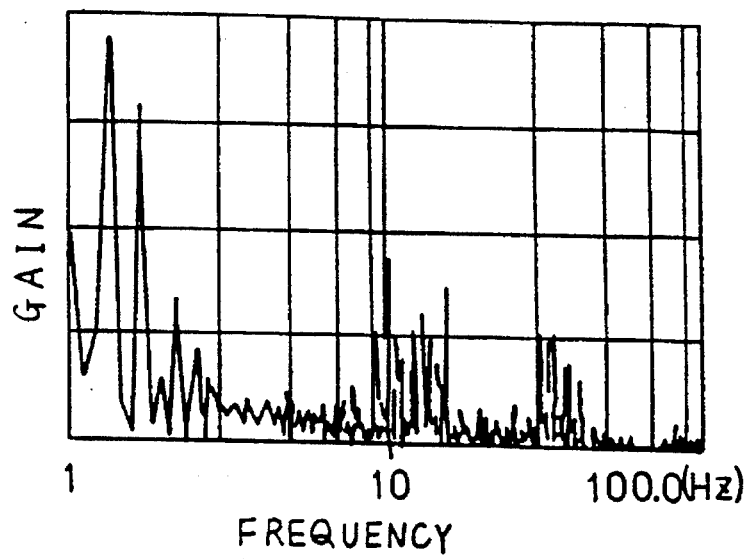
FIG. 7 is a characteristic chart showing a result of frequency analyzing operation with respect to wheel speed v of the waveform illustrated in FIG. 6.

As shown in FIG. 7, substantially random frequency characteristics are typically obtained when the FFT operation is performed with respect to the wheel speed obtained on normal roads. This is a result of irregularities in the configuration (size and height) of the small undulations on road surface. Accordingly, the frequency characteristics may vary for each wheel speed data.

The present embodiment is directed at suppressing variations of the frequency characteristics by deriving an average value which corresponds to the results of FFT operation over many operation cycles. At step 140A, the number of the FFT operation cycles, N, is compared to the predetermined number, $n_0$. If the number of operation cycles does not reach the predetermined number $n_0$ of cycles, the processes at steps 100A through 130A are again executed. On the other hand, when the number of operation cycles does reach the predetermined number $n_0$ of cycles, the process is advanced to step 150A to perform an averaging process.

Figure 8:
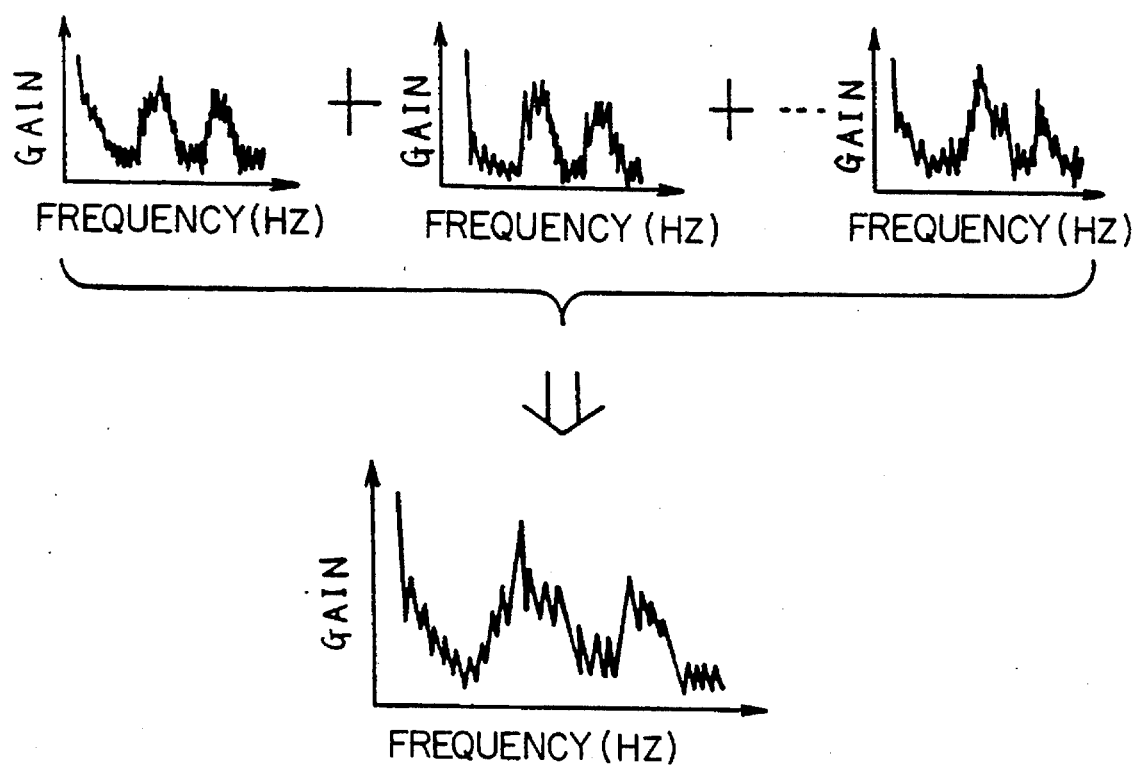
FIG. 8 is an illustration of an averaging process of the first embodiment.

As shown in FIG. 8, the averaging process is used to derive an average value of the respective FFT operation results, from which an average value of gains of respective frequency components are derived. Therefore, this averaging process is used to reduce the FFT operation results according to the road surface being traveled.

However, the above-mentioned averaging process may be problematic because of noise the maximum peaks exist in the vertical and longitudinal directions which do not always represent the resonance frequency gains. To overcome this potential problem, the moving averaging process set out below is performed at step 160A of the present embodiment in lieu of the foregoing averaging process.

The moving averaging process of step 160A is performed by deriving gain $Y_n$ at an nth frequency using the following equation:

$$Y_n = (Y_{n+1} + Y_{n-1})/2 \quad (1)$$

Figure 9:
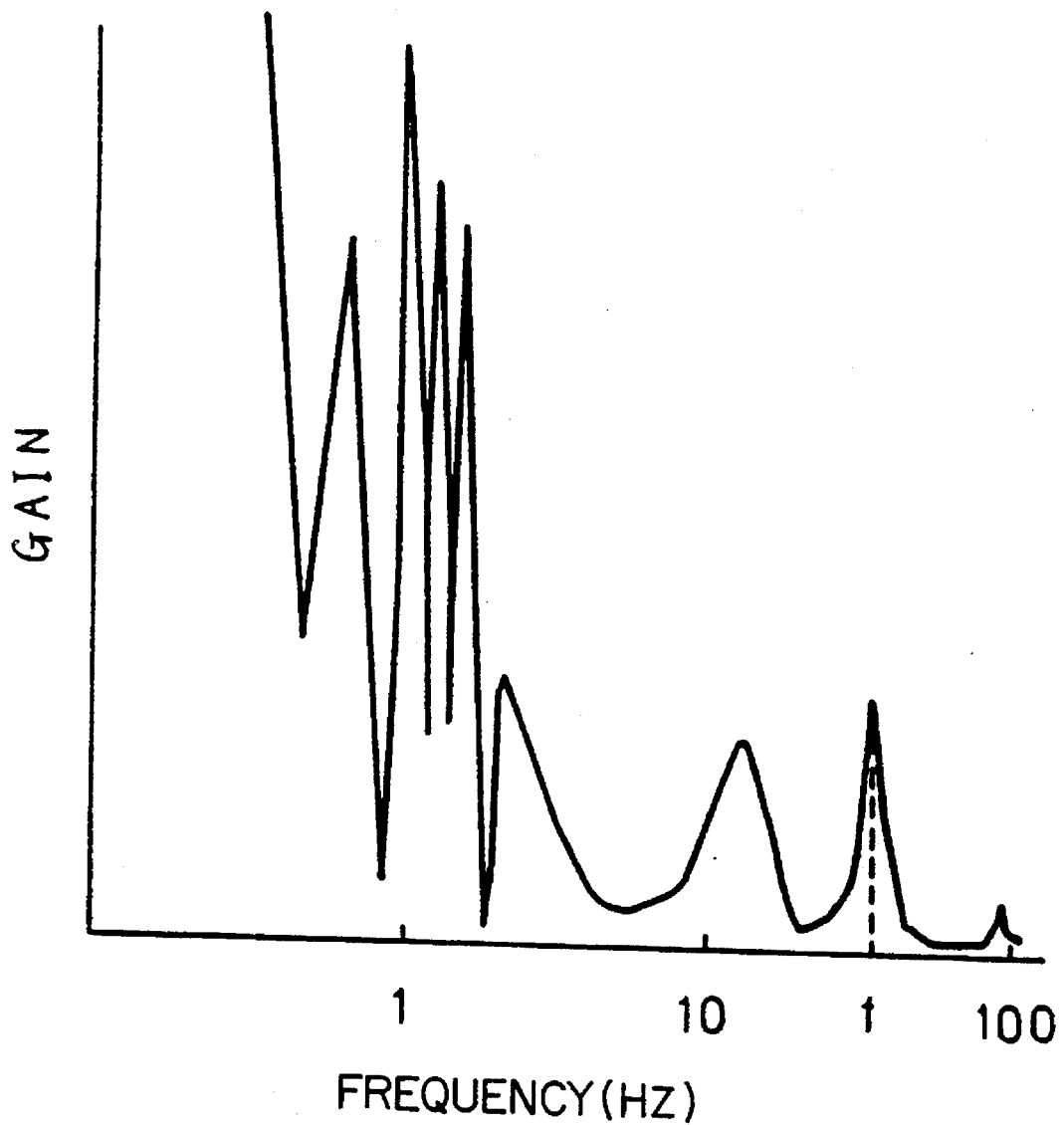
FIG. 9 is a characteristic chart showing a result of frequency analysis after a moving averaging process in the first embodiment.

Namely, in the moving averaging process, gain $Y_n$, corresponding to the nth frequency, is derived as an average value of the (n+1)th frequency, which is the result of operation in the preceding cycle, and the (n−1)th frequency which was previously derived. The result of the FFT operation is a smoothly varying waveform, and the results of the moving average process are shown in FIG. 9.

It should be noted that the wave shaping process is not specified in the foregoing moving averaging process. A low-pass filter can be employed to obtain the results of the FFT operation.

Alternatively, it is possible to perform a differentiating operation to determine the wheel speed v before performing the FFT operation at step 130A. Then, the FFT operation may be subsequently performed to determine the result of the differentiating operation.

At step 170A, based on the results of the FFT operation which are smoothed through the above-mentioned moving average process, resonance frequency $f_K$ of the unsprung mass in the longitudinal direction is derived. Then, at step 180A, lowering difference ($f_0-f_K$) is derived from initial frequency $f_0$ which is preliminarily set based on the normal tire air pressure. This lowering difference is compared with a predetermined difference Δf, where predetermined difference Δf corresponds to an allowable lowest value (e.g. 1.4 kg/m²) of the tire air pressure with reference to the initial frequency $f_0$. Accordingly, if determination is made at step 180A that lowering difference ($f_0-f_K$) is equal to, or greater than, predetermined difference Δf, the tire air pressure is regarded to be below the allowable lowest value. In this case, the process is advanced to step 190A and an alarm is displayed for the driver on display portion 5.

It should be noted that although in the foregoing embodiment, an example is illustrated to detect decreases is the tire air pressure based on resonance frequency in the longitudinal direction, it is also possible to detect the tire air pressure based on the resonance frequency in the vertical direction, or based on resonance frequencies in both the longitudinal and vertical directions.

It should also be noted that not all of the ECU processes performed in the following embodiments differentiate from those in the first embodiment. Similarly, some aspects of the construction and orientation of the components used in the following embodiments are generally common to previously discussed embodiments. Therefore, only those processes, components and orientations of the following embodiments which are different from previously discussed embodiment will be described.

In the second embodiment, abnormal tire air pressures are determined by directly comparing the air pressures of the tires with predetermined air pressure value $P_o$. Therefore, instead of using a frequency value for comparison, such as the lowering difference ($f_o-f_K$) of the first embodiment, this embodiment uses the derived tire air pressure value.

Figure 12:
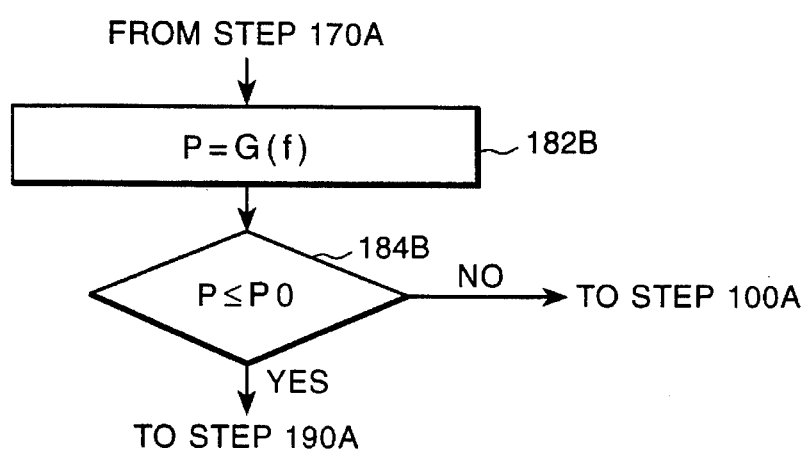
FIG. 12 is a flowchart showing the difference in process between the second embodiment and the first embodiment.

Accordingly, in the second embodiment, step 180A of the first embodiment is replaced by steps 182B and 184B of FIG. 12.

Figure 11:
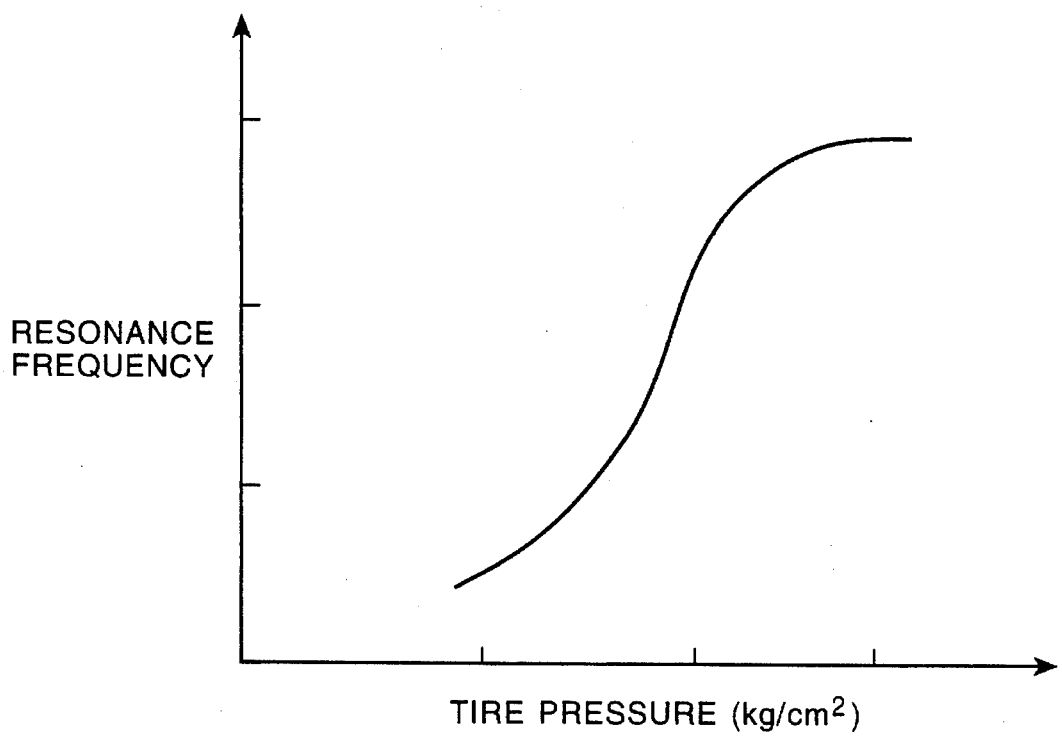
FIG. 11 is a characteristic chart showing a relationship between the tire air pressure and the resonance frequencies in the second embodiment of the invention.

In step 182B, a relationship between tire air pressure and resonance frequency (as shown in FIG. 11) is used to derive the actual tire air pressure from the detected resonance frequency. Then, at step 184B, the derived tire air pressure is compared with allowable minimum value $P_o$ of the preliminarily set tire air pressure.

When derived air pressure P is below allowable minimum value $P_o$, the process is advanced to step 190A where an alarming process is performed. Otherwise, the process is returned to step 100A where the detection process is repeated.

It should be noted that, in the second embodiment, the tire air pressure derived in step 182B may be directly displayed on the display portion.

In the third embodiment, acceleration sensor 11 is positioned on an unsprung mass member of the vehicle and is used to generate a signal containing the vibrational frequency component of the tire.

Figure 13:
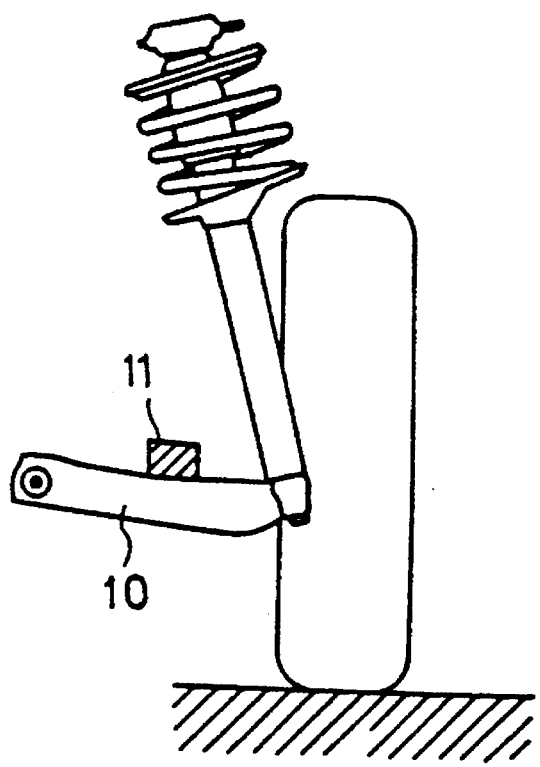
FIG. 13 is an illustration showing a construction of the third embodiment of the invention.
Figure 14:
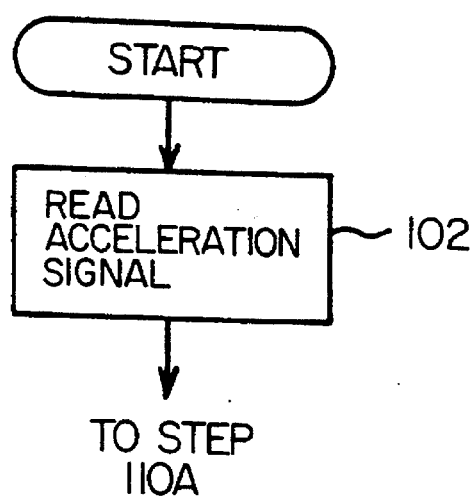
FIG. 14 is a flowchart showing the difference in process between the third embodiment and the first embodiment.

Accordingly, as shown in FIG. 13, the output generated by wheel speed sensor of the first embodiment is replaced with that of acceleration sensor 11 of the embodiment. Correspondingly, the process shown in FIG. 14 is executed in lieu of step 100A of the flowchart of FIG. 10. Specifically, step 102 discloses reading an acceleration signal from acceleration sensor 11 for further processing.

Because it is possible to derive the resonance frequencies in both the vertical direction and the longitudinal direction by performing an FFT operation on the acceleration of the unsprung mass of the vehicle, an FFT operation may be applied directly to the output signal produced by acceleration sensor 11.

Consequently, the third embodiment does not require the wave shaping operations which were needed to condition the output of the wheel speed sensors of the first embodiment.

In the fourth embodiment of the present invention, vehicle height sensors are used for detecting a relative displacement between the body of the vehicle (sprung mass member) and the tire (unsprung mass member). In this method, vehicle height sensor 20 is used to generate an output containing the tire vibration frequency component, thereby replacing the wheel speed sensors of the first embodiment.

Figure 15:
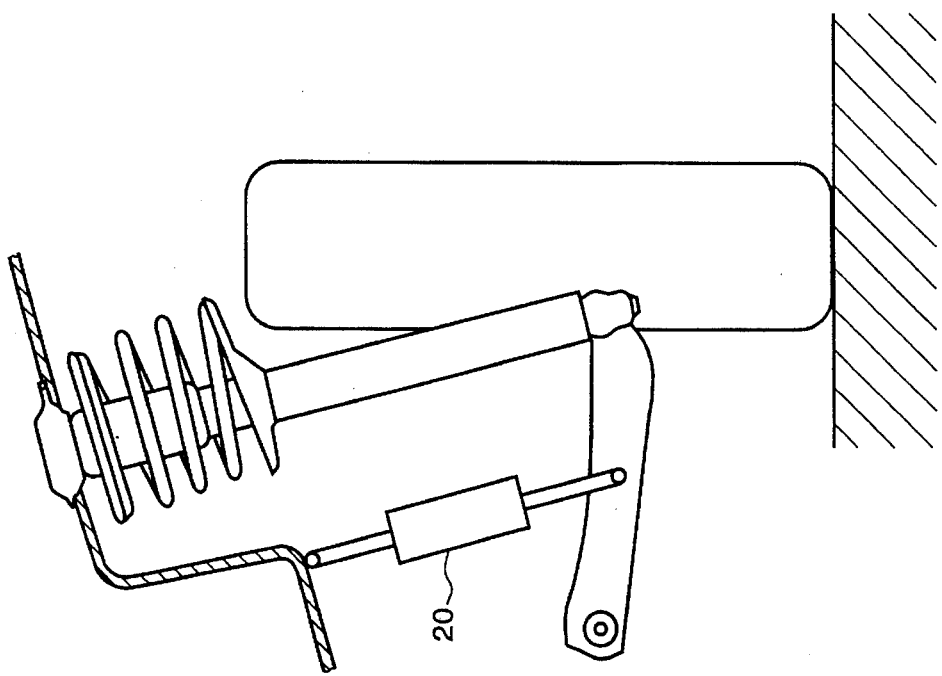
FIG. 15 is an illustration showing a construction of the fourth embodiment of the invention.

Specifically, the vehicle height sensor, shown in FIG. 15, generates an output detection signal which is subjected to an appropriate low-pass filtering process. The resultant signal then undergoes two differentiating processes to develop a signal which is representative of a relative acceleration between the vehicle body and the tire. Finally, this signal is produced as an output which is operated on in accordance with steps 110A–190A of FIG. 10.

In the fifth embodiment of the present invention, load sensor 30 replaces wheel speed sensor 20 to generate an output signal containing the tire vibration frequency component. Similar to height sensor 20 of the fourth embodiment, load sensor 30 detects, and generates, a signal corresponding to a load between the vehicle body (sprung mass member) and the tire (unsprung mass member).

Figure 16:
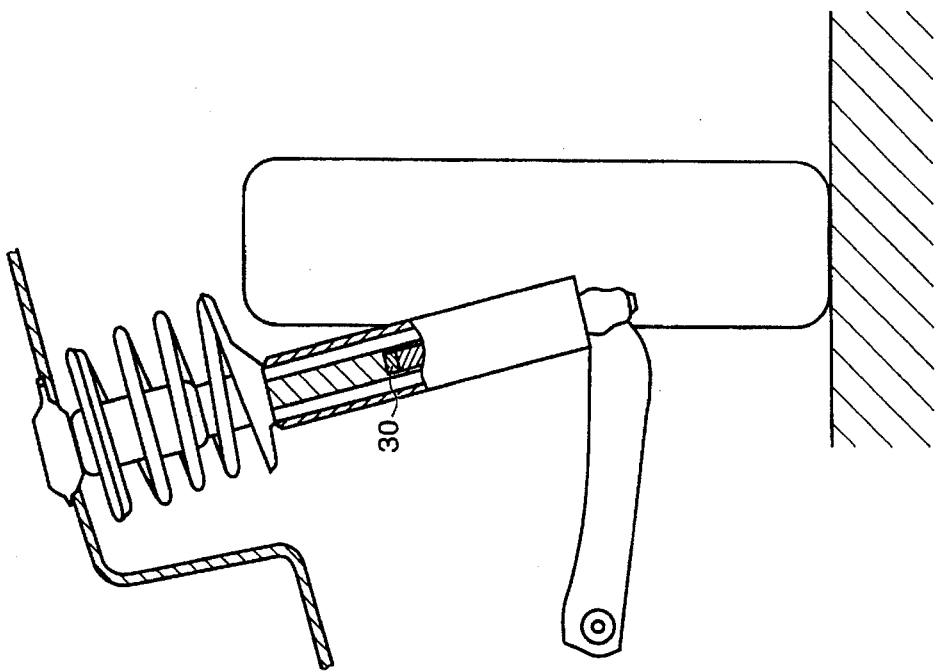
FIG. 16 is an illustration showing a construction of the fifth embodiment of the invention.

As shown in FIG. 16, load sensor 30 is disposed within a piston rod of a shock absorber, and it comprises a piezoelectric element for generating a signal whose amplitude corresponds to the applied load. Load sensor 30 then outputs a signal which corresponds to a damping force of the shock absorber. The tire air pressure can be detected by performing signal processing on this output signal, as performed by the foregoing third embodiment.

As a result of experiments made by the inventors, it has been found that signals which contain the actual tire vibration frequency component also contain noise corresponding to unbalances within the tire, where uneven wearing, standing wave phenomenon and so forth may cause such unbalances. Furthermore, this noise occurs at integral multiples of frequency which correspond to both the number of rotations of the wheel during a unit period of time, and the resonance frequency of the unsprung mass in the vertical or longitudinal directions.

Because the resonance frequency of the unsprung mass in the vertical or longitudinal direction is extracted from the signal containing the tire vibration frequency component, it is often erroneously derived in the above-mentioned embodiments. The accuracy of detection for tire frequency and air pressure, which are determined using the above-described embodiments, is therefore undeterminable. For this reason, improvements in the detection accuracy are sought.

The sixth to fifteenth embodiments are set forth to achieve improvements for the accurate detection of resonance frequency and tire air pressure by overcoming and compensating for the problem set forth above.

Figure 17:
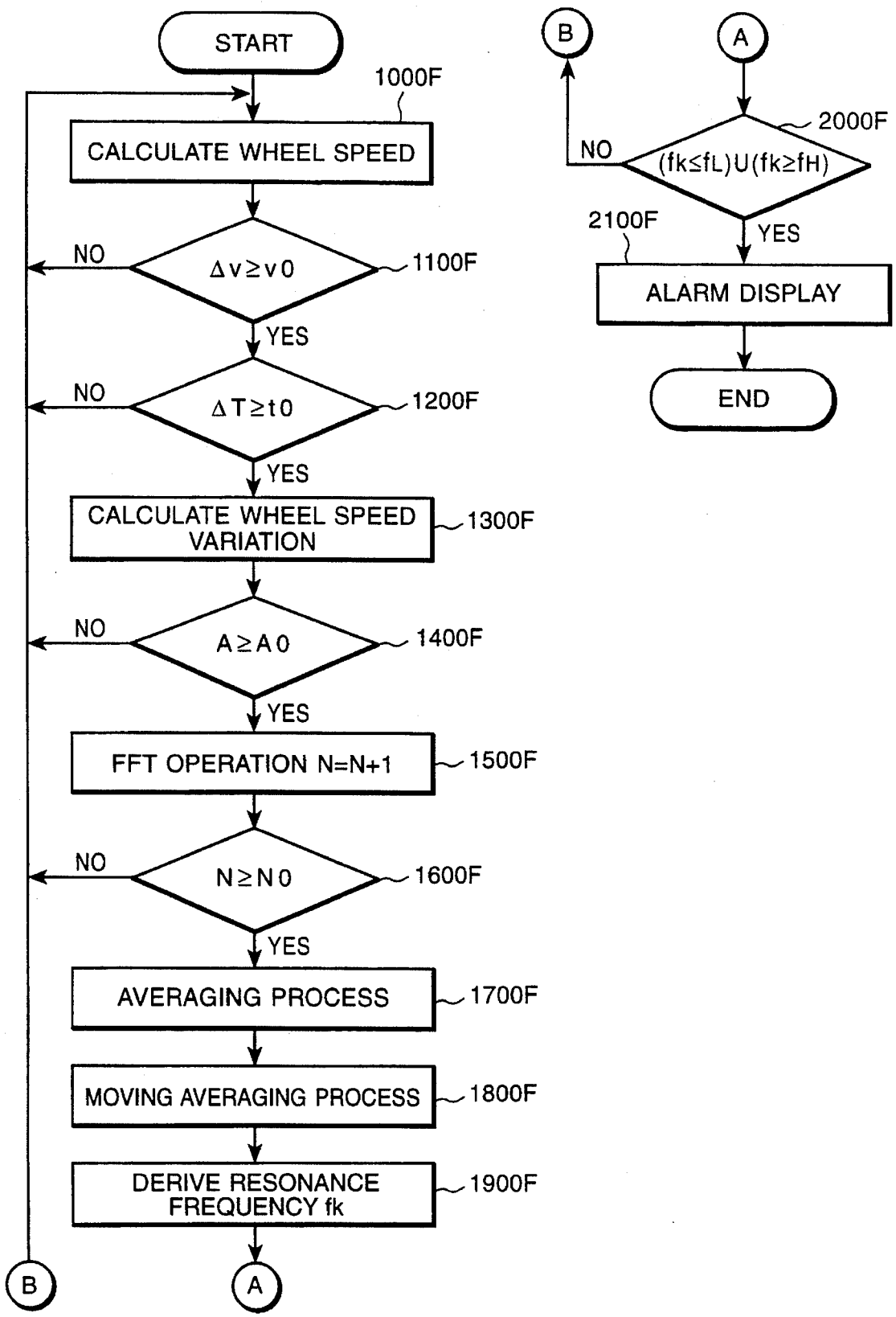
FIG. 17 is a flowchart showing a process of the electronic control unit of the sixth embodiment.

In the sixth embodiment, the processes shown in FIG. 17 are performed, where steps 1000F to 1200F are similar to steps 100A to 120A of the first embodiment.

Figure 18:
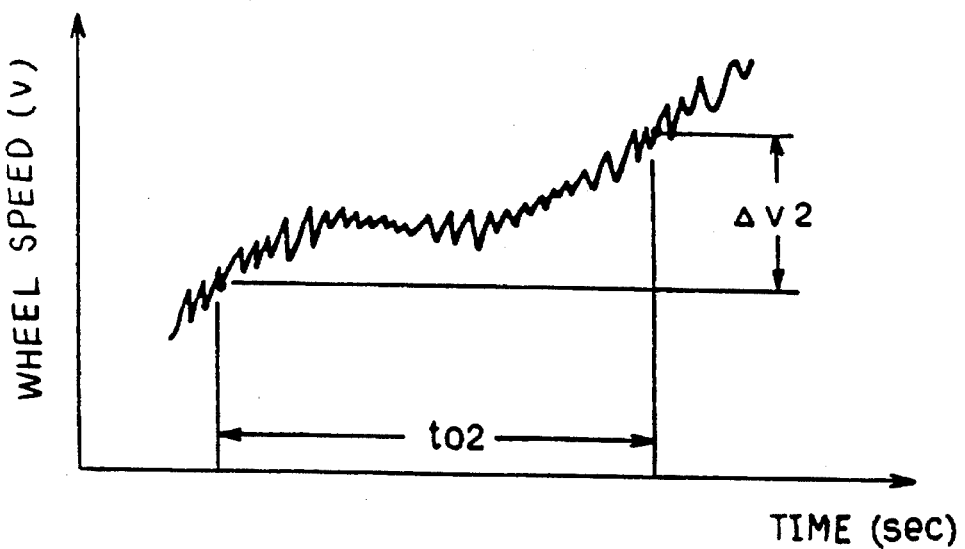
FIG. 18 is a timing chart showing a variation of the wheel speed.

However, at step 1300F of the sixth embodiment, wheel speed variation ratio A is derived on the basis of variation magnitude $\Delta v_2$, where $\Delta v_2$ is based on wheel speed v within the predetermined period $t_{02}$ ($t_{02} \gg \Delta T$), as shown in FIG. 18.

$$A = \Delta v_2 / t_{02} \quad (2)$$

Then, at step 1400F, wheel speed variation ratio A is compared with predetermined value $A_0$.

Figure 19:
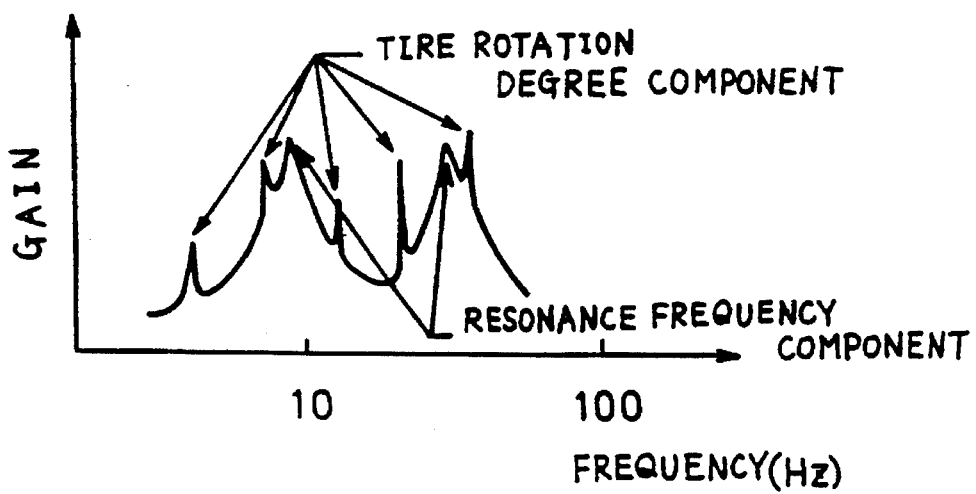
FIG. 19 is a characteristic chart illustrating peaks in gain which correspond to the integral multiples of wheel rotations per unit time.

This comparison is made to determine whether the tire air pressure is accurately detectable via the method of the present embodiment. Namely, when variation $\Delta v_2$ is small, the peaks (herein after referred to as "tire rotation degree components") appear at integral multiples of a frequency, where the frequency corresponds to the number of the wheel rotation per unit period, as shown in FIG. 19.

Therefore, unless wheel speed v varies above a certain magnitude within the predetermined period, the tire rotation degree component cannot be removed, and the tire air pressure cannot be accurately determined.

Accordingly, when wheel speed variation ratio A is determined to be smaller than predetermined value $A_0$, the process returns to step 1000F. However, if it is determined in step 1400F that wheel speed variation ratio A is equal to, or greater than, predetermined value $A_0$, then the process is advanced to steps 1500A–1900A where processes similar to those of the first embodiment are performed.

Then, at step 2000F, resonance frequency $f_K$ is compared with the upper and lower limit values $f_H$ and $f_L$ of the resonance frequency of the unsprung mass, where upper limit value $f_H$ and lower limit value $f_L$ are set corresponding to allowable upper and lower limit values of the tire air pressure (e.g. upper limit value is 2.5 kg/cm$^2$ and the lower limit value is 1.4 kg/cm$^2$). When resonance frequency $f_K$ is determined to be equal to, or greater than, upper limit value $f_H$, the tire air pressure is regarded as being in excess of the allowable upper value. When the resonance frequency $f_K$ is equal to, or lower than, lower limit value $f_L$, the tire air pressure is regarded to be lower than the allowable lower limit value. In either case, the process is advanced to step 2001F to perform alarming display to the driver via display portion 5.

Thus, in the sixth embodiment, the FFT operation is used to derive the tire vibrational frequency component only when wheel speed variation ratio A is equal to, or greater than, predetermined value $A_0$. For this reason, the tire rotation degree component, which appears while the speed variation ratio A is small, can be eliminated.

Figure 21:
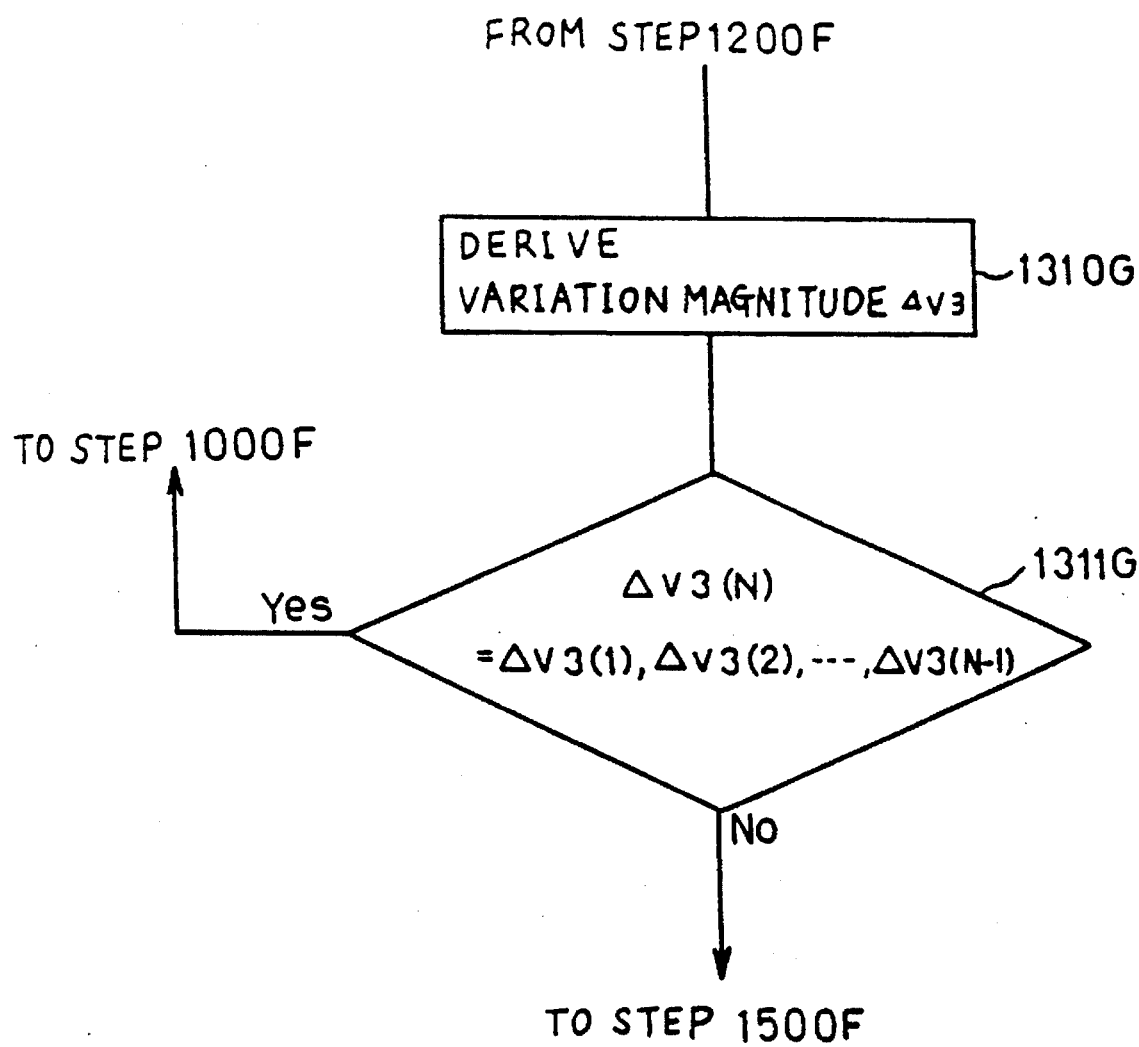
FIG. 21 is a flowchart illustrating a principle of the process of the seventh embodiment.

In the seventh embodiment, the processes of steps 1300F and 1400F of the sixth embodiment are replaced with steps 1310G and 1311G of FIG. 21.

At step 1310G, variation magnitude $\Delta v_3$ is derived based on wheel speed v within unit period $t_{03}$. At step 1311G, variation magnitude $\Delta v_{3(N)}$ is compared to each previous variation magnitude $\Delta v_3(1) \sim \Delta v_3(N-1)$, where variation magnitude $\Delta v_{3(N)}$ is derived in the Nth cycle of step 1310G, and where $\Delta v_3(1) \sim \Delta v_3(N-1)$ are derived in the 1st~ (N−1)th cycles of step 1310G.

If current variation magnitude $\Delta v_{3(N)}$ is equal to any of the previous variation magnitudes, the process is returned to step 1000F, and no FFT operation is performed.

However, when $\Delta v(N)$ is not equal to any of the previous variation magnitudes, the process is advanced to step 1500A to perform the FFT operation. It follows that the tire vibration frequency component, which is subject to the FFT operation, has unique wheel speed variation magnitudes $\Delta v_3$ corresponding to each cycle.

Figure 20:
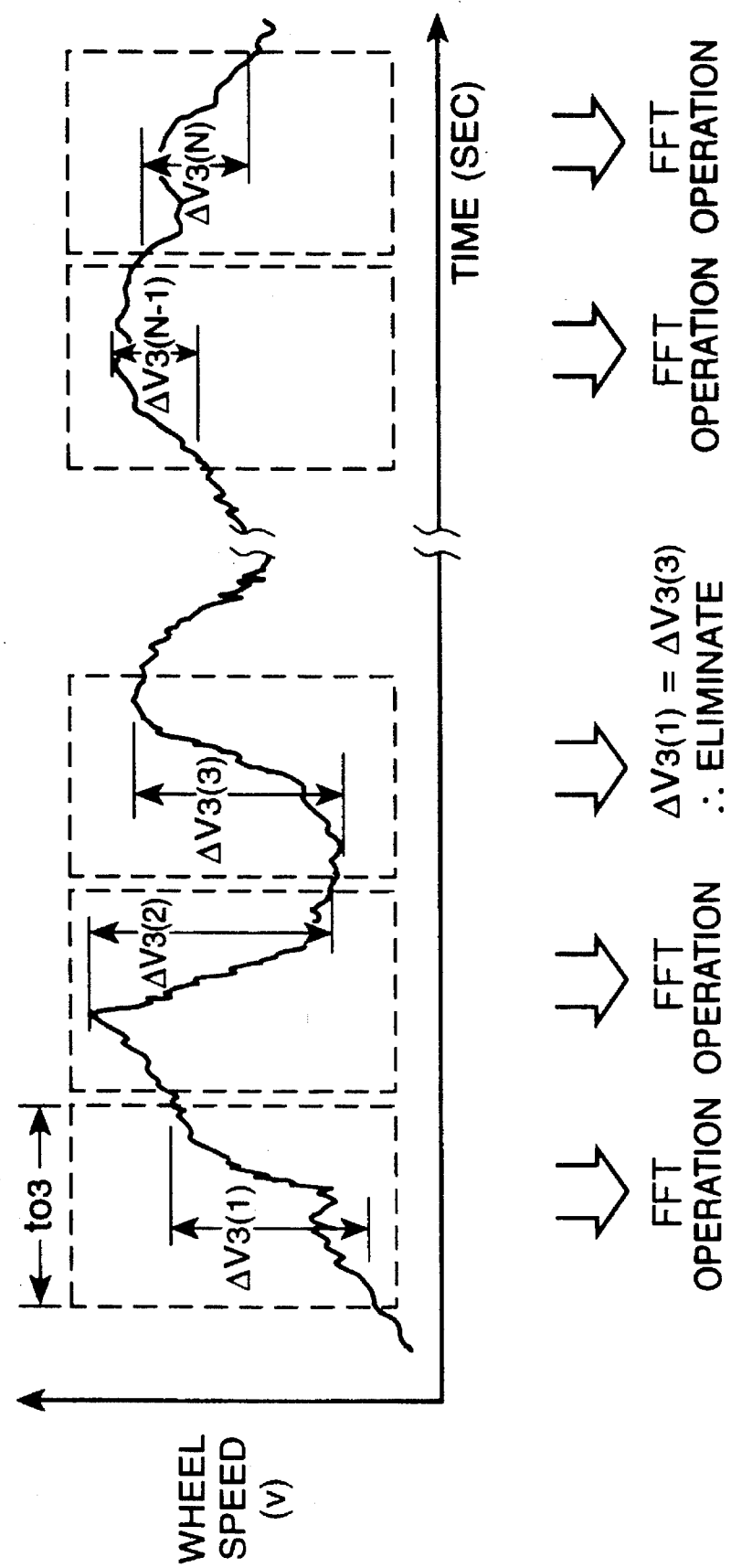
FIG. 20 is an illustration of the control performed by the seventh embodiment.

For example, as shown in FIG. 20, the variation magnitude calculated in the third cycle, $\Delta v_3(3)$, is equal to previously calculated variation magnitude from the first cycle, $\Delta v_3(1)$. Therefore, in the third cycle, $\Delta v_3(3)$ would be eliminated and the process would be returned to 1000F without further processing. Alternatively, in cycles where the variation magnitude is not equal to any previously calculated variation magnitudes, the processing is advanced to step 1500F so that an FFT operation and subsequent averaging processes may be performed.

Therefore, the peak appearing in the tire vibration frequency component maintains the resonance frequency component of the unsprung mass in longitudinal and vertical directions at the same frequency. However, tire rotation frequency components appear at different frequencies, are removed by the FFT operation performed in step 1500F and subsequent steps.

Thus, although the FFT operation is performed when the current variation magnitude is different from any of the previous variation magnitudes, another criteria exists. Namely, the FFT operation is performed only when average wheel speed $v_{C(N)}$ is different from any previous average wheel speed, $v_{c(1)} \sim v_{c(N-1)}$, where $v_{C(N)}$ is derived in during the Nth operation and $v_{c(1)} \sim v_{c(N-1)}$ are derived prior to the Nth operation.

In the foregoing sixth and seventh embodiments, the tire rotation degree component is processed before the FFT operation is performed.

Alternatively, in the eighth embodiment, the tire rotation degree component is processed after the FFT operation.

Figure 22:
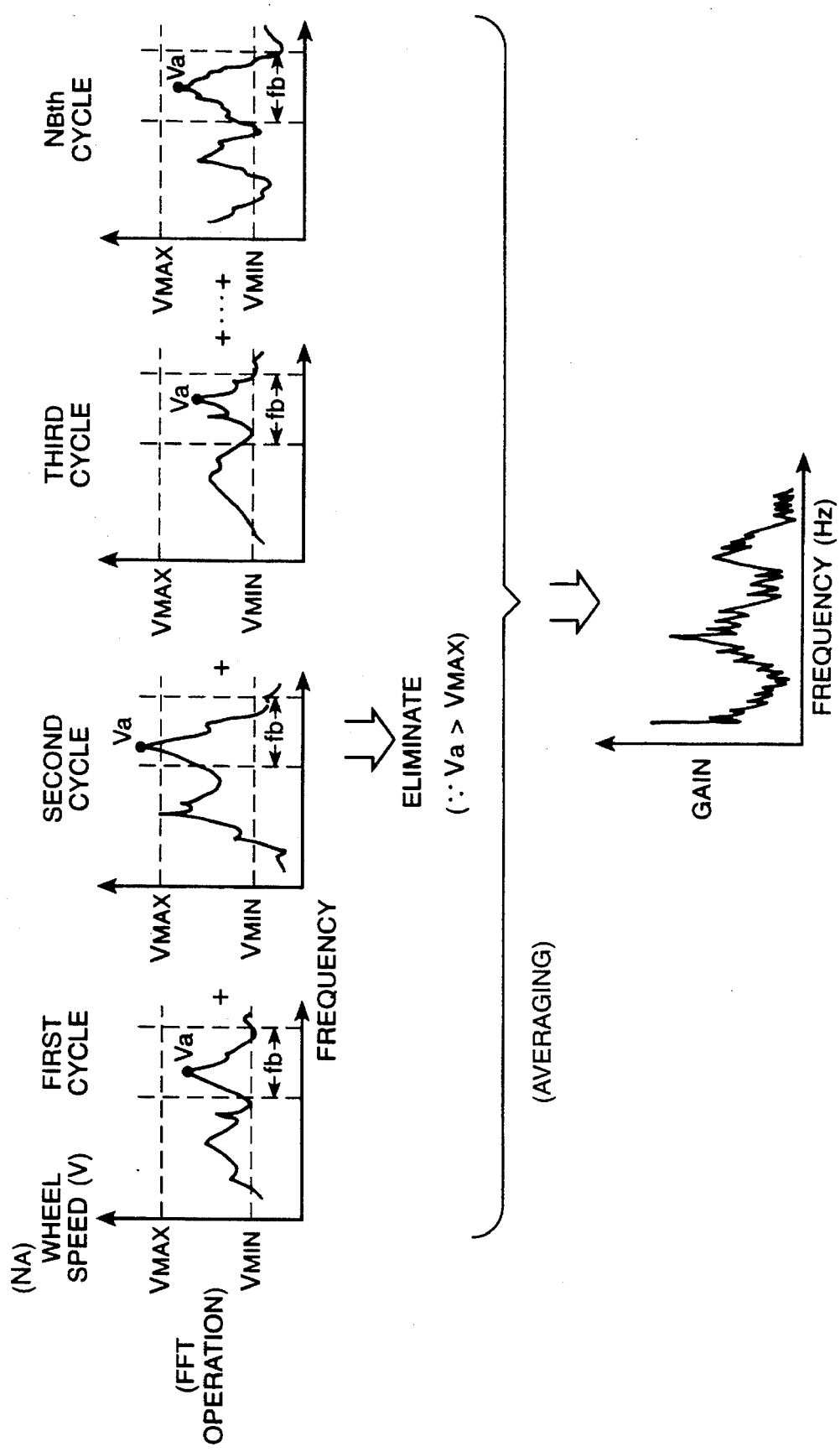
FIG. 22 is an illustration of the control performed by the eighth embodiment.

The gain of both the tire vibration frequency component and the tire rotation degree component are affected greatly by road surface condition. For instance, as shown in FIG. 22, when the vehicle travels on a rough or unpaved road, the gain of both the tire vibration frequency component and the tire rotation degree component become large.

Therefore, in the eighth embodiment, the FFT operation is used to derive tire vibration frequency components for each cycle. Then, the averaging process is performed only on those frequency cycles which have a maximum gain, $v_a$, which falls within a predetermined range $v_{Max} \sim v_{MIN}$. Because only consistent FFT operation results are considered by the averaging process, the influence of the tire rotation degree component after the averaging process becomes small.

Figure 23:
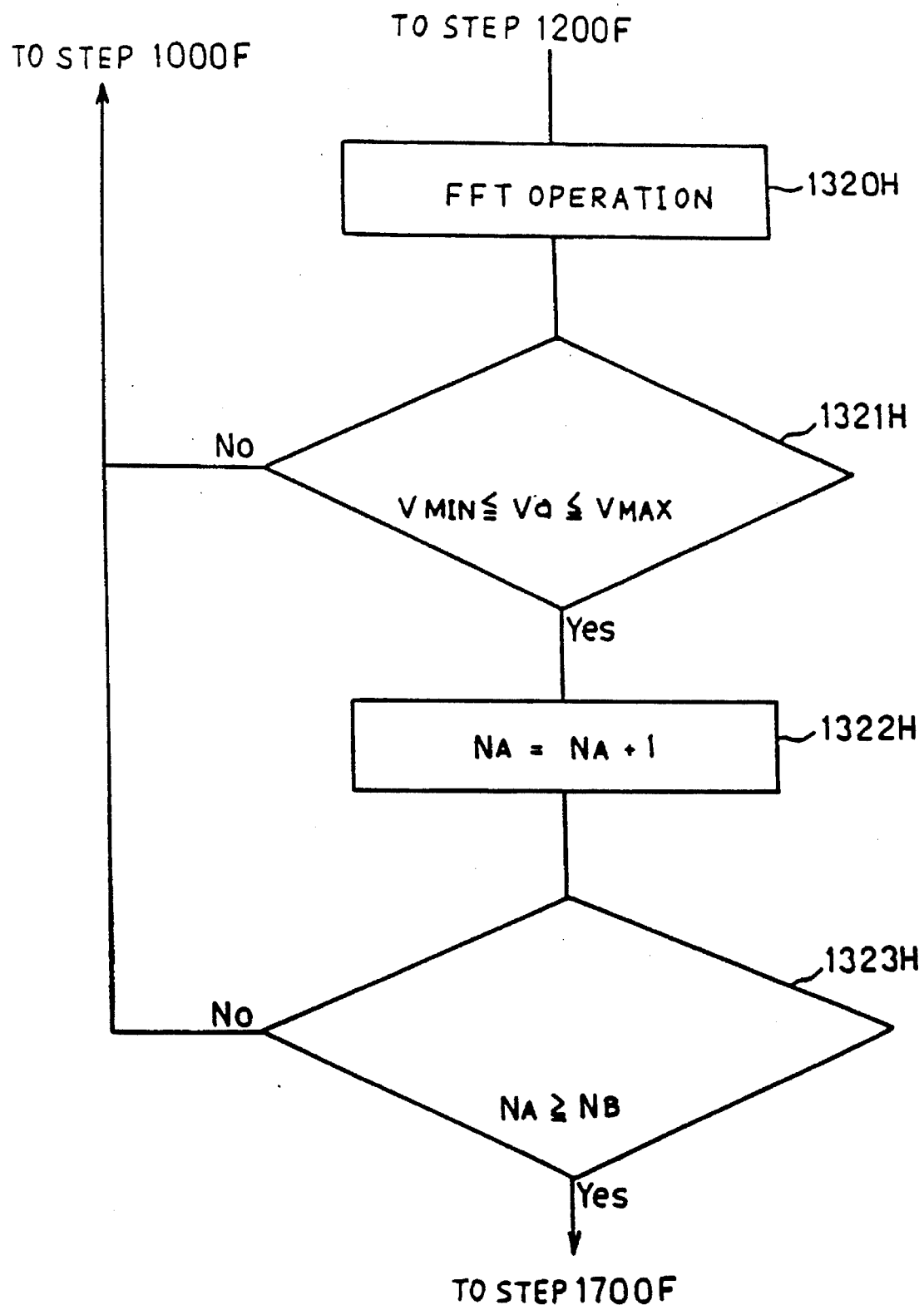
FIG. 23 is a flowchart illustrating a principle of the process of the eighth embodiment.

Accordingly, in the eighth embodiment, steps 1300F~1600F of the sixth embodiment are replaced by steps 1320H–1323H which are illustrated in FIG. 23.

At step 1320H, an FFT operation is performed to derive the tire vibration frequency components. Then, at step 1321H, maximum gain from among the derived tire vibration frequency components, $v_a$, is compared to upper and lower limit values $v_{MAX}$ and $v_{MIN}$. If $v_a$ is not between these limits, it is not used for averaging and the process returns to step 1000F. However, if $v_a$ is between these limits, it will be used for averaging and the process is advanced to step 1322H where the number of values to be averaged, $N_A$, is incremented.

Then, at step 1323H, the number of values to be averaged, $N_A$, is compared to predetermined value $N_B$. If $N_A$ is less than $N_B$, the process is returned to step 1000F so that another FFT operation may be performed. However, when $N_A$ is greater than, or equal to, predetermined value $N_B$, the process is advanced to step 1700F for continued processing.

Thus, data corresponding to travel over rough roads is removed so that the influence of the tire rotation degree component, which has large peaks, can be suppressed.

The ninth embodiment features removing excessively large (or small) tire rotation degree components using a ratio, $K_i$, between maximum gain $v_a$ and predetermined gain $v_0$, where $v_a$ corresponds to predetermined frequency band $f_b$.

Figure 25:
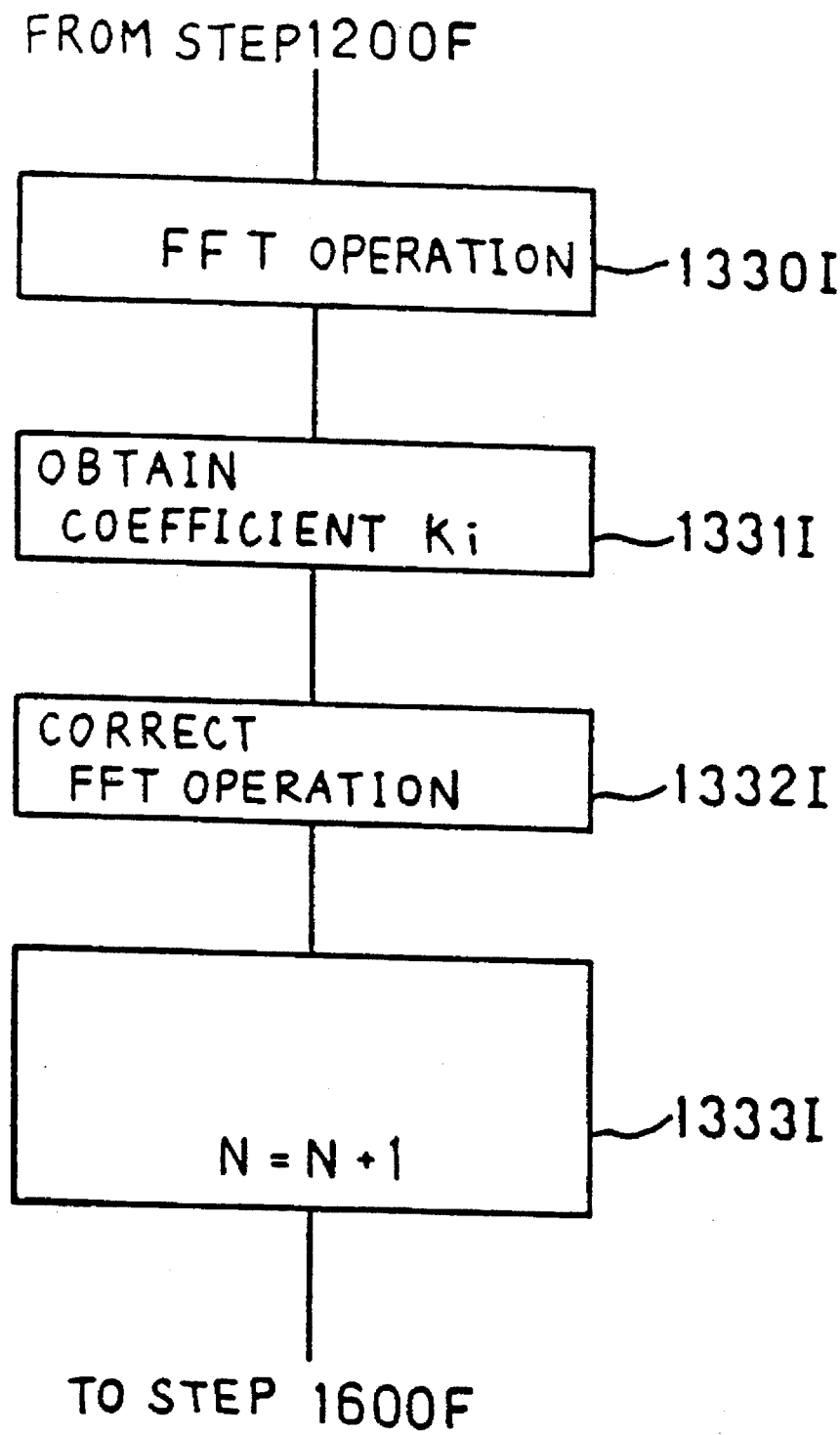
FIG. 25 is a flowchart illustrating a principle of the process of the ninth embodiment.

Namely, in the ninth embodiment, steps 1300F~1500F of the sixth embodiment are replaced with steps 1330I~1333I of FIG. 25.

In this embodiment, the FFT operation is performed at step 1330I. At step 1331I, a coefficient, $K_i$, is obtained as the ratio of maximum gain value $v_a$ to predetermined gain $v_0$, based on the FFT operation result from step 1330I, where $$K_i = v_0/v_a \tag{3}$$

At step 1332I, the FFT operation results are corrected by multiplying the tire vibration frequency component derived in the FFT operation with coefficient $K_i$. After the FFT operation is completed, the counter for the number of FFT operations performed is incremented at step 1333I, and the process is advanced to step 1600F.

Figure 24:
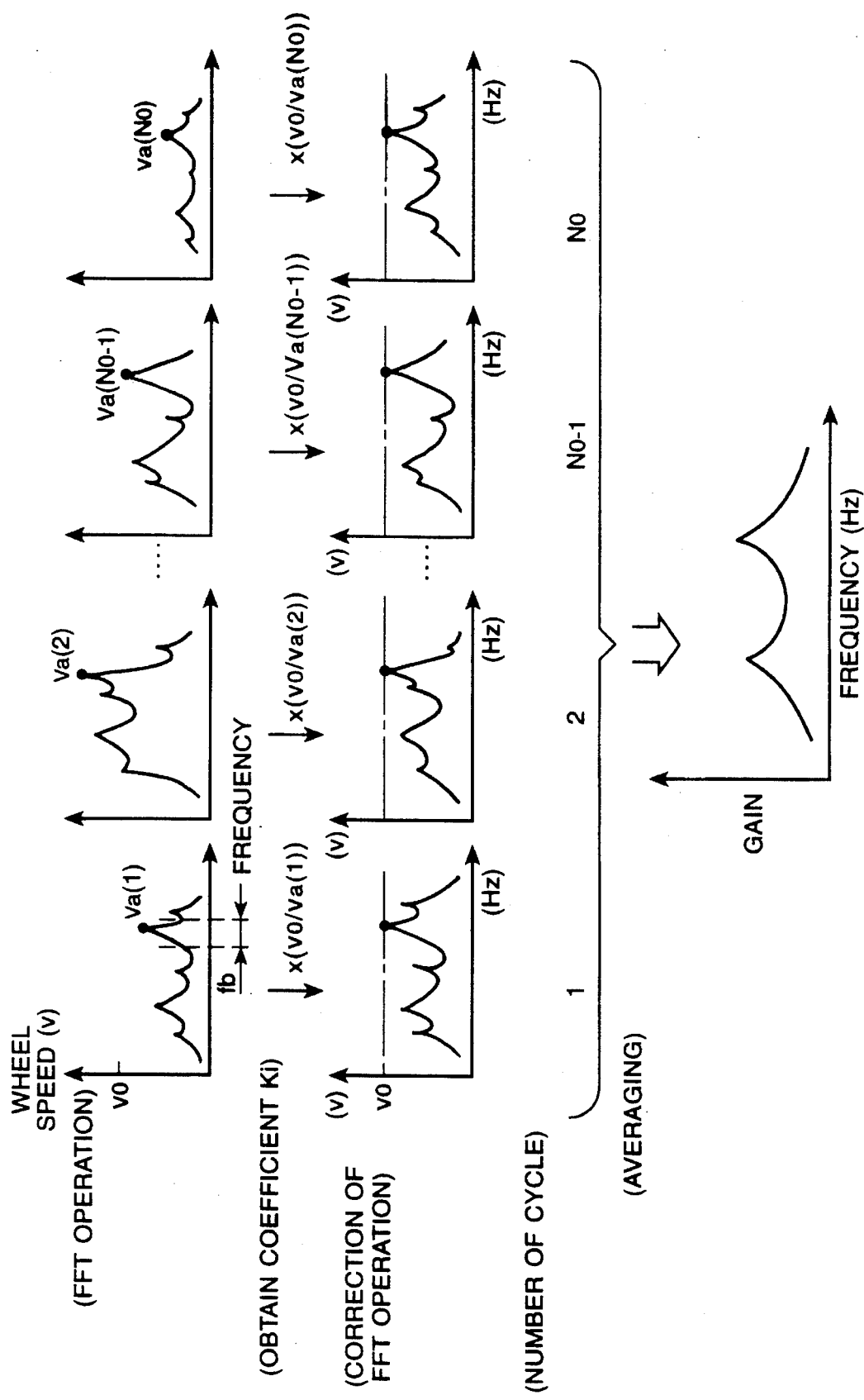
FIG. 24 is an illustration of the control performed by the ninth embodiment.

As shown in FIG. 24, this process has the effect of normalizing the gains by $v_0$ so that no excessively large (or small) data remains.

The tenth embodiment is directed at removing the tire rotation degree component directly from the FFT operation result. Similar to the sixth embodiment, the tenth embodiment utilizes the fact that the tire rotation degree component is necessarily present within the frequency range which corresponds to the wheel speed variation range, or to an integral multiple thereof.

Figure 26:
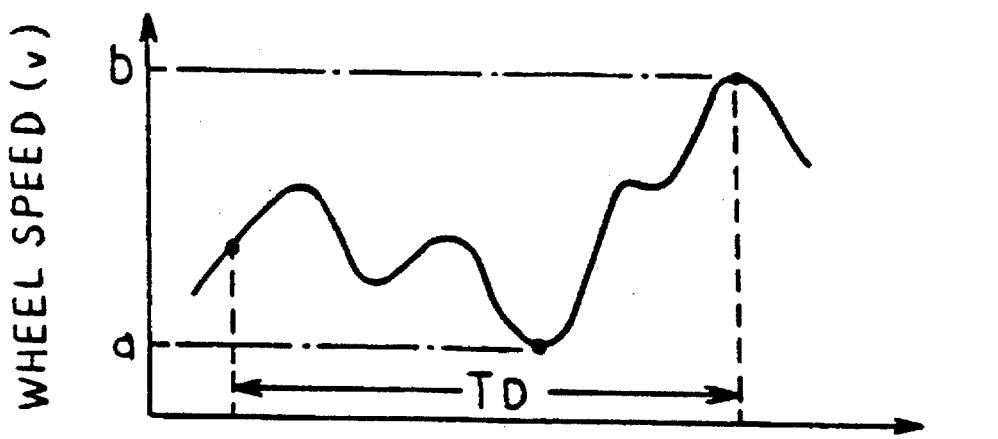
FIGS. 26(a), 26(b) and 26(c) are illustrations of the principle of the process the tenth embodiment.
Figure 26:
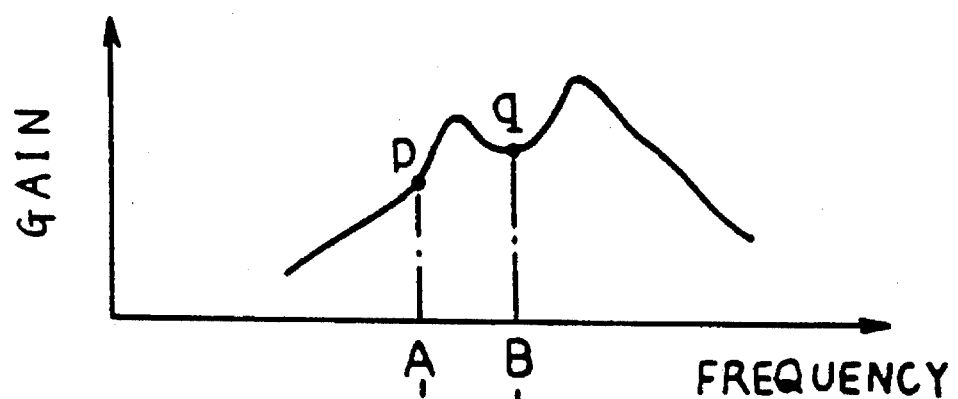
Figure 26:
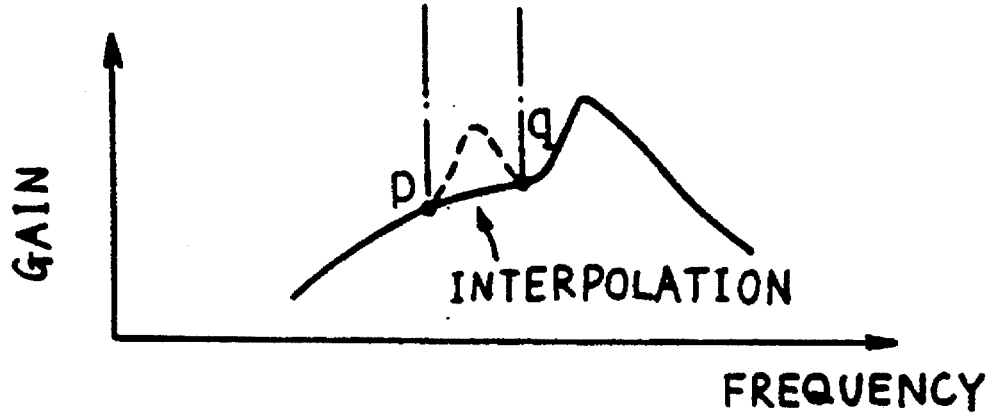

For example, in FIG. 26(a), the wheel speed variation range within a certain period $T_D$ falls within between minimum value a and maximum value b. Therefore, deriving frequencies A and B, corresponding to wheel speeds a and b of FIG. 26(a), requires estimation of gain between the corresponding frequency values, p and q. Thus, the portion between p and q, illustrated by the solid line of FIG. 26(b), is replaced with a straight line, illustrated by the solid line of FIG. 26(c). Such a series of process is hereinafter referred to as "interpolation".

Figure 27:
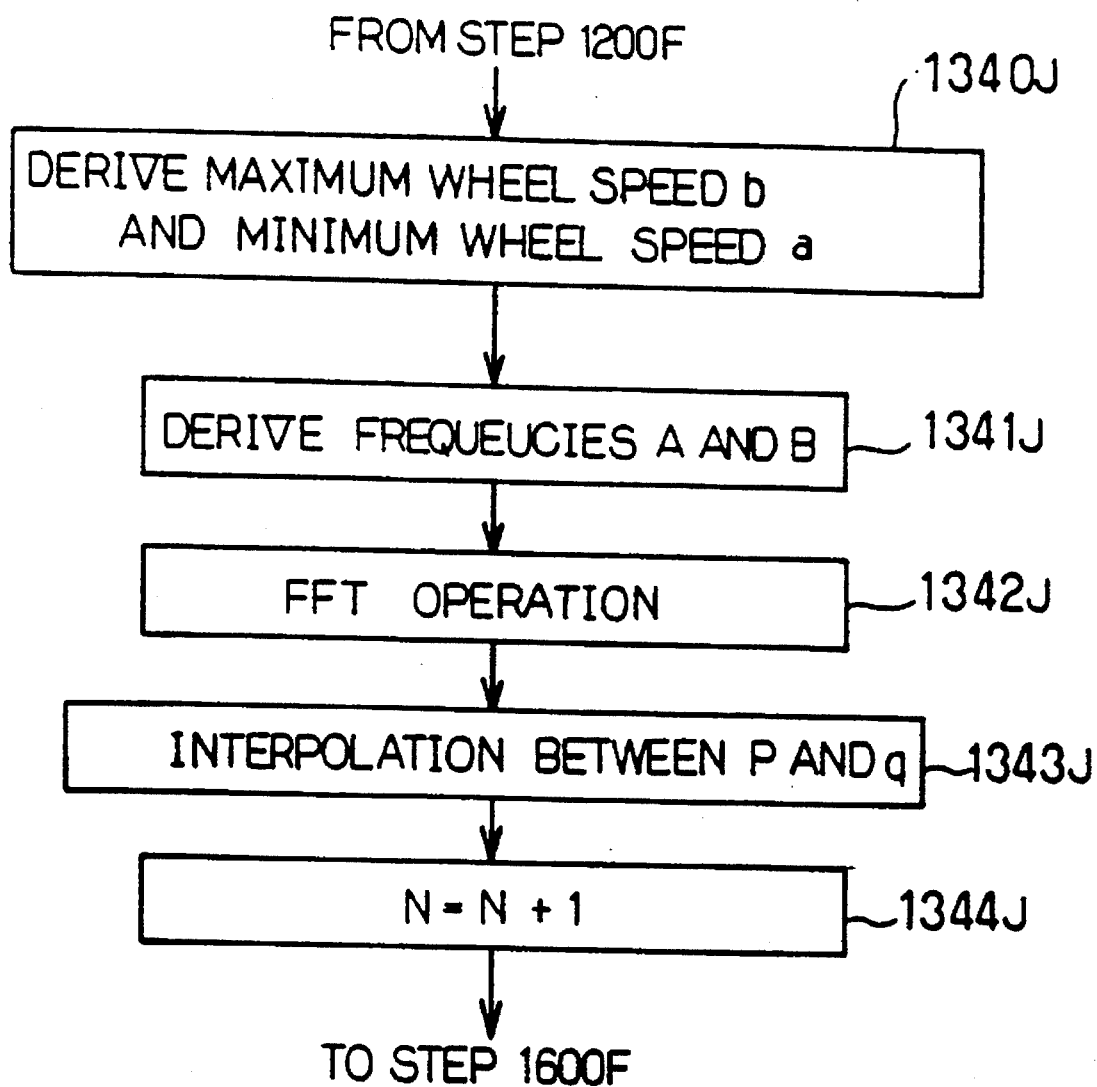
FIG. 27 is a flowchart illustrating a principle of the process of the tenth embodiment.

To perform this interpolation, steps 1300F~1500F of the sixth embodiment are replaced with steps 1341J~1344J of the tenth embodiment, illustrated in FIG. 27.

At step 1340J, minimum value a and maximum value b are derived, where they correspond to the wheel speed variation within a certain period $T_D$. At step 1341J, frequencies A and B, which correspond to foregoing minimum value a and maximum value b, are derived. Then, at step 1342J, the FFT operation is performed.

Because the tire rotation degree components are present within the frequency range of A~B, interpolation is performed by interpolating between the FFT operation resultant values of frequencies A and B with a straight line at step 1343J, where the FFT operation resultant values at A and B are shown as q and p in FIGS. 26(b) and 26(c). Consequently, the gains corresponding to the tire rotation degree components of frequency range A~B are reduced.

In step 1344J, the counter for indicating the number of cycles of the FFT operations performed is incremented, after which the process is advanced to step 1600F for further processing.

Figure 28:
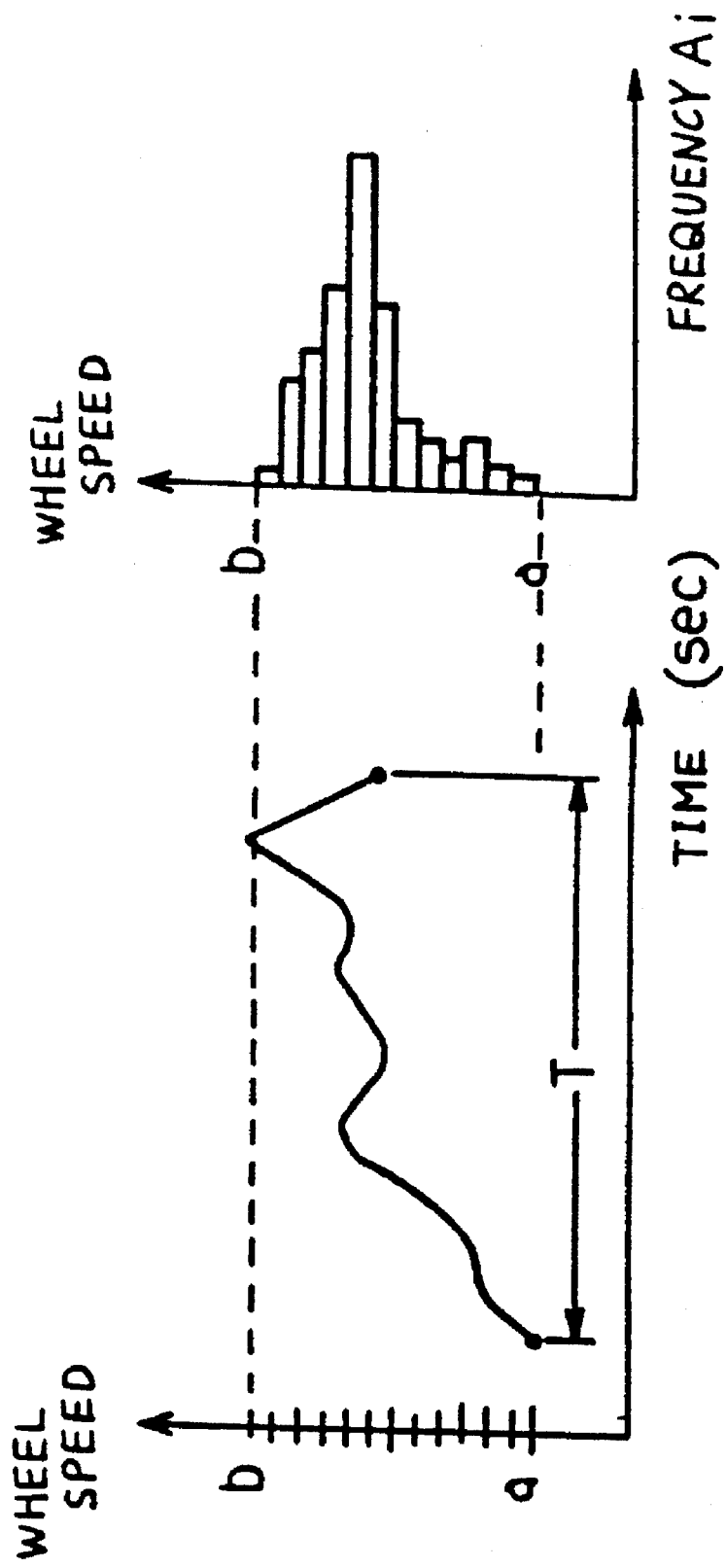
FIGS. 28(a) and 28(b) are illustrations of the control performed by the eleventh embodiment.

The eleventh embodiment features improved precision for the interpolation of the above-mentioned tenth embodiment. Namely, in the tenth embodiment, a distribution of wheel speed frequency ($A_i$) is derived for wheel speeds between maximum wheel speed value b and minimum wheel speed value a which are varying within period $T_D$ (FIGS. 28 (a) and 28 (b)).

By sorting wheel speeds within wheel speed range of a~b, and determining the number of data points corresponding to each wheel speed, a distribution of wheel speed frequencies may be derived. As discussed with respect to the tenth embodiment, the tire rotation degree component is necessarily present within the frequency range from A to B. However, it should be noted that the rotational degree component corresponds to the wheel speed variations in the range from a–b. Therefore, the gain distribution of the tire rotation degree component is similar to the frequency distribution of the wheel speed.

In other words, since the tire rotation degree component is apparent from the number of rotations of the wheel within a unit period, the wheel speed can be regarded as the number of rotations of the wheel within that unit period.

Figure 29:
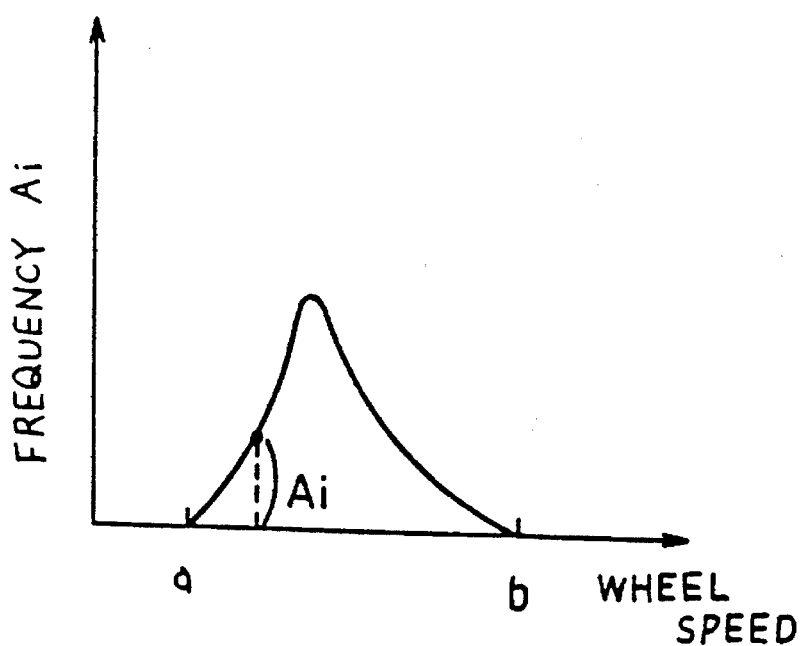
FIG. 29 is a characteristic chart showing a frequency distribution of the wheel speed in the eleventh embodiment.
Figure 30:
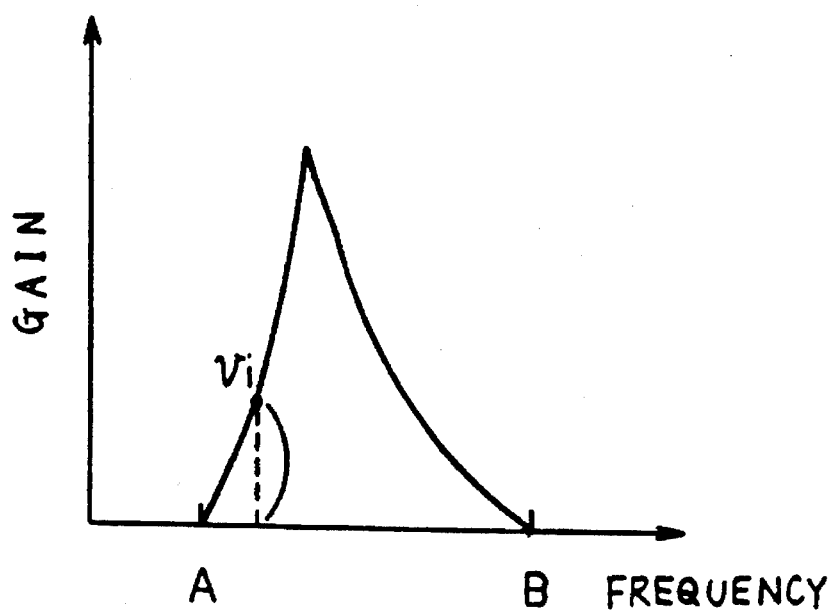
FIG. 30 is a characteristic chart showing predicted gain distribution of a tire rotation degree component in the eleventh embodiment.
Figure 31:
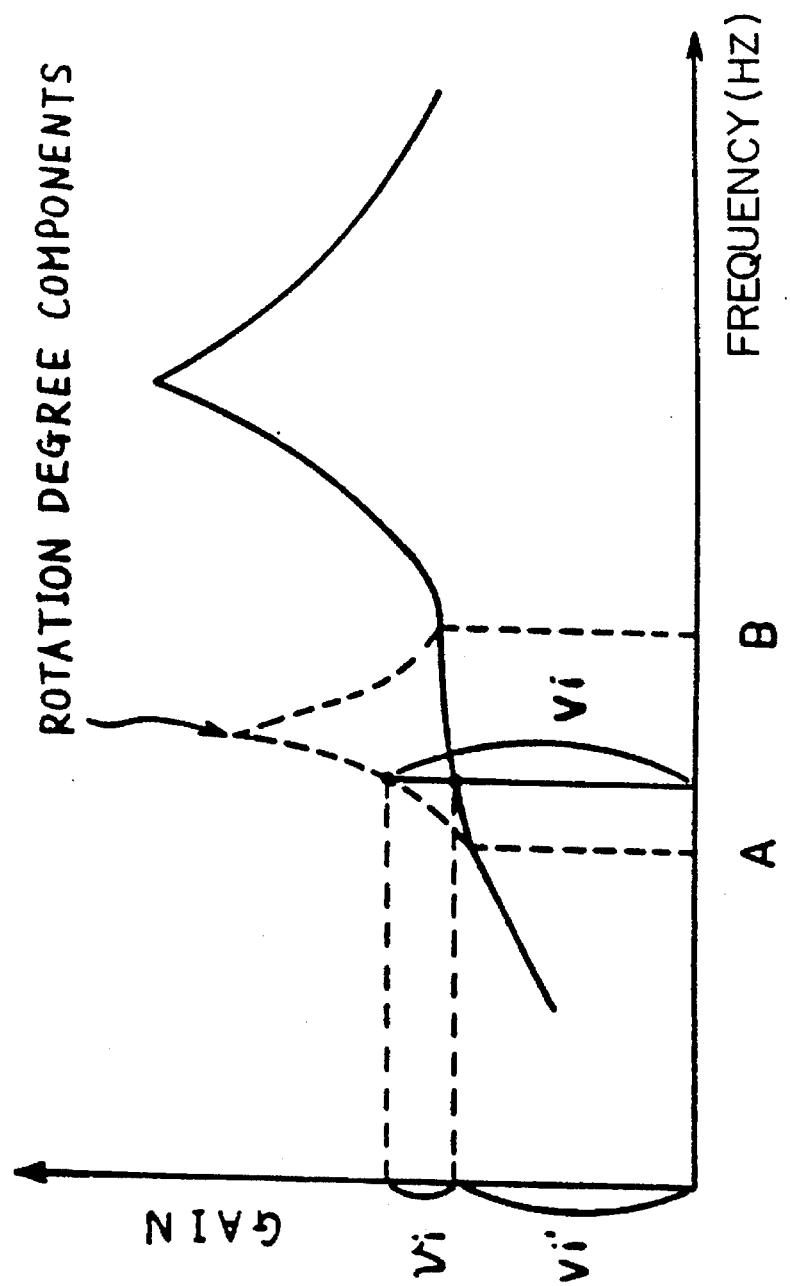
FIG. 31 is a characteristic chart showing a frequency characteristics from which the tire rotation degree component is removed in the eleventh embodiment.

Therefore, coefficient $K_i$ (which is the coefficient for converting the wheel speed frequency $A_i$ into the FFT operated value $v_i$ at the frequency corresponding to the wheel speed) is multiplied with wheel speed frequency $A_i$ to predict the distribution of the gains of the tire rotation degree components (see FIGS. 29 and 30). Subsequently, as shown in FIG. 31, by subtracting the predicted distribution of gains of the tire rotation degree components from the result of the FFT operation within the frequency range of A–B, the influence of the tire rotation degree components are substantially decreased.

Correspondingly, by interpolating between the resultant values q and p of the FFT operation within the frequency range of A–B, the rotation degree components may also be substantially decreased.

Figure 32:
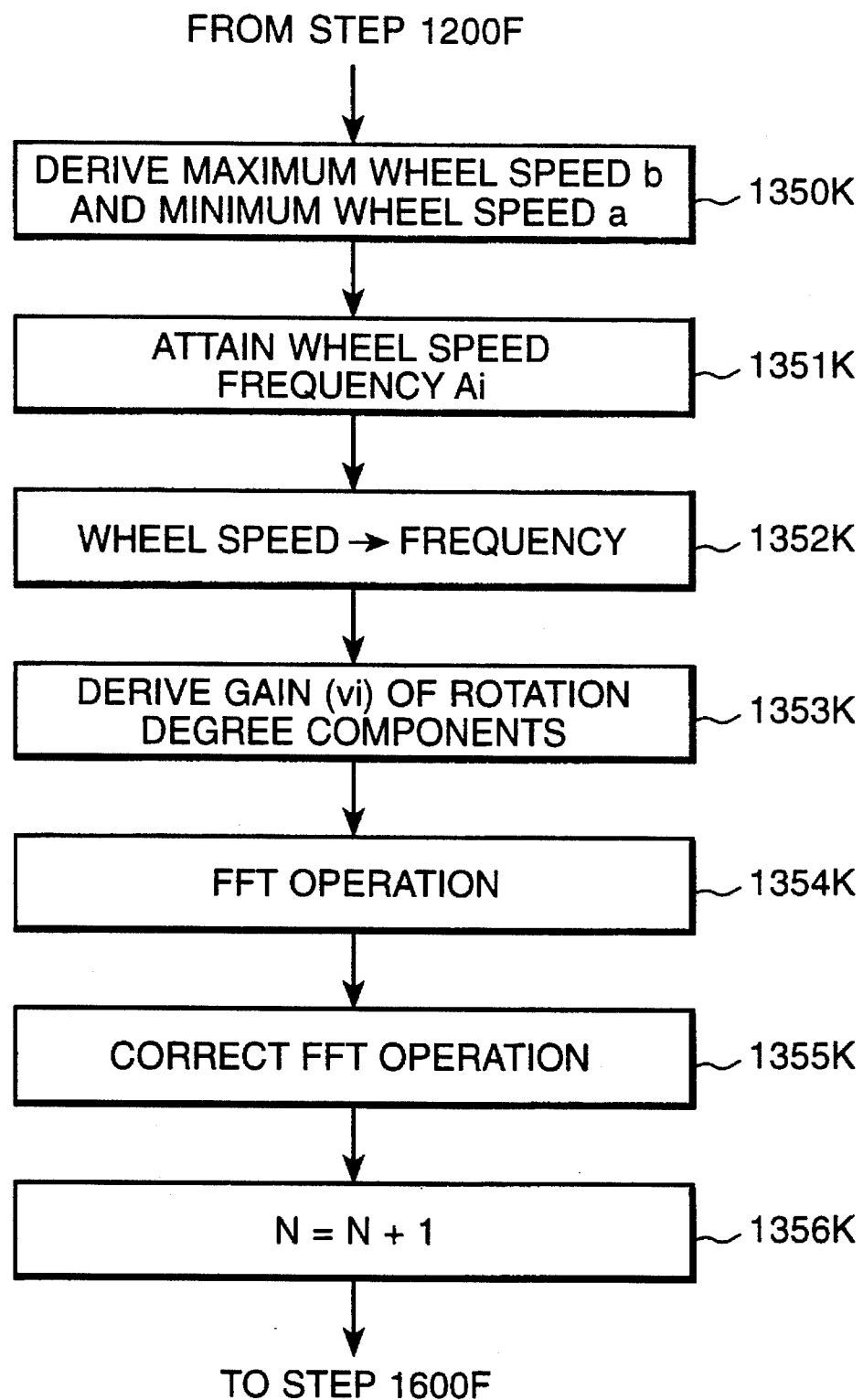
FIG. 32 is a flowchart illustrating a principle of the process of the eleventh embodiment.

The foregoing process is illustrated in the flowchart shown by FIG. 32, where steps 1340J–1344J of the tenth embodiment are replaced with steps 1350K–1356K of FIG. 32.

At step 1350K, within the period $T_D$, maximum wheel speed b and minimum wheel speed a are derived, and the results are stored in ECU 4. At step 1351K, the stored resultant wheel speeds are increasingly or decreasingly sorted, and the number of equal speeds are calculated to determine the distribution of the wheel speed frequency $A_i$.

At step 1352K, the frequency corresponding to the wheel speed is derived. At step 1353K, the gains (vi) of the tire rotation degree components are derived from the distribution of wheel speed frequency, $A_i$ by multiplying coefficient $K_i$ to $A_i$.

Next, at step 1354K, the FFT operation is performed on the gains (vi) of the tire rotation degree components which were derived in step 1353K. At step 1355K, the gains of the tire rotation degree component (v1) are subtracted from the resultant value of the FFT operation ($v_i$) within frequency range A–B, thereby generating a corrected value ($v_i'$) corresponding to the FFT operation. The resultant values of the FFT operation, from which the tire rotation degree components are removed, are as illustrated in FIG. 31.

At step 1356K, the counter for the number of FFT operation cycles performed is incremented. Then, the process is advanced to step 1600F for further processing as described in the sixth embodiment.

The twelfth embodiment features approximating the frequency distribution of the wheel speed with a convenient configuration, and subtracting the approximated convenient configuration from the result of the FFT operation.

Figure 33:
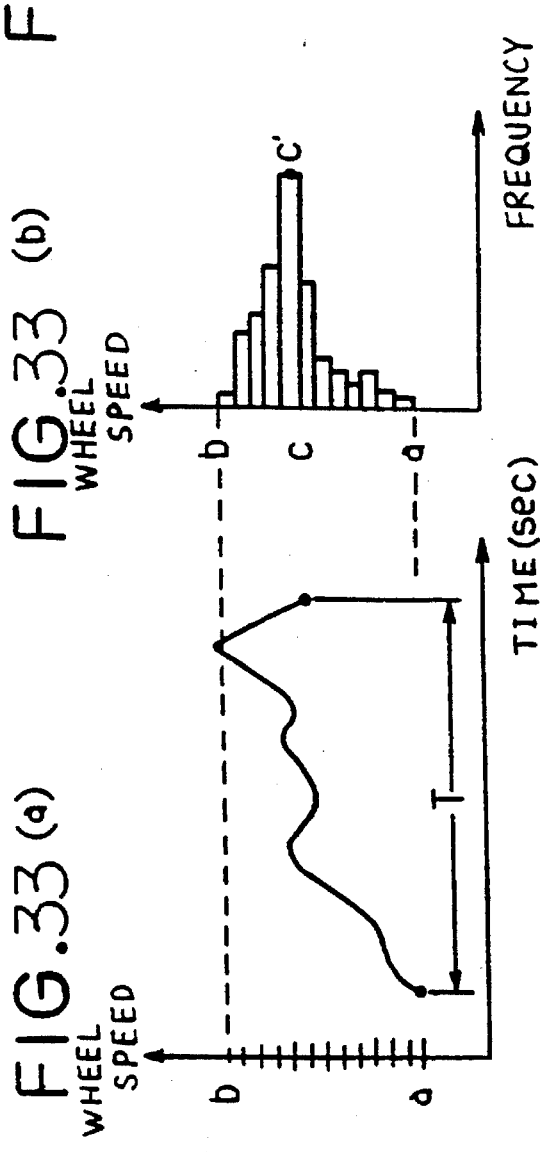
FIGS. 33(a), 33(b) and 33(c) are illustrations of the control performed by the twelfth embodiment.

It should be noted that, as shown in FIGS. 33(a) and 33(b), the manner used to derive the frequency distribution while the wheel speed varies from a to b, is the same as that of the eleventh embodiment.

Figure 34:
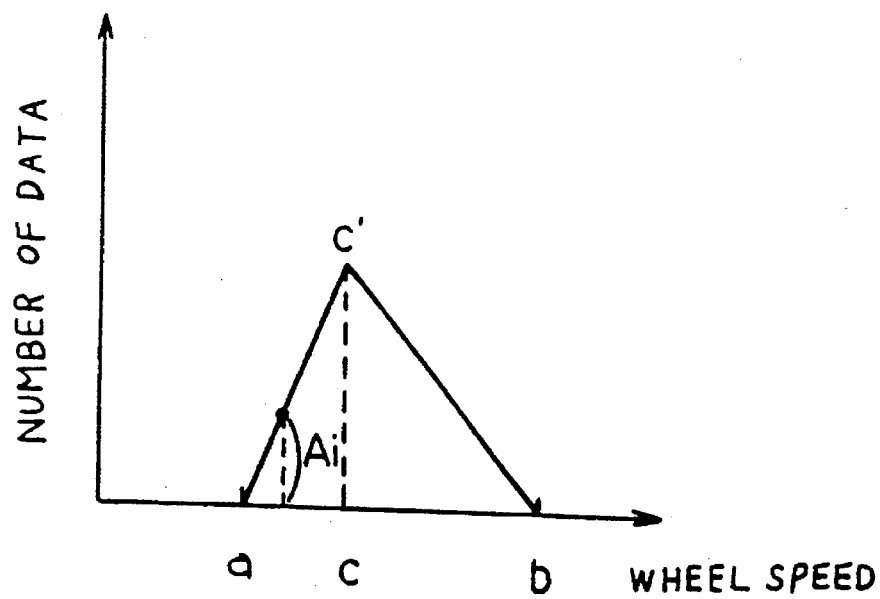
FIG. 34 is an illustration for discussion of an outline of the control performed by the twelfth embodiment.
Figure 35:
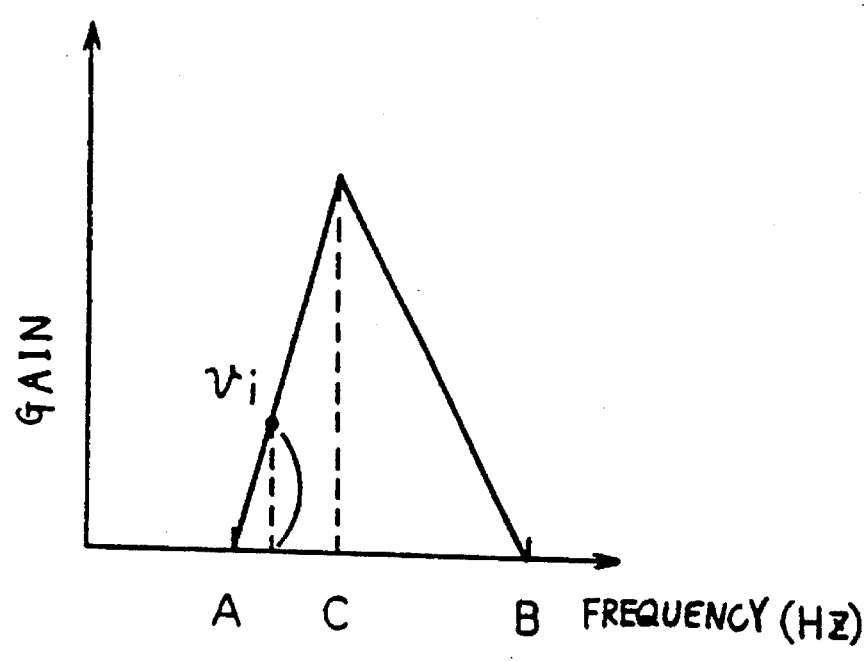
FIG. 35 is an illustration for discussion of an outline of the control performed by the twelfth embodiment.

However, this distribution may be approximated as follows. The most frequent wheel speed is shown as c. Therefore, the frequency distribution is approximated by triangle abc' as shown in FIG. 33(c). Then, as shown in FIGS. 34 and 35, by multiplying predetermined coefficient $K_i$ with the triangle abc', predicted gains (vi) of the tire rotation degree components are derived. Further, by subtracting the derived approximated gains from the resultant values ($v_i$) of the FFT operation, the tire rotation degree components are removed.

It should be noted that no flowchart is provided for this embodiment because the steps performed are substantially the same as that of the eleventh embodiment.

On the other hand, in the twelfth embodiment, by using the highest frequency wheel speed c, an average value of the wheel speed variation, which is between values a and b may be determined without removing the tire rotation degree component. Further, instead of approximating the wheel speed frequency distribution with triangle abc', statistical distributions, such as normal distribution, Gaussian distribution and so forth may be employed.

Figure 38:
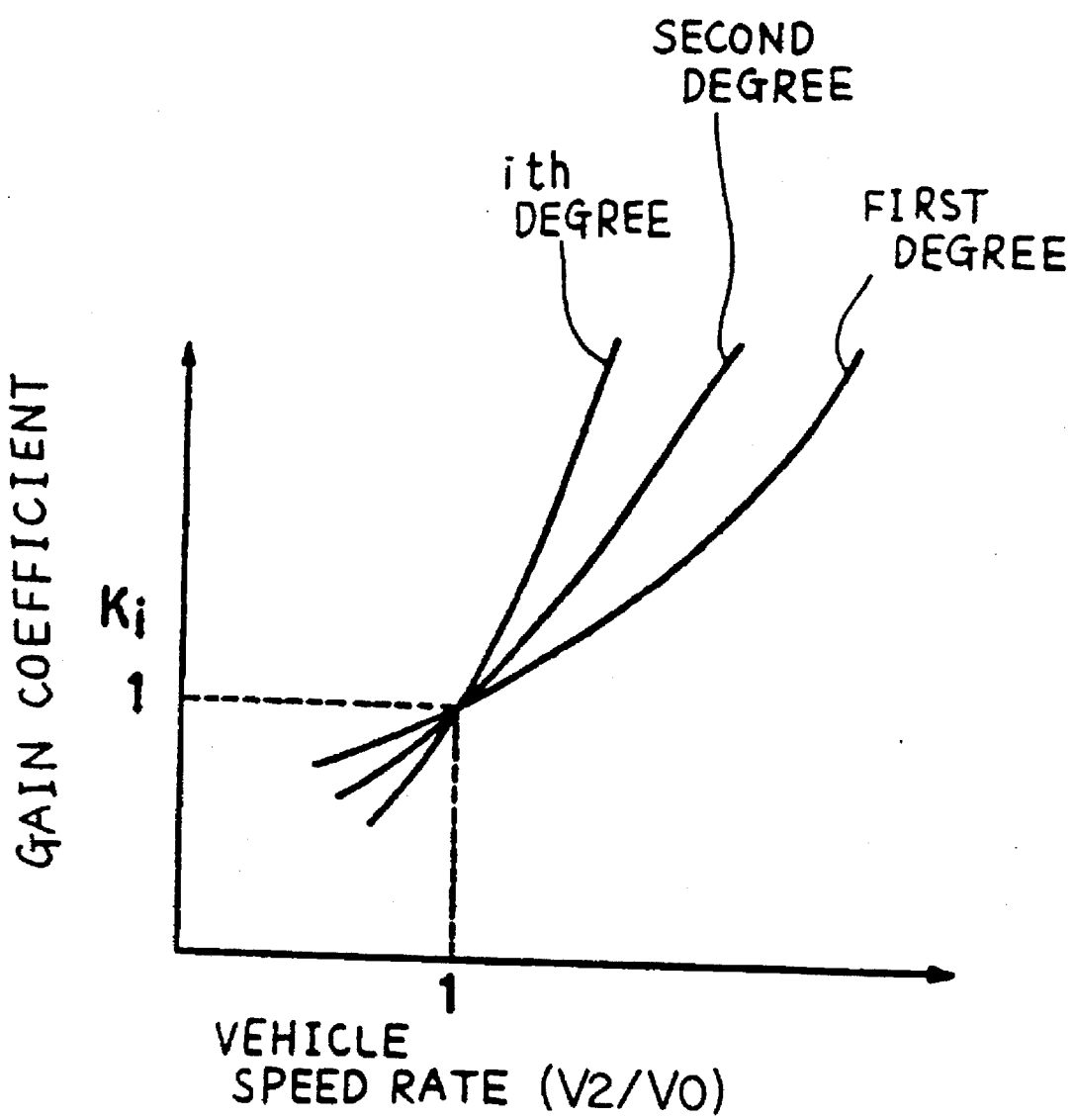
FIG. 38 is a characteristic chart showing a relationship between a vehicle speed ratio and a gain coefficient.

The thirteenth embodiment is directed toward shortening the operation process period by determining the gains of the wheel rotation speed degree components in units of time from a map. Namely, the referenced map (FIG. 38) relates the initially derived gain of the degree components of the wheel rotation speed per unit period (T) to a ratio between vehicle speed V of the subsequent process, and initially derived vehicle speed $V_0$.

Figure 36:
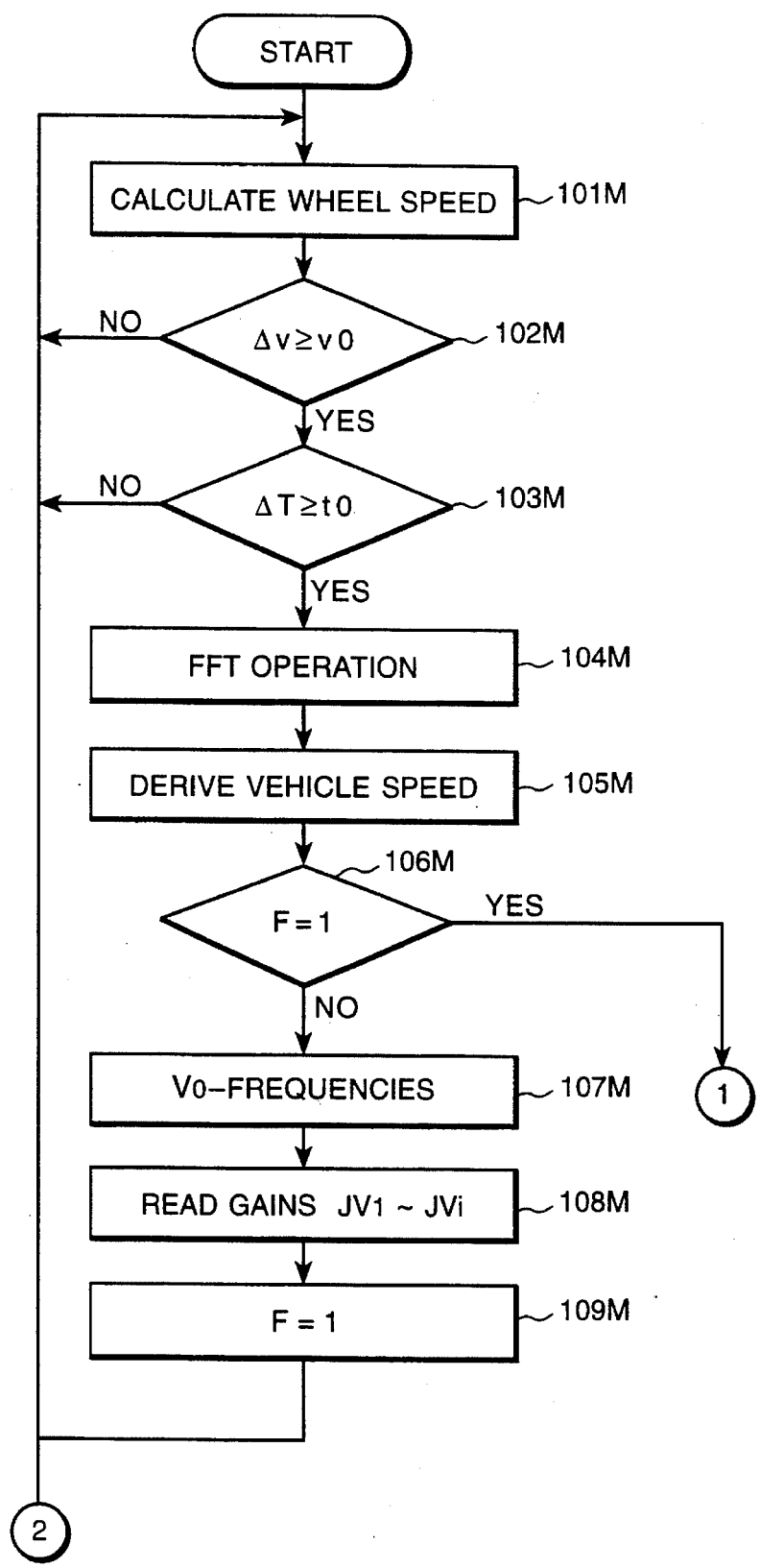
FIG. 36 is a flowchart illustrating the first portion of the principle of the process of the thirteenth embodiment.
Figure 37:
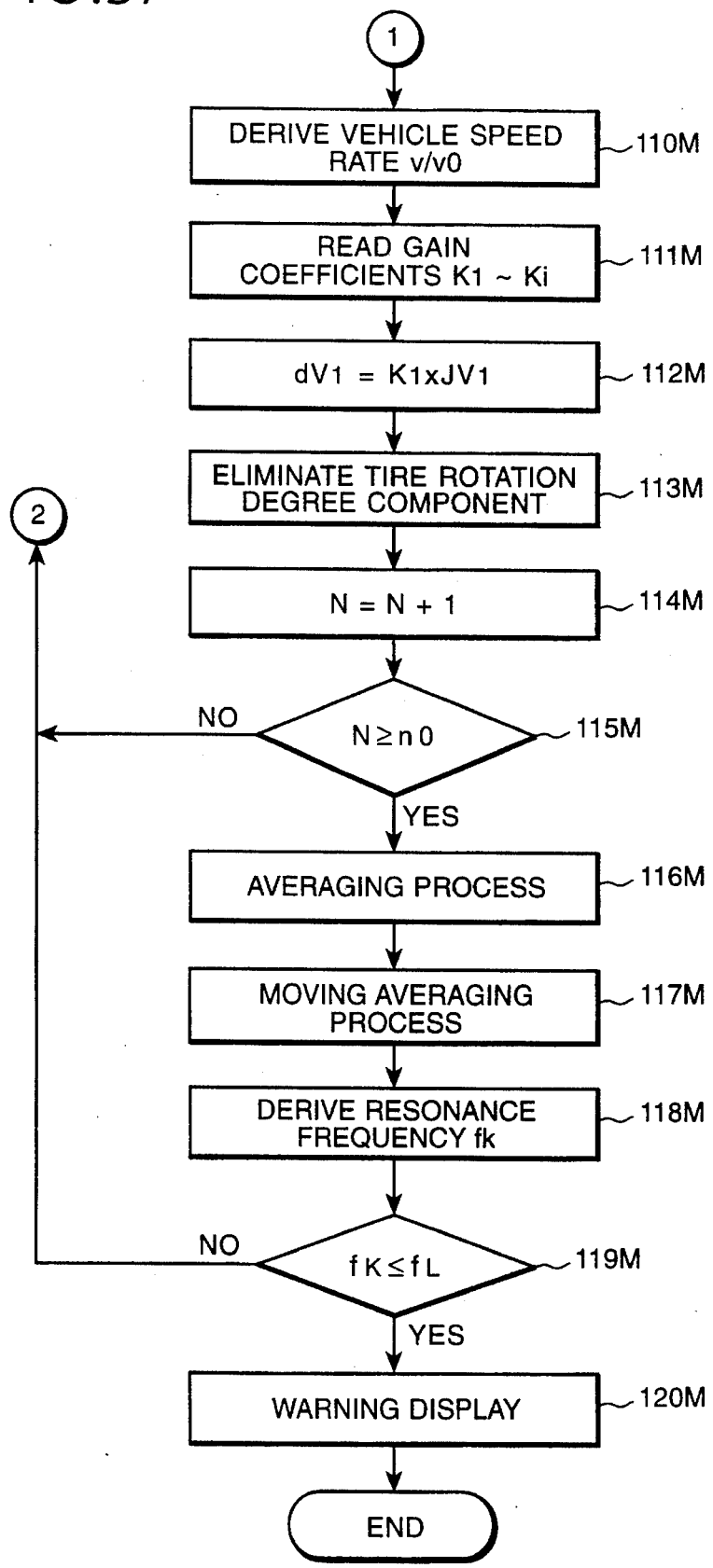
FIG. 37 is a flowchart illustrating the second portion of the principle of the process of the thirteenth embodiment.

Explanation of this embodiment will be made with reference to FIGS. 36 and 37.

Steps 101M–104M are similar to those in the first embodiment. At step 105M, vehicle speed V is derived based on the wheel speed used for the FFT operation process. Note that the vehicle speed, which is derived immediately after the initiation of process, is stored in the RAM as vehicle speed $V_0$. This value is derived to provide a center speed component of wheel speed v in addition to the tire vibration frequency component. At step 106M, judgment is made whether flag F is set to "1".

It should be noted that flag F is reset to "0" only in response to the turning OFF of an ignition switch. Therefore, in the first process after turning ON the ignition switch, this flag is set to "0" so that a negative judgment is made in step 106M to advance the process to step 107M.

At step 107M, vehicle speed $V_0$ is subject to a frequency conversion to obtain a primary frequency which corresponds to the number of rotations of the wheel within a unit period. Additionally, integral multiples of the primary frequency are computed.

At step 108M, gains $JV_1$–$JV_i$ of the tire rotation degree components are read into the RAM based on the FFT operation results. At step 109M, flag F is set to "1", and the process is returned to step 101M.

Note that flag F is set to "1" so that the processes performed in steps 107M and 108M are executed only once, immediately after starting. Accordingly, the process is directly advanced to step 110M in each subsequent cycle, where a vehicle speed rate (V/$V_0$) which is relative to the vehicle speed $V_0$ is derived. At step 111M, gain coefficients $K_1$–$K_i$ are derived by reading a gain coefficient which corresponds to the vehicle speed rate (V/$V_0$), from a map shown in FIG. 38, where the map is preliminarily stored in ECU 4.

At step 112M, gains $dV_1$–$dV_i$ are derived on the basis of both the determined gain coefficients $K_1$–$K_i$, and the gains of the tire rotation degree components $JV_1$–$JV_i$ from step 108M. At step 113M, gains $dV_1$–$dV_i$ are subtracted from the results of the FFT operation to eliminate the influence of the tire rotation degree components. The processes following step 113M are similar to those in the foregoing embodiments.

In the fourteenth embodiment a predetermined relationship between gain dV and vehicle speed $V_x$ is used to derive the gain at various wheel speeds. The derived gain corresponding to each integral multiple of the primary frequency degree is then subtracted from the results of the FFT calculation so that the influence of the tire rotation degree component may be eliminated.

Figure 39:
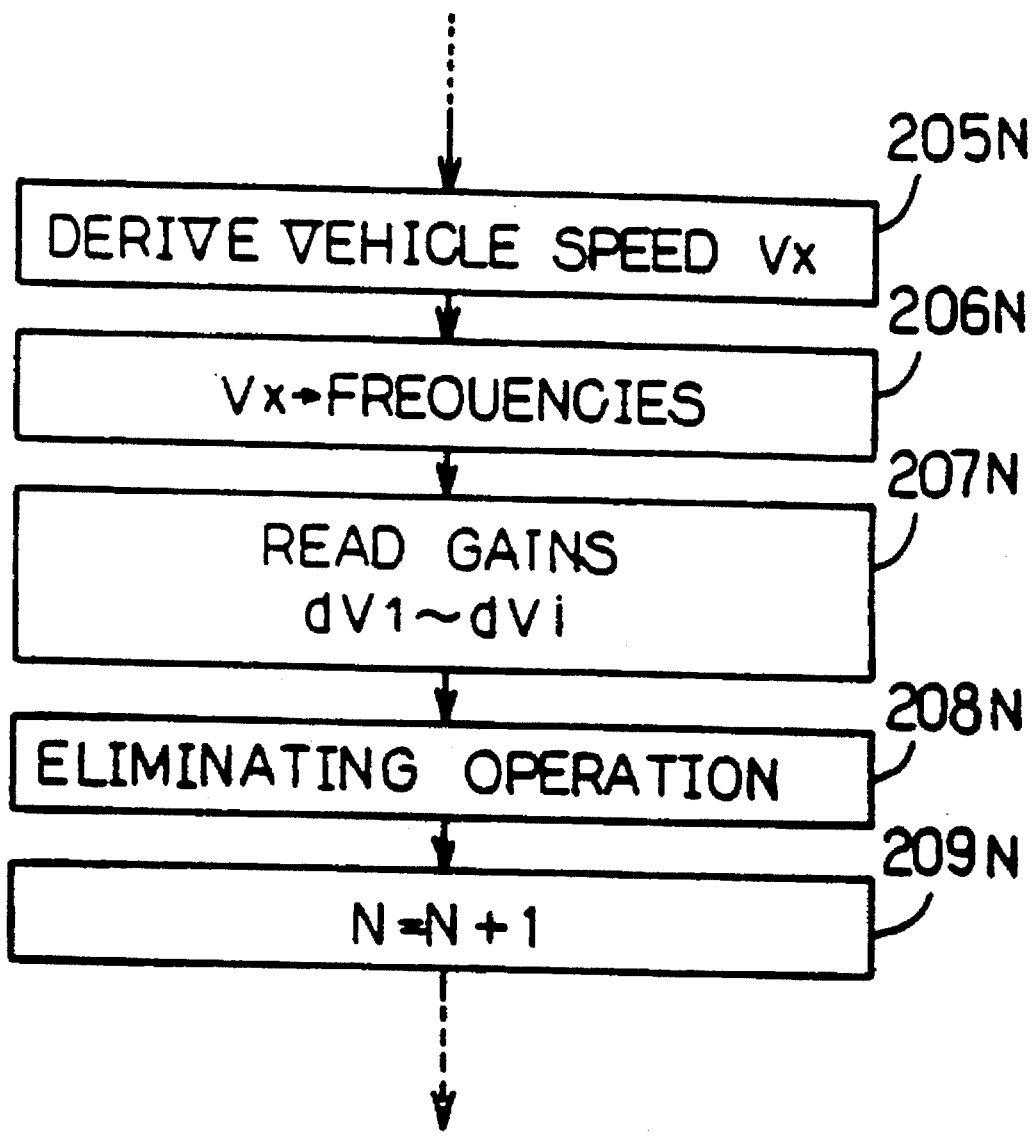
FIG. 39 is a flowchart illustrating a principle of the process of the fourteenth embodiment.

The foregoing process is illustrated in flowchart shown by FIG. 39, where steps 105M~ 114M of the thirteenth embodiment are replaced with steps 205N~209N.

Figure 40:
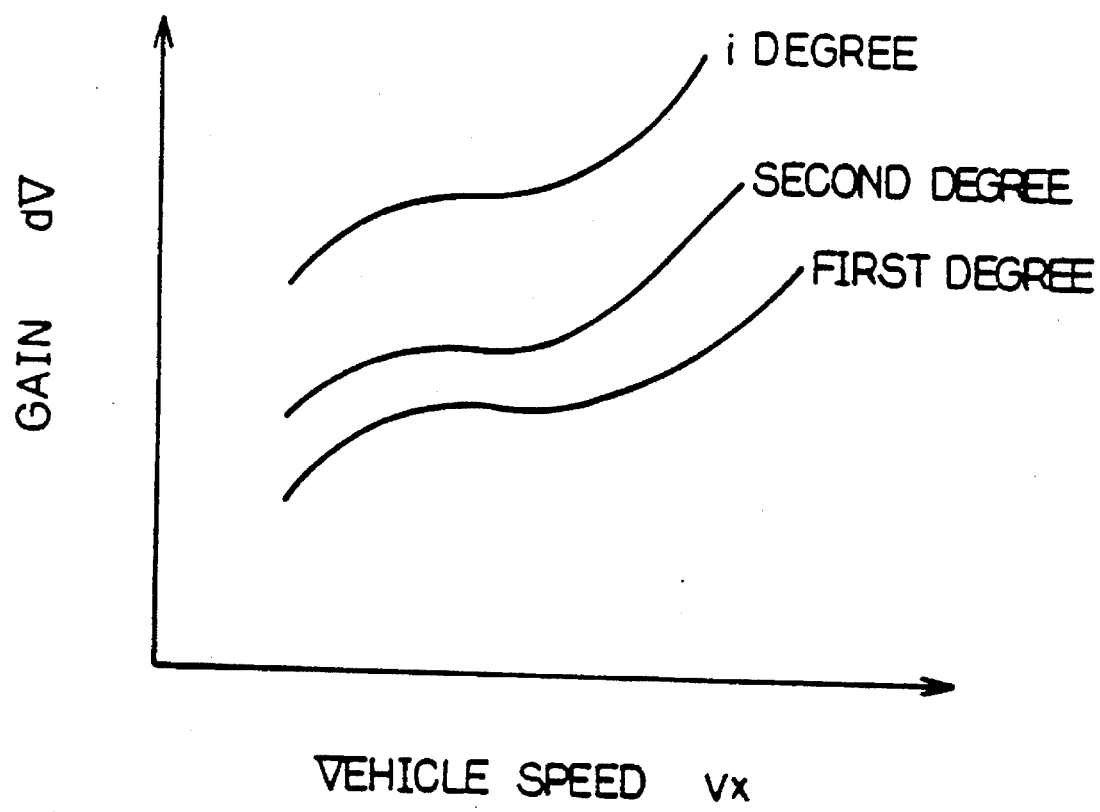
FIG. 40 is a characteristic chart showing a relationship between a vehicle speed and a gain of respective degrees of the frequency corresponding to the wheel rotation speed per unit time.

At step 205N, vehicle speed $V_X$ is derived from the results of the FFT operation performed in step 104M of the thirteenth embodiment. At step 206N, a frequency conversion is performed on derived vehicle speed $V_x$ to determined the primary frequency of the tire rotation degree component, and to obtain frequencies which correspond to the integral multiples of the primary frequency. At step 207N, the gains which correspond to respective degrees $dV_1$~$dV_i$ of vehicle speed $V_X$, are derived from a map (FIG. 40) which is preliminarily stored in ECU 4. At step 208M, gains $dV_1$ to $dV_i$ of the respective integral multiple frequencies are subtracted from the results of the FFT operation, thereby eliminating the influence of the tire rotation degree component.

Figure 41:
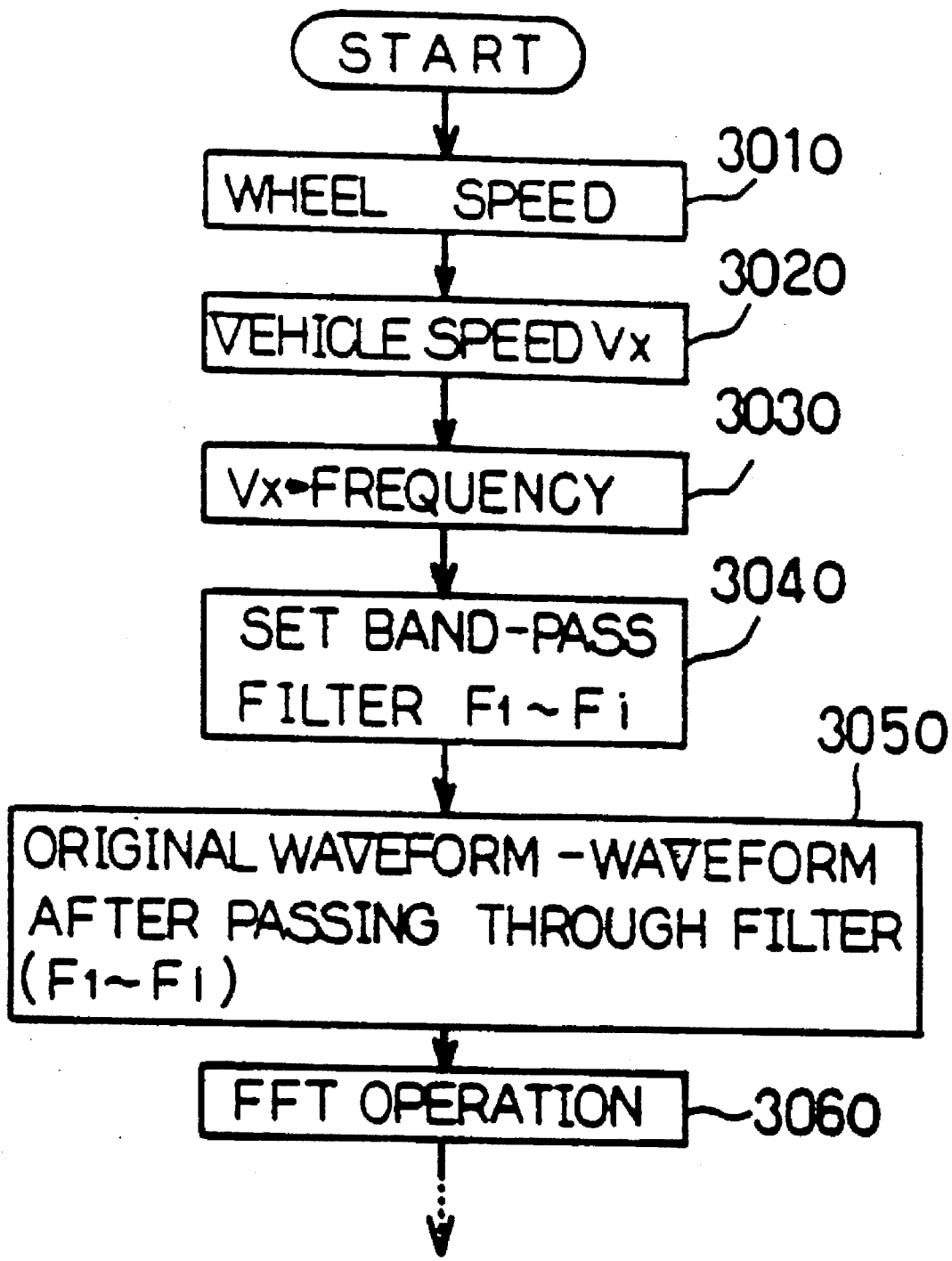
FIG. 41 is a flowchart illustrating a principle of the process of the fifteenth embodiment.

In the fifteenth embodiment, the frequency of the tire rotation degree component is directly removed using a plurality of band-pass filters. This is explained with reference to the flowchart shown in FIG. 41.

In steps 301o to 303o, vehicle speed $V_X$ is both derived from the wheel speed and frequency converted. Thus, the frequency range of the tire rotation degree component is obtained. At step 304o, a band frequency ($f_a$~$f_b$) of band-pass filter (B.P.F.) $F_1$ is used to set the band frequencies of a plurality of band-pass filters, $F_2$ ~$F_i$. Specifically, the band frequency of band-pass filters $F_2$~$F_i$ are respectively set as integral multiples of the band-pass frequency range, $f_a$~$f_b$, Of band-pass filter $F_1$.

Then at step 305o, the original waveform is passed through the respective band-pass filters $F_1$~$F_i$ to obtain a time-based waveform, where the resultant waveform is not influenced by the tire rotation degree components. Using this waveform, the FFT operational process and subsequent averaging processes, which are explained with respect to the thirteenth and the fourteenth embodiments, are performed to derive resonance frequency $f_K$. Then, judgments can be made concerning the tire air pressure.

3sixteenth

The tire rotation degree component may also be removed by performing an FFT analysis on the filtered waveform and subtracting the results from the original waveform.

However, by using frequency analysis (FFT operation) to extract the resonance frequency, many summing and multiplying operations must be performed, resulting in prolonged operation.

Therefore, the sixteenth to nineteenth embodiments are provided to modify the FFT operation periods depending upon both the required response characteristics, and the required detection accuracy of the tire air pressure.

Foregoing FFT operations may have been performed by reading a predetermined amount of data into the RAM of ECU 4, and repeating summing and multiplying operations on all of this data so that the resonance frequency can be extracted. However, because the resonance frequency is known in the present invention, a frequency range, $w_f$, within which the FFT operation is performed can be preliminarily set. Accordingly, if a large amount of data is read into RAM of ECU 4, the frequency range many be divided into many ($n_f$) smaller frequency ranges so that the frequency resolution ($w_f/n_f$) and detecting precision are improved for each frequency range.

However, reading a large number of data into RAM, as set forth above, requires a longer period for obtaining one result of the FFT operation (hereinafter referred to as "FFT data"), and leads to a heavier load on ECU 4.

Additionally, in order to achieve a high frequency resolution, a large number of FFT data must be provided for the averaging process.

Alternatively, when the required frequency resolution is lower, the amount of FFT data required for such averaging processes is reduced.

The sixteenth to nineteenth embodiments utilize the foregoing properties of the FFT operation.

For instance, when less detection accuracy is required, the number of averaging processes are reduced while the difference between the derived resonance frequency and the reference value is large. Therefore, quicker response to relatively swift variation of the tire air pressure may be obtained by shortening the operation period of the FFT data.

On the other hand, when the tire air pressure is close to the reference value, the number of FFT data to be read into RAM is increased, thereby increasing the number of the averaging process, the frequency resolution, and the detection accuracy.

Figure 42:
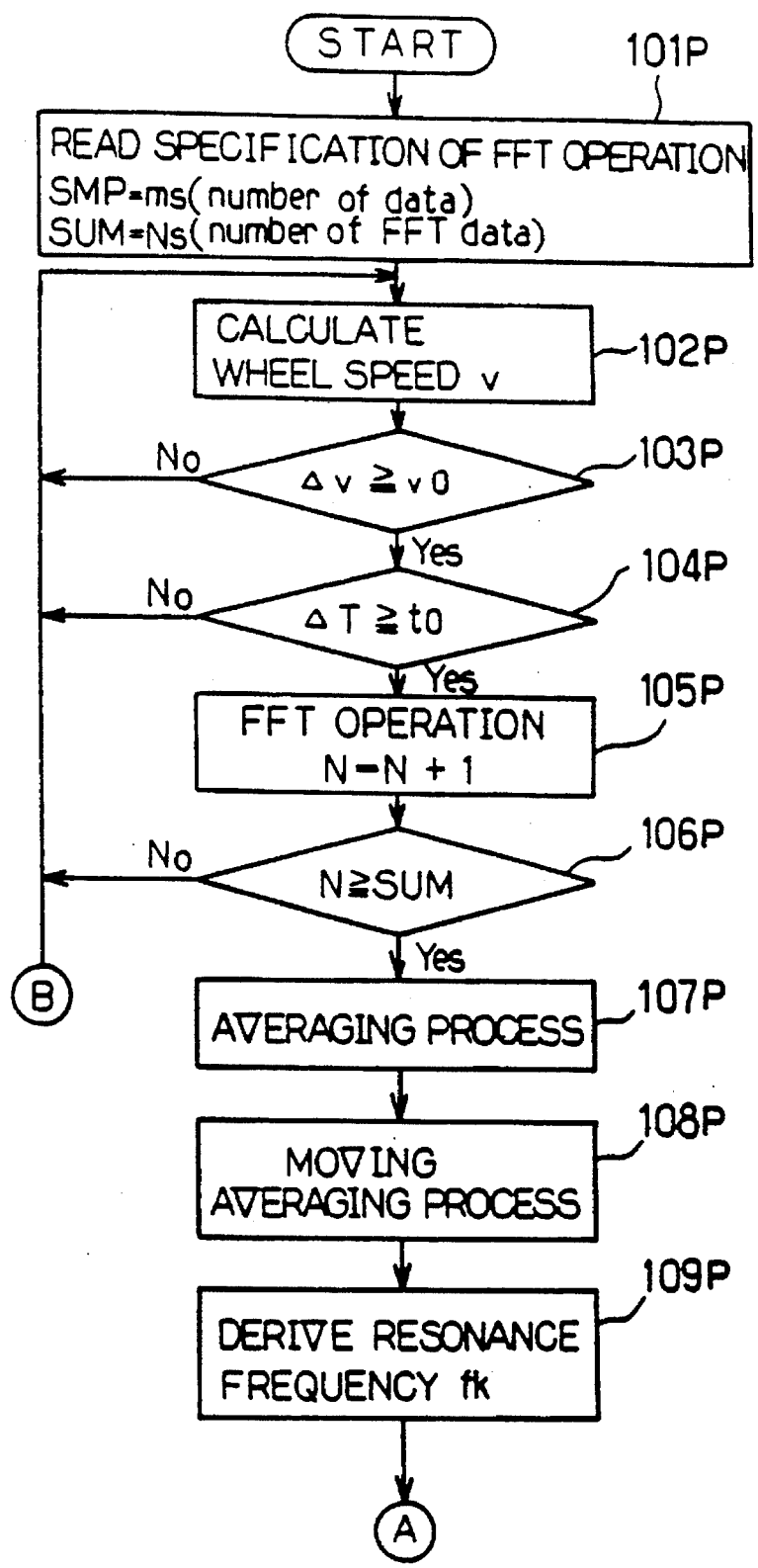
FIG. 42 is a flowchart illustrating a first portion of the principle of the process of the sixteenth embodiment.

The processes of the sixteenth embodiment are illustrated by FIG. 42, where two different levels of specification values are determined for use in the FFT operation. Accordingly, when the tire air pressure approaches reference value $f_L$, the specification values for the FFT operation are changed. The signal extraction period is expanded, and both the amount of data to be sampled (SMP) and the number of the averaging process cycles (SUM) are increased. Consequently, the frequency resolution and tire air pressure detecting precision are also increased, thereby decreasing the possibility of erroneous detection.

On the other hand, when the tire air pressure does not approach reference value $f_L$, the tire air pressure detecting process is performed in a shorter period under the specification of the FFT operation for lower frequency resolution and higher response characteristics.

At step 101P of FIG. 42, specification values for the FFT operation are read, where the specification values for the operation are initially set for lower detection accuracy.

At subsequent steps 102P~105P, processes similar to those described in steps 100A~ 130A of the first embodiment are performed.

At step 106P, the number of FFT operations performed ($N_S$) is compared to a predetermined number (SNM). If the number of operation cycles has not reached the predetermined number, then steps 102P~105P are repeated. On the other hand, when the number of the operation cycles has reached the predetermined number, the process is advanced to perform the averaging process at step 107P, moving averaging process at step 108P, and derivation of the resonance frequency $f_K$ at step 109P.

Figure 43:
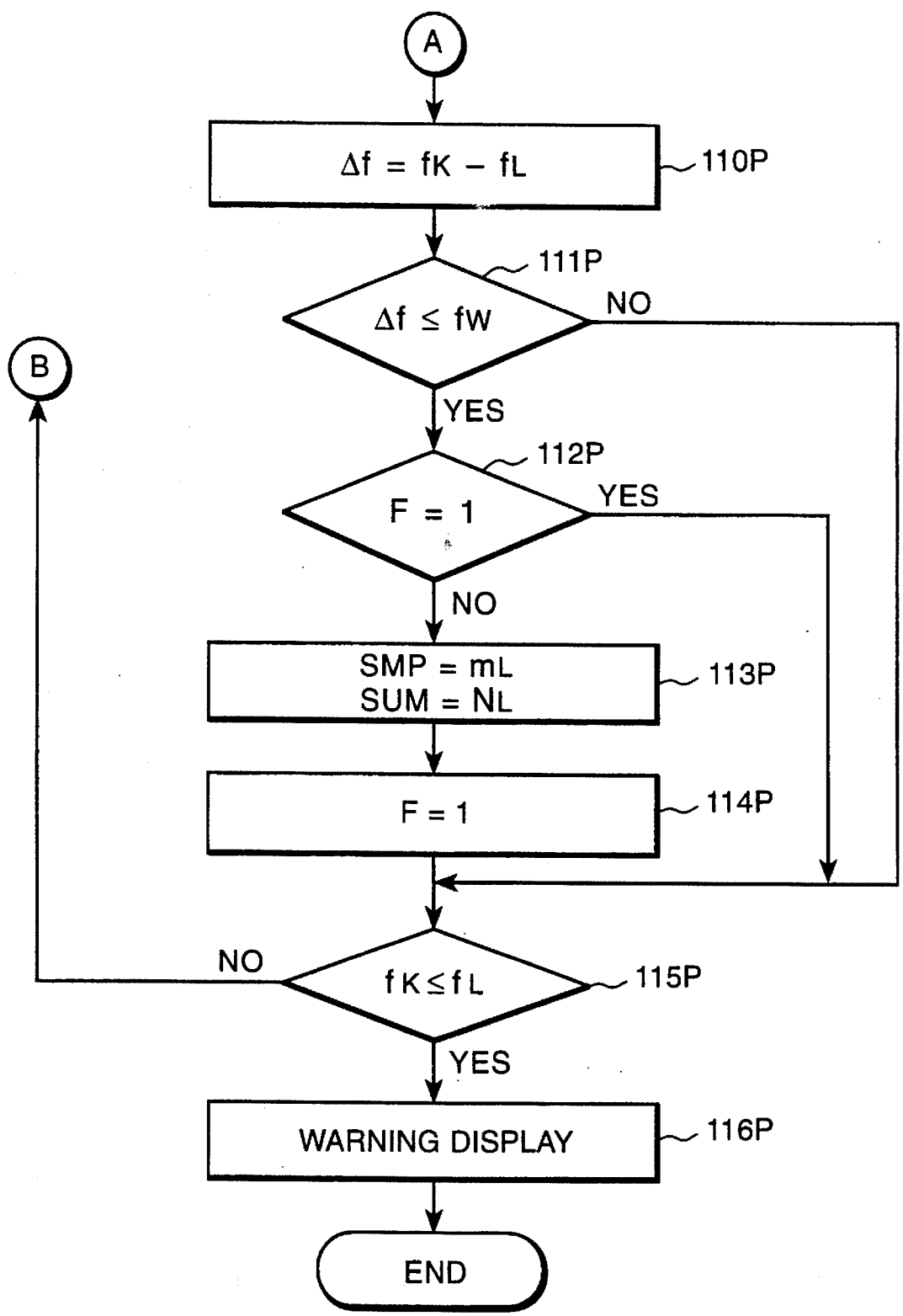
FIG. 43 is a flowchart illustrating a second portion of the principle of the process of the sixteenth embodiment.

Then, as shown at step 110P of FIG. 43, a difference between derived resonance frequency $f_K$ and predetermined air pressure lowering reference value $f_L$ is derived, where the difference is referred to as $\Delta f$. At step 111P, the difference is compared to preset value $f_w$ to determine if the tire air pressure has decreased to a level near reference value $f_L$ so that an increase in detection accuracy is required.

When it is determined in step 111P that the difference is less than $f_w$, the number of sample data values (SMP), and the number of averaging process cycles (SUM), are increased to achieve higher detection accuracy. At step 112P, the status of flag F is checked, where this flag is set to zero only once, namely the first time it is checked after initiation of process.

When the flag is set to zero, the process is advanced to step 113P to update the number of sample data to $m_L$ and to update the number of averaging process cycles to $N_L$, where $m_L$ is less than $m_S$, and where $N_L$ is greater than $N_S$. Then, at step 114P, flag F is set to "1", and the process is advanced to step 115P.

Otherwise, when either resonance frequency $f_k$ is determined to not be close to reference value $f_L$ in step 111P, or when the status of flag F is determined to be equal to "1" in step 112P, no increase in the detection accuracy is required. Accordingly, the process advances directly to step 115P.

At step 115P, the most recent resonance frequency calculated, $f_K$, is compared to reference value $f_L$. If resonance frequency $f_K$ is determined to be lower than, or equal to, reference value $f_L$, the process is advance to step 116P to generate an alarm indicating decreased tire air pressure. Otherwise, the process is returned to step 102P to repeat the above-mentioned process.

After starting the process, if resonance frequency corresponding to the tire air pressure gradually approaches the reference value $f_L$, and the specification values of the FFT operation are updated, air pressure will not be supplied to the tire until the vehicle stops.

Therefore, steps 112P and 114P are provided in order to avoid redundant processing of step 113P. Specifically, flag F is set to "1" in step 114P to indicate that the specification values of the FFT operation have been updated. Thus, when it is detected in step 112P that the specification values have been previously updated, these steps are not performed and the air pressure lowering judgment process of step 115P is immediately performed.

The seventeenth embodiment is directed at expanding the signal extraction period when $\Delta f$ becomes smaller than $f_{w2}$ so that both the SMP and the SUM are increased, where $\Delta f$ is the difference between resonance frequency $f_K$ and reference value $f_L$, and $f_W$ is a predetermined value. In this embodiment, the values of SMP and SUM which correspond to $\Delta f$ are determined by using predetermined relationships, such as those shown in FIGS. 46 and 47.

Figure 45:
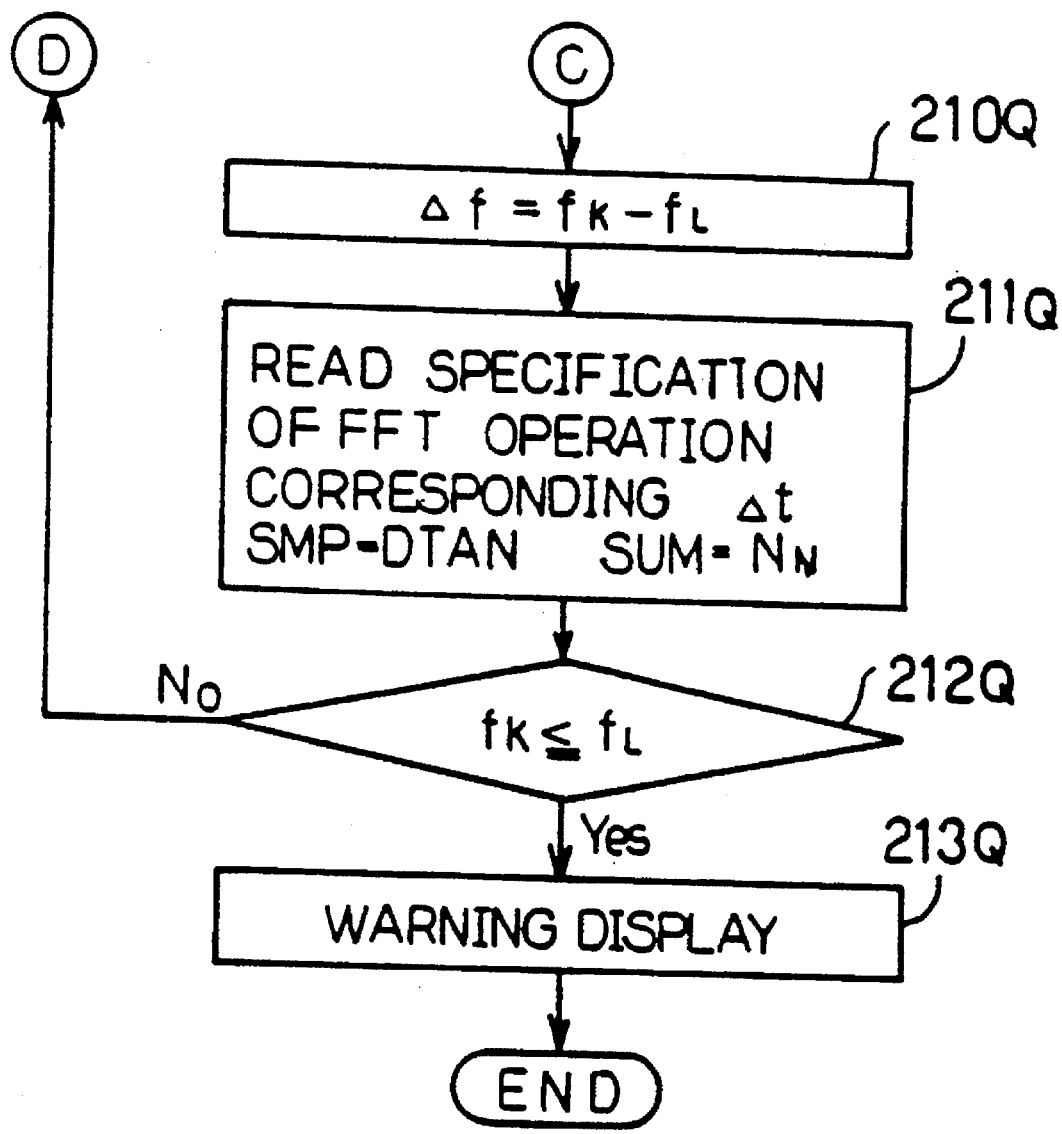
FIG. 45 is a flowchart illustrating a second portion of the principle of the process of the seventeenth embodiment.
Figure 46:
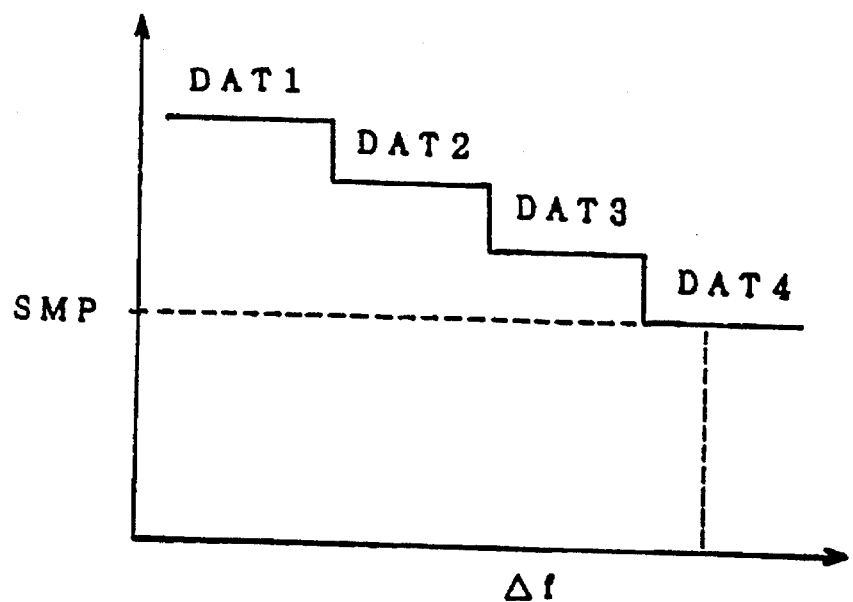
FIG. 46 is a characteristic chart showing a relationship of the number of data (SMP) in relation to an difference $\Delta f$ between a resonance frequency $f_k$ and a discriminated value $f_L$.

In other words, the difference $\Delta f$ of resonance frequency $f_K$ is related to both the number of data (SMP) shown in FIG. 45, and to the number of data (SUM) shown in FIG. 46, where each map is preliminarily stored in ECU 4. Therefore, values corresponding to SMP and SUM are determined on the basis of the FFT operation result.

Consequently, the number of levels for specification values of the FFT operation are increased, and further improvements in tire air pressure detecting precision are achieved.

Figure 44:
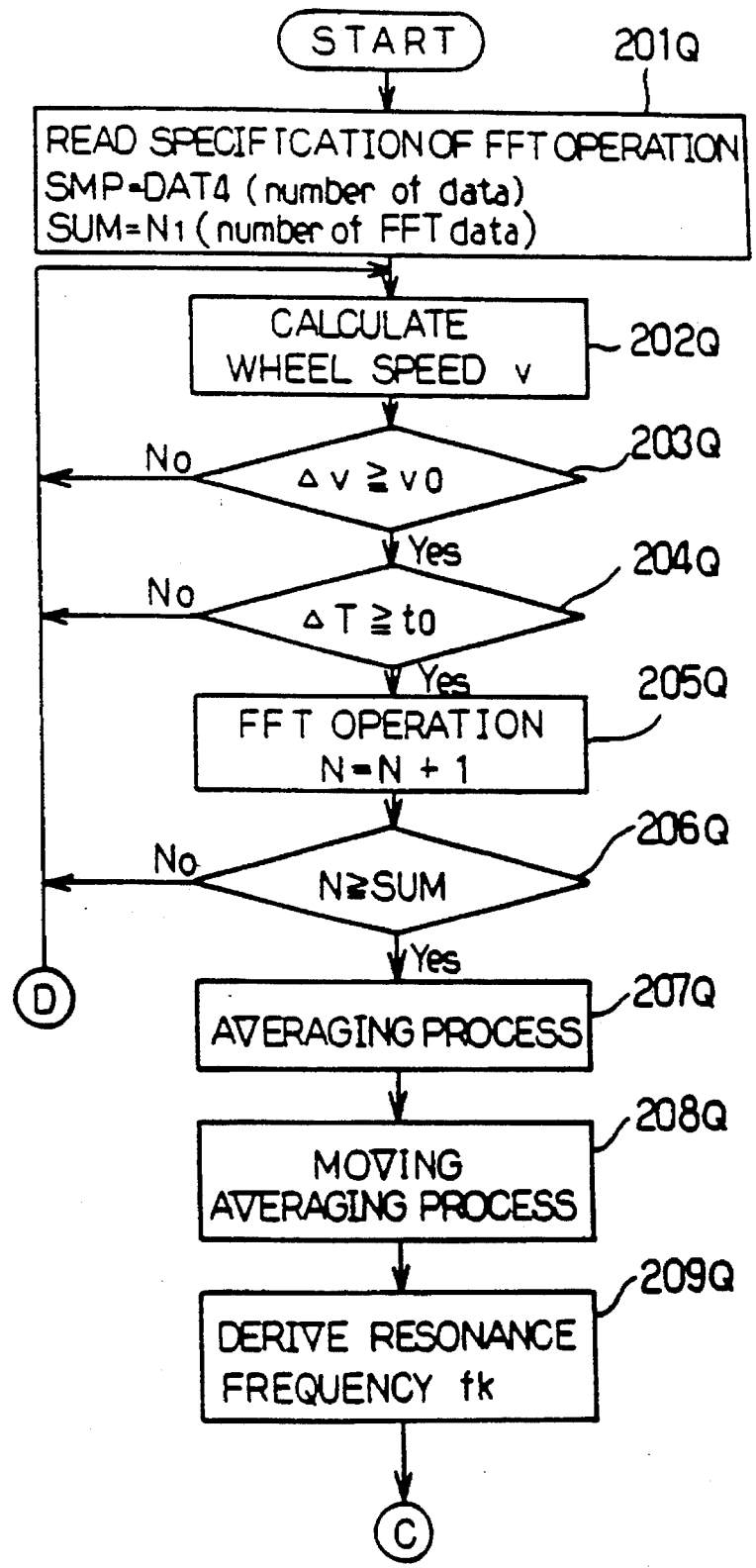
FIG. 44 is a flowchart illustrating a first portion of the principle of the process of the seventeenth embodiment.

The foregoing process is illustrated in the flowchart shown by FIGS. 44 and 45. In this flowchart, steps 112P–114P of the sixteenth embodiment are replaced by step 211Q of the present embodiment.

Figure 47:
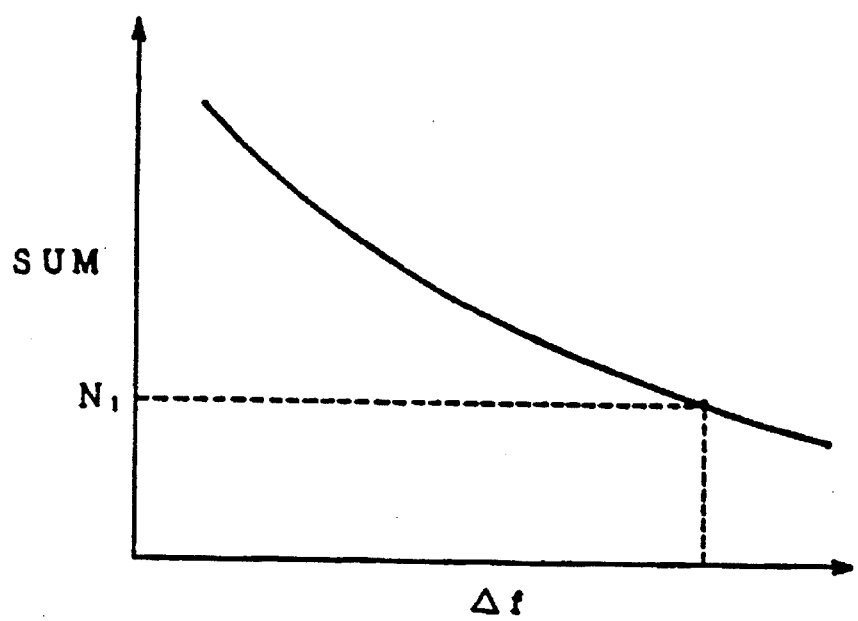
FIG. 47 is a characteristic chart showing a relationship of the number of an averaging process (SUM) with respect to a difference $\Delta f$ between a resonance frequency $f_k$ and a discriminated value $f_L$.

Accordingly, at step 211Q, the specification of the FFT operation is updated with values of SMP and SUM based on $\Delta f$ which was derived in step 210Q, where SMP is obtained from the map of FIG. 46 and where SUM is obtained from the map of FIG. 47. These values are then used to control the FFT operation as described with respect to the sixteenth embodiment.

It should be noted that, similar to step 101P of the sixteenth embodiment, step 201Q reads out the FFT operation specification values which result in the lowest detecting precision. For instance, the lowest value for SMP is shown as DAT4 in FIG. 46, and the lowest value for SUM is shown as $N_i$ in FIG. 47.

The eighteenth embodiment is directed at decreasing the response time for air pressure detection by decreasing FFT operation time. Thus, the alarm may be quickly engaged when the tire air pressure is decreased in the acceleration state. This becomes particularly important when tire air pressure changes rapidly, such as when entering highways and the like.

Figure 48:
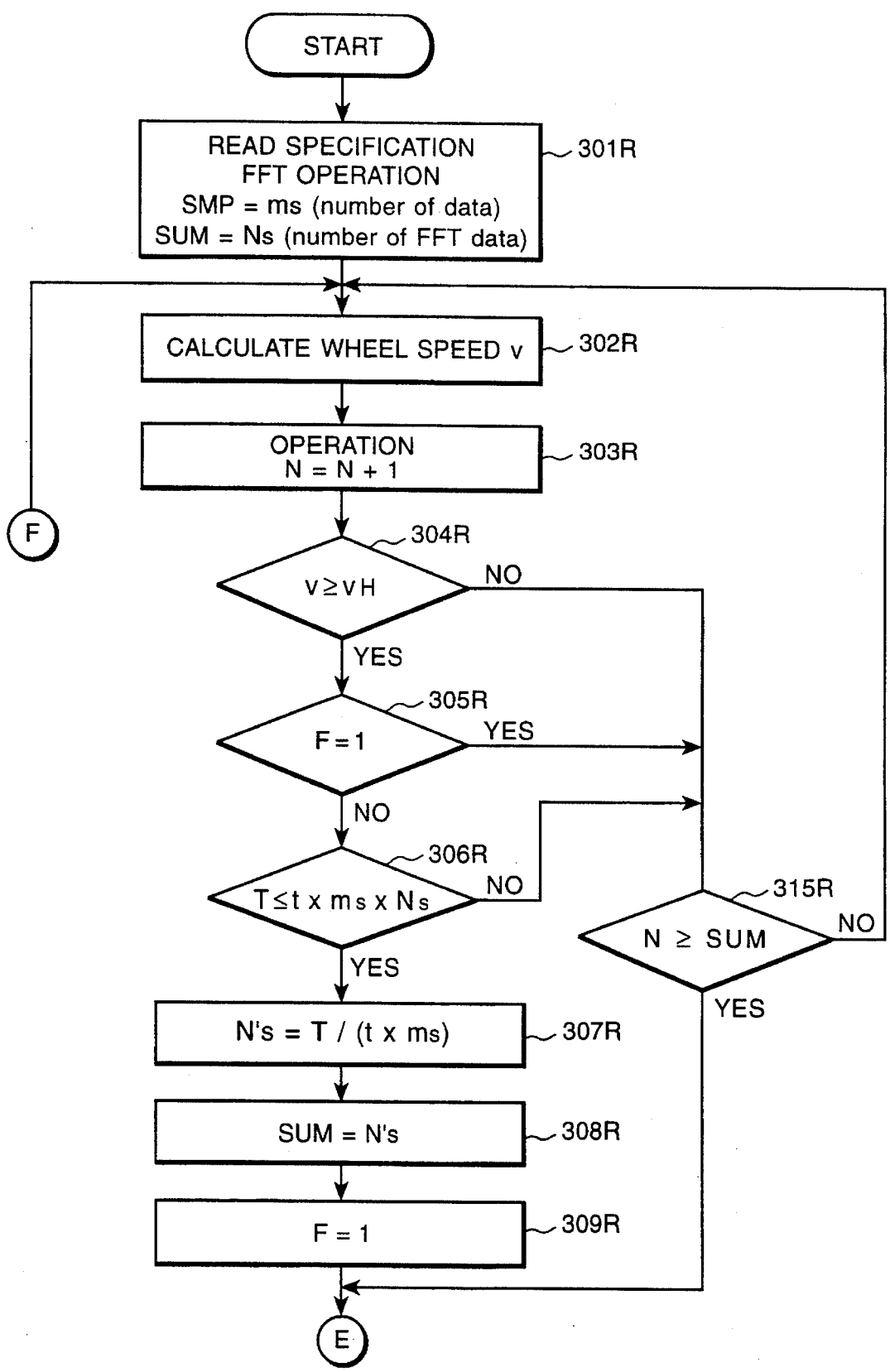
FIG. 48 is a flowchart showing a first portion of the principle of the process in the eighteenth embodiment.
Figure 49:
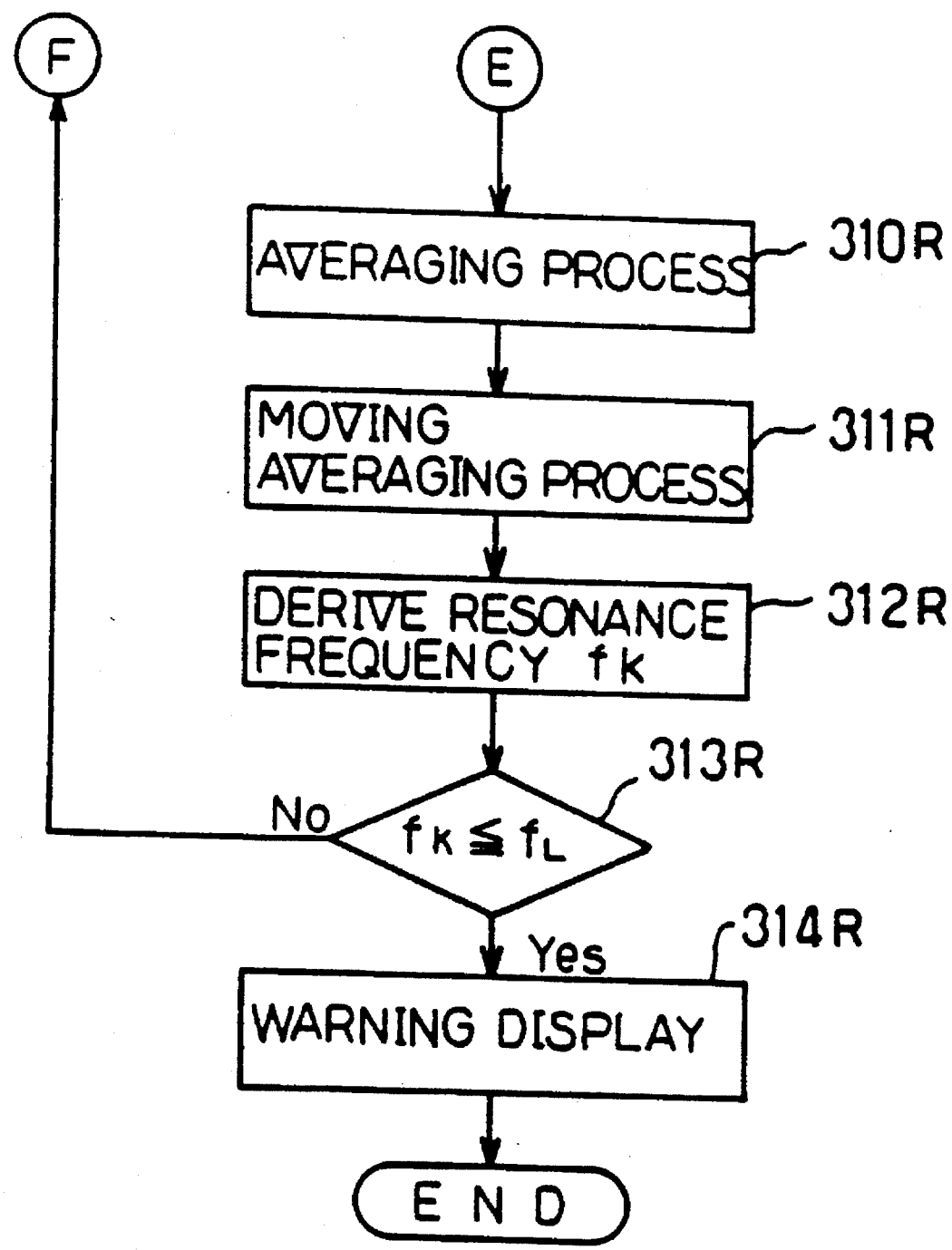
FIG. 49 is a flowchart showing a second portion of the principle of the process in the eighteenth embodiment.

The eighteenth embodiment will be explained with reference to the flowcharts of FIGS. 48 and 49.

At steps 301R and 302R, the initial specification values for the FFT operation are read out and wheel speed v is calculated. At step 303R, the FFT operation and integration of the number of operation cycles are performed.

Then, at step 304R, vehicle speed V and predetermined value $V_H$ are compared. If V is greater than, or equal to, $V_H$, the process is advanced to step 305R, where the status of flag F is checked. Because flag F is adapted to be reset only in response to turning OFF of the ignition, the process is advanced to step 306R only after the first status check.

At step 306R, the period (T) in which vehicle speed V reaches set value $V_H$, is compared to a calculated period for performing an FFT operation using the initial specification values. Specifically, the period for performing an FFT operation using the initial specification values is calculated as $t \times m_s \times N_s$, where t is a sampling period, $m_s$ is number of data and $N_s$ is the number of FFT data.

The process is advanced to step 307R when period T is less than, or equal to, the operational period, because this condition indicates that the period taken to reach set value $V_H$ was shorter than the FFT operation period.

Normally, such cases frequently appear during an acceleration state before entry into high speed traveling. Accordingly, if the tire air pressure is low, the FFT operation must be quickly processed to generate a timely alarm indicating the state of low tire air pressure.

Therefore, at step 307R, a possible number $N_s'$ (truncated at radix point) is derived which corresponds to the maximum number of FFT operation cycles per period T. Then, at step 308R, the number of the FFT data (SUM) is set equal to $N_s'$.

Flag F is set to "1" at step 309R, the averaging process is performed at step 310R, the moving averaging process is performed at step 311R, and resonance frequency $f_K$ is calculated at step 312R, where resonance frequency $f_K$ is performed based on the foregoing number $N_s'$ of the averaging process cycles.

Steps 313R and 314R are then performed to determine if the tire air pressure has been decreased below lower limit $f_L$ and to display an alarm if it has.

Note that when V is less than $V_H$ at step 304R, period T is greater than the calculated operational period at step 306R, or when the flag is set equal to "1" in step 305R then the number of operation cycles is compared to predetermined specification value SUM at step 315R. If the number of operation cycles are greater than, or equal to SUM, then the process is advanced to the averaging process of step 310R.

However, if either $f_K$ is greater than $f_L$ at step 313R, or the number of operation cycles is less than SUM, then the tire air pressure detecting processes after step 301R are again performed.

It should also be noted that while the present embodiment varies the specification values of the FFT operation based on the vehicle speed V, it is possible to vary the specification according to a vehicle speed variation rate.

Figure 50:
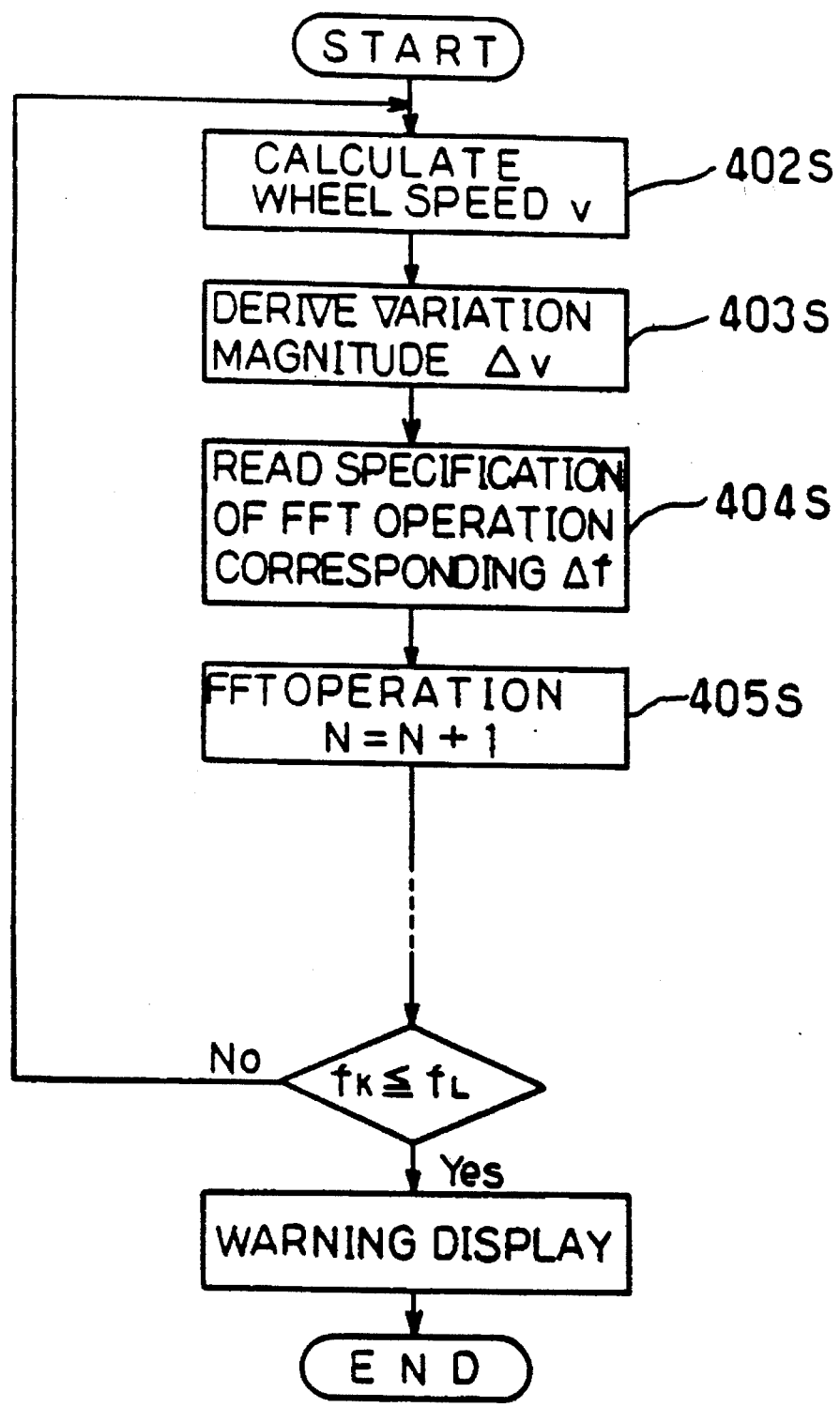
FIG. 50 is a flowchart showing a principle of the process in the nineteenth embodiment.
Figure 51A:
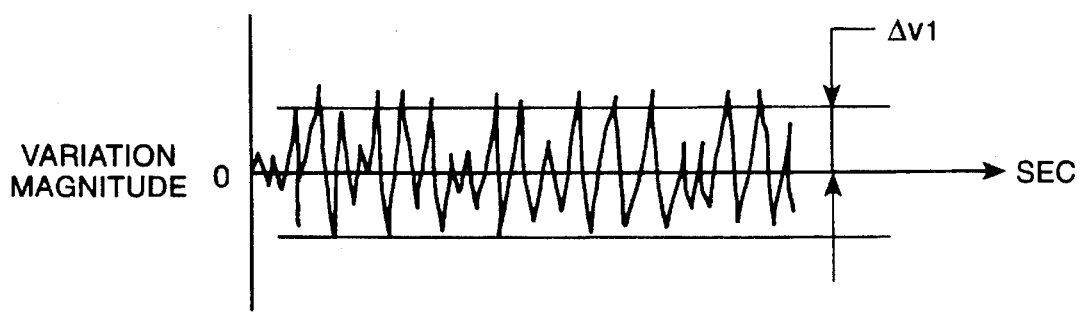
FIGS. 51(a) and 51(b) are charts showing waveforms of the vehicle speed in a time sequence calculated by ECU.
Figure 51B:
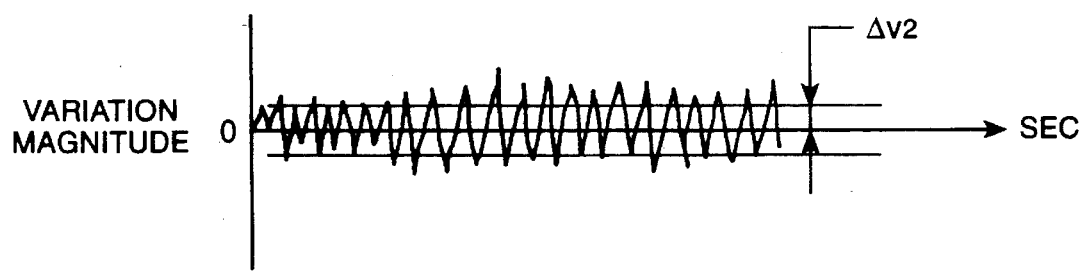

The nineteenth embodiment will be explained with reference to the flowchart of FIG. 50 and waveforms of FIGS. 51, 52 and 53. FIGS. 51(a) and 51(b) show waveforms in a time sequence of vehicle speed v which is calculated by ECU 4. It should be noted that in the time-based waveform, a low frequency signal component of the wheel speed signal is isolated by a filter. As shown in FIGS. 51(a) and (b), on a relatively smooth road, the variation magnitude $\Delta v$ of the wheel speed is small, and on a rough road, the variation magnitude becomes large.

Resonance frequency $f_K$ is adapted to detect the resonation phenomenon of the unsprung mass. It should be noted that on rough roads, resonation appears with a large magnitude, thereby permitting easy detection of resonance frequency $f_K$ using various specification values. Accordingly, this embodiment allows for quick detection of decreases in tire air pressure while traveling on non-paved roads, or during off-road traveling.

Conversely, on smooth roads, resonation appears with a small magnitude, thereby requiring increased specification values for higher detection precision.

Figure 52:
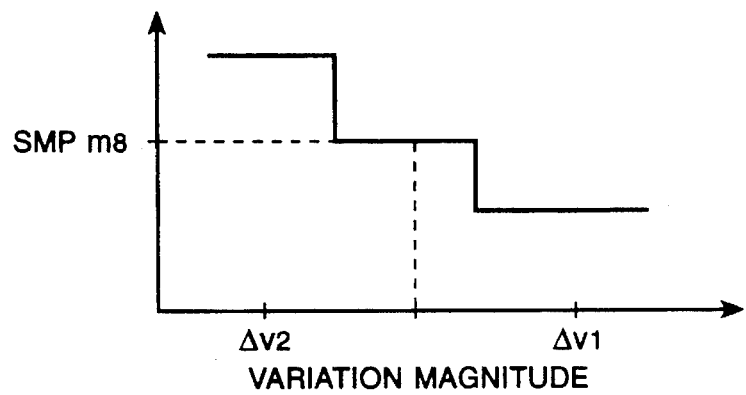
FIG. 52 is a characteristic chart showing a relationship between a wheel speed variation magnitude $\Delta v$ and the number of data (SMP)
Figure 53:
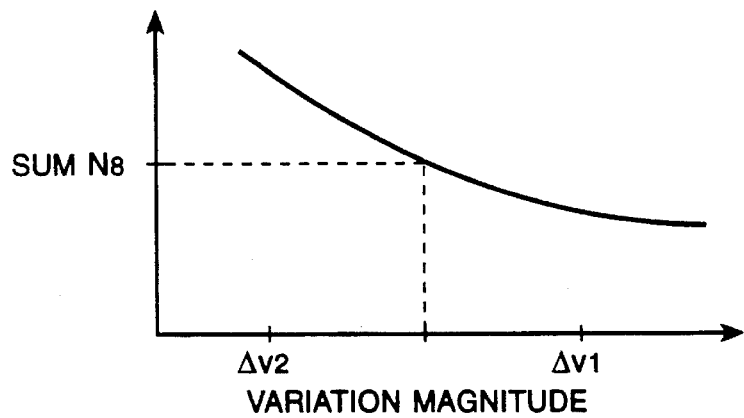
FIG. 53 is a characteristic chart showing a relationship between a wheel speed variation magnitude, $\Delta v$, and the number of the averaging processes (SUM)

FIG. 52 shows a map of SMP relative to variation magnitude $\Delta v$ of the wheel speed, and FIG. 53 shows a map of SON relative to the variation magnitude $\Delta v$ of the wheel speed. Both maps are stored in ECU 4.

Wheel speed v is calculated and variation magnitude $\Delta v$ of the wheel speed is derived in steps 402S and 403S, respectively. Using preliminarily set wheel speed variation magnitudes $\Delta v_1$ and $\Delta v_2$, the road surface is evaluated as rough or smooth.

Then, at step 404S, the specification of the FFT operation is updated with values of SMP and SUM based on the value for $\Delta v$ derived in step 403S, where SMP is obtained from the map of FIG. 52 and SUM is obtained from the map of FIG. 53. These values are then used to control the FFT operation as described with respect to the sixteenth embodiment.

It should be noted that multiple wheel speed variation magnitudes $\Delta v_1$ and $\Delta v_2$, which are used for discrimination between the rough road and the smooth road, are simultaneously set depending upon the road surface condition.

The twentieth embodiment is directed at compensating for temperature changes within the tire.

Figure 54:
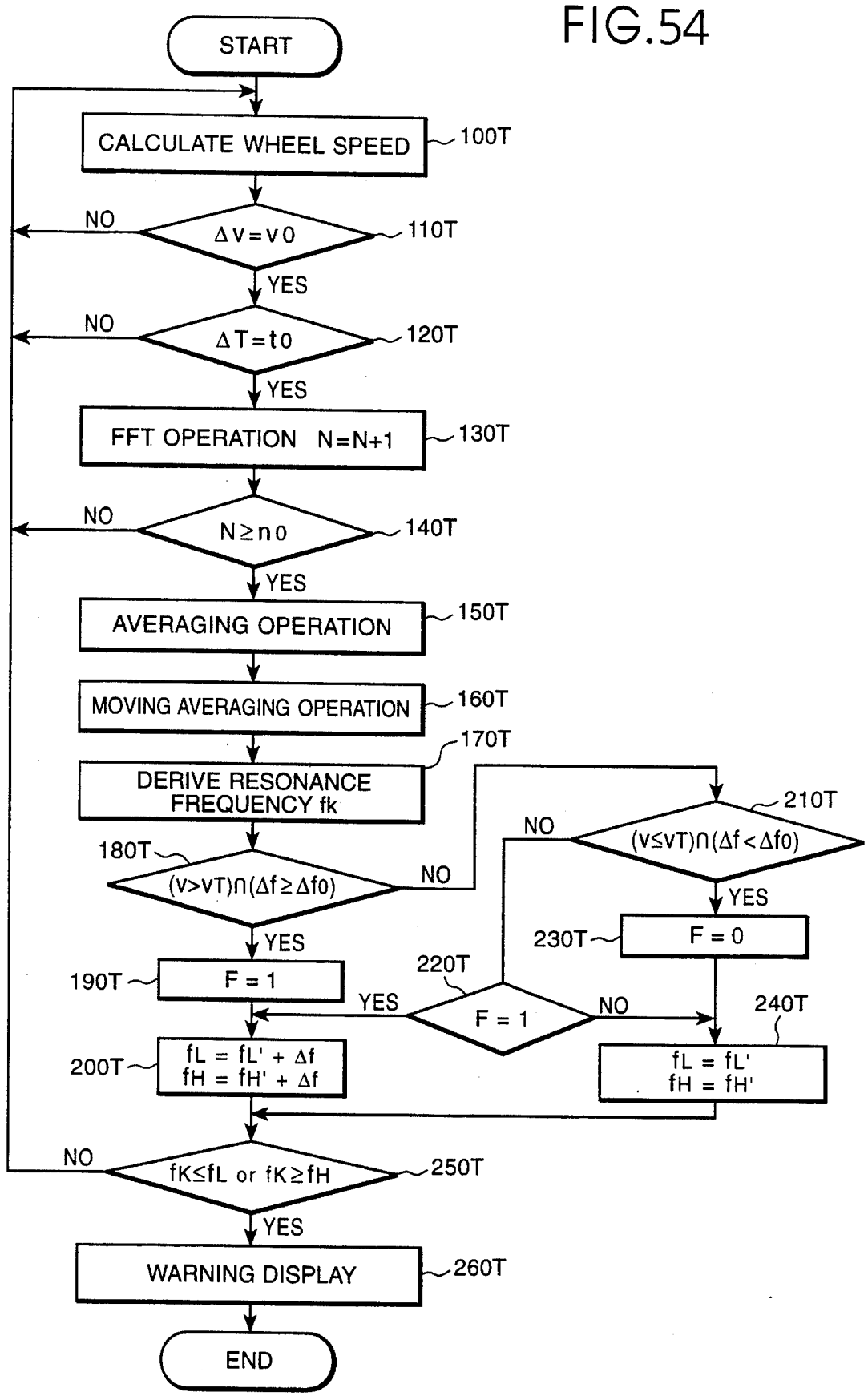
FIG. 54 is a flowchart showing the process of the electronic control unit of the twentieth embodiment.

The process of this embodiment is shown in FIG. 54, where steps 100T–170T are similar to those of the foregoing embodiments. However, when the process at step 170T is executed, initially calculated resonance frequency $f_K$ is stored as an initial resonance frequency, $f_S$. When a tire is heated, the air in the tire is expanded, and the air pressure within the tire increases. Because heating results in changes in air pressure during a state of constant air volume, it is not possible to accurately detect tire air pressure based solely on the actual amount of the air in the tire.

Therefore, through steps 180T–240T, unsprung mass resonance frequency upper limit value $f_H$ and unsprung mass resonance frequency lower limit value $f_L$ are corrected so that accurate detection of the tire air pressure may be performed irrespective of tire heating.

At step 180T, wheel speed v is compared to predetermined wheel speed $V_T$, and rising difference $\Delta f$ ($f_K - f_s$) is compared to predetermined difference $\Delta f_0$. It should be noted that predetermined difference $\Delta f_0$ is preliminarily set based on initial resonance frequency $f_s$ to account for heating characteristics of the tire.

When wheel speed v exceeds predetermined speed $v_T$, and rising difference $\Delta f$ is equal to, or greater than, predetermined difference $\Delta f_0$, the vehicle is determined to be running at high speed and the resonance frequency is increased. Accordingly, the tire can be regarded as heated. For this reason, the process is advanced to step 190T where flag F is set equal to "1", thereby indicating that $f_H$ and $f_L$ are in a correction state. Next, the process is advanced to step 200T to correct $f_L$ and $f_H$ due to the temperature change. Namely, $f_L$ and $f_H$ are corrected through the addition of rising difference $\Delta f$ to each.

Otherwise, the process is advanced to step 180T to step 210T where wheel speed v is compared to predetermined speed $v_T$, and rising difference $\Delta f$ is compared to predetermined difference $f_0$. If wheel speed v is equal to, or lower than, predetermined speed $v_T$, while rising difference $\Delta f$ is smaller than predetermined difference $\Delta f_0$, the vehicle is determined to be running at a low speed resulting in decreased resonance frequency. Accordingly, the tire can be regarded as not heating so that the process is advanced to step 230T where flag F is reset to "0", thereby indicating that the correction state is no longer active. At step 240T, unsprung mass resonance frequency upper limit value $f_H$ is set equal to unsprung mass resonance frequency upper limit value $f_H'$, and unsprung mass resonance frequency lower limit value $f_L$ is set equal to unsprung mass resonance frequency lower limit value $f_L'$.

However, if, in step 210T, wheel speed v is higher than predetermined speed $v_T$, or if rising difference $\Delta f$ is larger than predetermined difference $f_0$, the temperature of the tire becomes unclear. Therefore, in the present embodiment, the preceding values for $f_L$ and $f_H$ are maintained without correction.

Then, the process is advanced to step 220T to check the status of flag F, thereby determining the correction state. If in correction state (F=1), the process is advanced to step 200T to continue correction. On the other hand, if not in correction state (F=0), the process is advanced to step 240T where no correction is performed.

The following examples will demonstrate why the above correction is dependent upon the correction state flag. When the vehicle speed V exceeds predetermined speed $V_T$, rising difference $\Delta f$ is smaller than predetermined difference $f_0$, and the correction state is enabled (F=1), it can be determined that rising difference $\Delta f$ is temporarily lowered. However, when not in correction (F=0), the same situation is regarded as being caused by an increase in wheel speed due to temporary acceleration of the vehicle.

Figure 55:
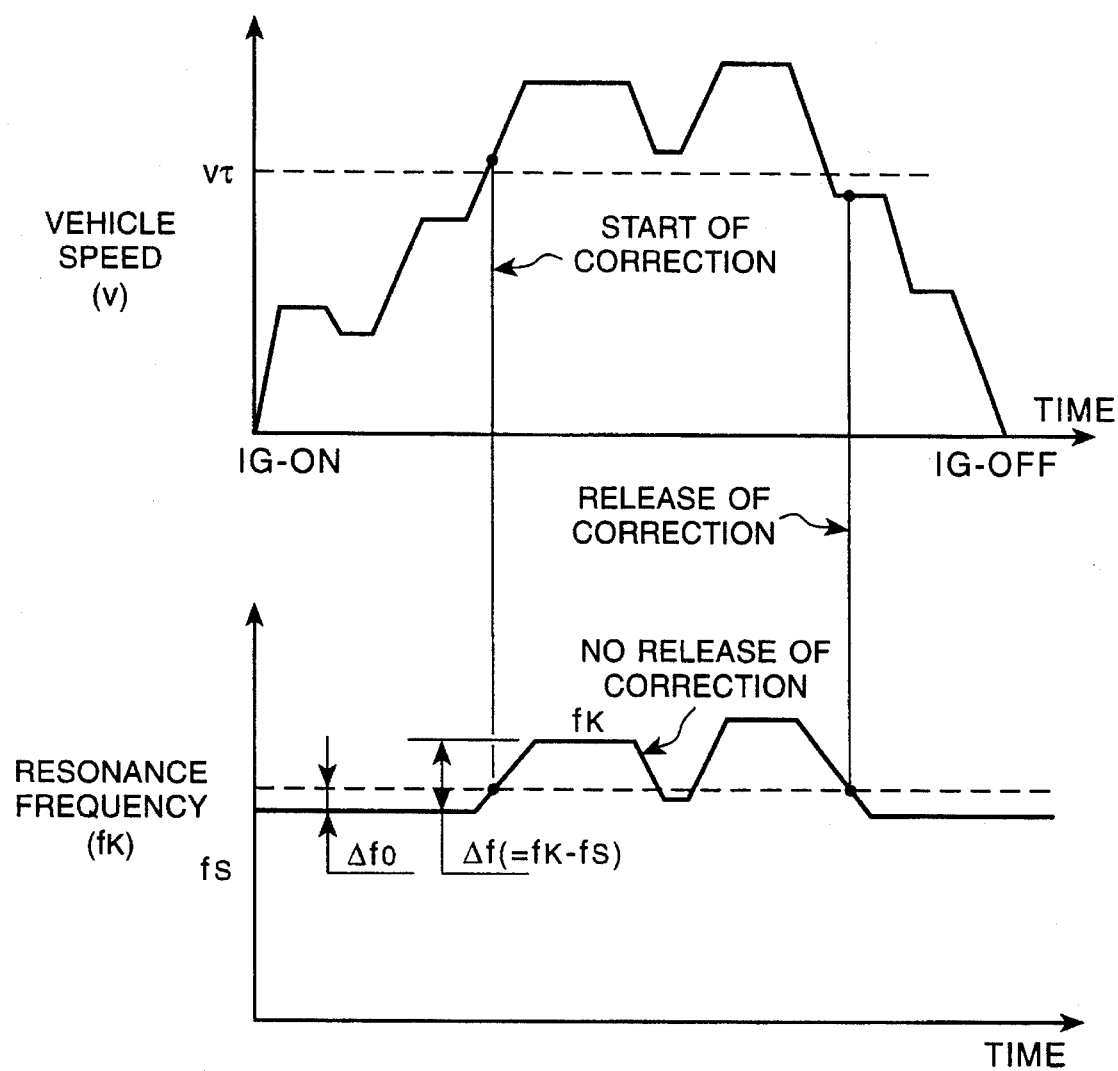
FIG. 55 is a timing chart showing a relationship between the wheel speed and resonance frequency in the twentieth embodiment.

A timing chart of the processes of steps 180T–240T, set forth above is shown in FIG. 55. As illustrated in this timing chart, when wheel speed v becomes higher than predetermined speed $v_T$, and rising difference $\Delta f$ becomes greater than predetermined difference $\Delta f_0$, correction is initiated. However, once initiated, correction is not released until wheel speed v becomes lower than predetermined speed $v_T$, and rising difference $\Delta f$ becomes smaller than predetermined difference $\Delta f_0$.

Additionally, note that rising difference $\Delta f$ can be an initially set value instead of the derived value ($f_K - f_s$).

Furthermore, although the foregoing embodiment performs correction of both unsprung mass resonance frequency upper limit value $f_H$ and unsprung mass resonance frequency lower limit value $f_L$ for each wheel independently, it may be possible to perform correction for both values simultaneously on all wheels while rising difference $\Delta f$ exceeds the predetermined difference $\Delta f_0$.

For instance, similar to the process of step 200T, rising difference $\Delta f$ may be added to both $f_H$ and $f_L$ which correspond to the wheel in which rising difference $\Delta f$ exceeds predetermined difference $\Delta f_0$. Alternatively, for the wheels in which rising difference $\Delta f$ does not exceed predetermined difference $\Delta f_0$, the correction may be performed with an average value, $\Delta f_{ave}$, of the rising differences of the wheel $\Delta f$.

Until the predetermined vehicle speed is reached, the initial resonance frequency $f_s$ may be determined with either an average value of resonance frequencies derived, or, with the final value of resonance frequencies derived, instead of setting it equal to $f_K$.

It should be noted that while the above-mentioned embodiment shows an example of detecting decreases in tire air pressure based only on the resonance frequency of the unsprung mass of the vehicle in the longitudinal direction, it is possible to detect decreases in the tire air pressure based only on the resonance frequency in the vertical direction, or, in the alternative based on both of the resonance frequencies in the vertical and longitudinal directions.

Similar to the twentieth embodiment, the twenty-first embodiment is directed at correcting unsprung mass resonance frequency upper limit value $f_H$ and unsprung mass resonance frequency lower limit value $f_L$. However, in addition to the effects gained in the twentieth embodiment, the twenty-first embodiment is directed at preventing standing wave phenomenon or bursting which are caused by increased vehicle speeds.

Typically, a tire is rated for a range of vehicle speeds depending upon its grade. Thus, the minimum air pressure ($P_0$) and maximum air pressure ($P_z$) are based on the vehicle speed and are stored as reference values.

However, when the vehicle speed is increased while the tire air pressure is low, bursting or standing wave phenomenon may occur. To prevent this, the overall allowable tire pressure range is increased by raising both $P_0$ and $P_z$.

Accordingly, the twenty-first embodiment is directed at modifying initial unsprung mass resonance frequency upper limit value $f_H''$ and initial unsprung mass resonance frequency lower limit value $f_L''$ based on the vehicle speed.

Figure 56:
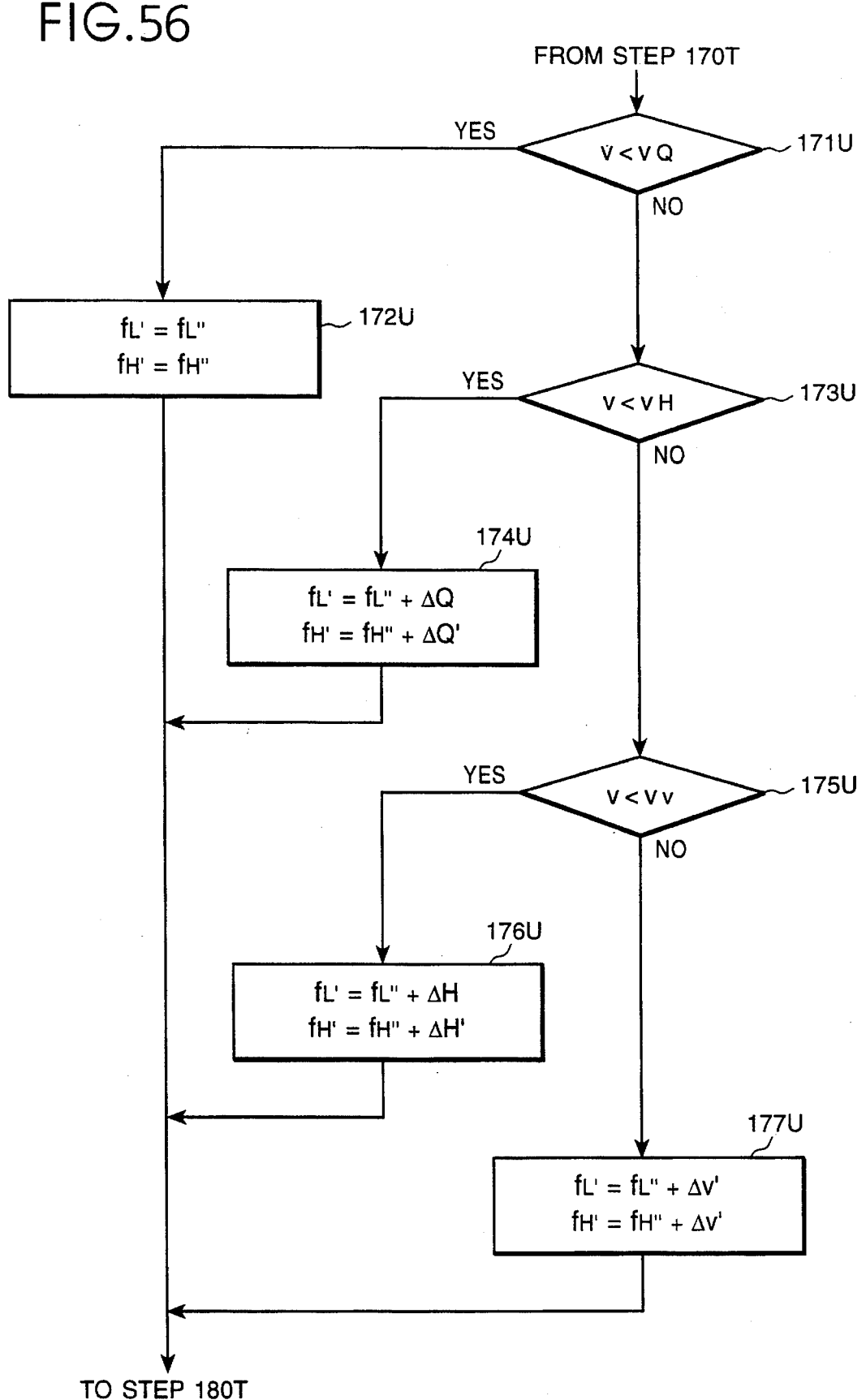
FIG. 56 is a flowchart showing the principle of the process of the twenty-first embodiment.

Accordingly, in the twenty-first embodiment, steps 171U–177U of FIG. 56 are added between steps 170T and 180T of the twentieth embodiment.

At step 171U, wheel speed v is compared with first speed $v_Q$.

Wheel speed v is not considered excessive when it does not exceed first speed $v_Q$, and correction is unnecessary. When this is the case, the process is advanced to step 172U, where the initial unsprung mass resonance frequency upper limit value $f_H''$ is set equal to unsprung mass resonance frequency upper limit value $f_H'$, and unsprung mass resonance frequency lower limit value $f_L''$ is set equal to unsprung mass resonance frequency lower limit value $f_L'$.

However, if wheel speed v exceeds the first speed $v_Q$ in step 171U, the process is advanced to step 173U to compare wheel speed v to a second value, $v_H$.

If wheel speed v does not exceed second value $v_H$, the process is advanced to step 174U to perform correction. Namely, initial unsprung mass resonance frequency upper limit value $f_H''$ is corrected through the addition of $\Delta Q'$ to obtain unsprung mass resonance frequency upper limit value $f_H'$, and initial unsprung mass resonance frequency lower limit value $f_L''$ is corrected through the addition of correction value $\Delta Q$ to obtain unsprung mass resonance frequency lower limit value $f_L'$.

However, if wheel speed v exceeds second speed $v_H$ in step 173U, the process is advanced to step 175U to compare wheel speed v to a third value, $v_V$.

If wheel speed v does not exceed third speed $v_V$ at step 175U, unsprung mass resonance frequency upper limit value $f_H'$ and unsprung mass resonance frequency lower limit value $f_L'$ are corrected before the heating dependent correction by adding correction value $\Delta H'$ to unsprung mass resonance frequency upper limit value $f_H''$, and by adding the correction value $\Delta H$ to unsprung mass resonance frequency lower limit value $f_L''$.

However, if the vehicle speed exceeds the third speed $v_V$, the process is advanced to step 177U to derive unsprung mass resonance frequency upper limit value $f_H'$ and unsprung mass resonance frequency lower limit value $f_L'$ through the addition of correction value $\Delta v'$ to the unsprung mass resonance frequency upper limit value $f_H''$ and correction value $\Delta v$ to the unsprung mass resonance frequency lower limit value $f_L''$.

Figure 57A:
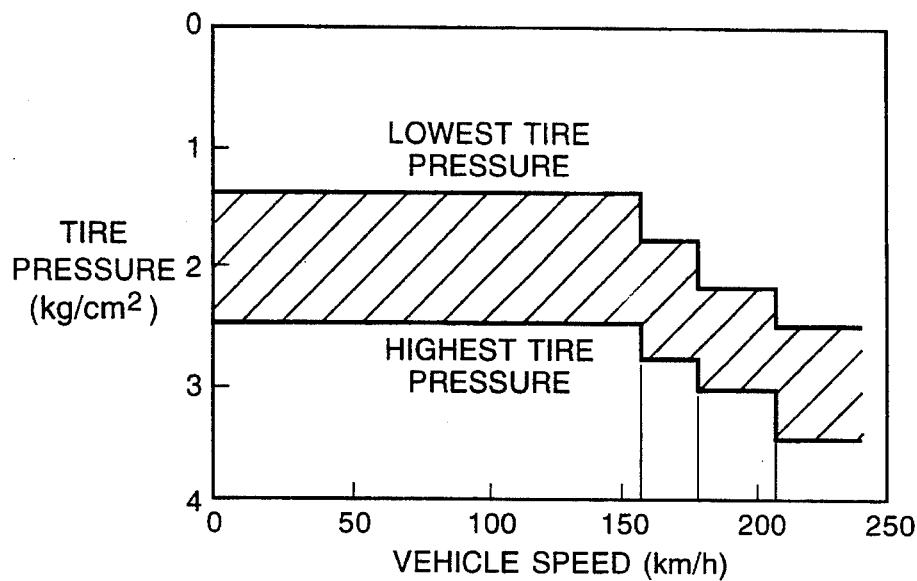
FIGS. 57(a) and 57(b) are characteristic charts showing a relationship between the wheel speed, the tire air pressure and resonance frequency of the unsprung mass.
Figure 57B:
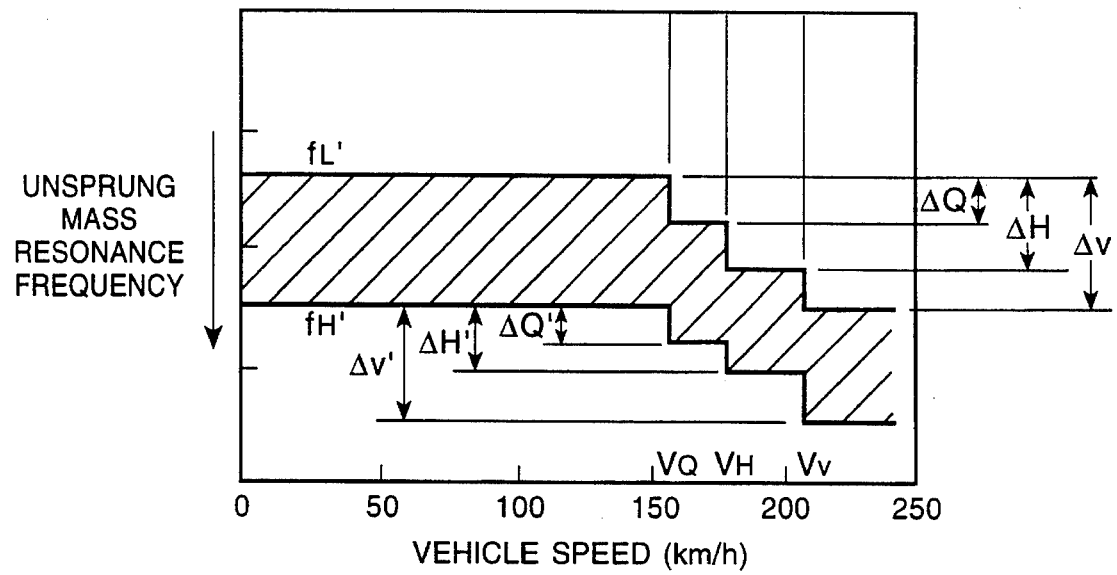

The result of the foregoing processes of steps 171U–177U may be illustrated as shown in FIGS. 57(a) and 57(b). When wheel speed v is lower than predetermined speed $v_Q$, initial unsprung mass resonance frequency upper limit value $f_H''$ is set equal to unsprung mass resonance frequency upper limit value $f_H'$, and initial unsprung mass resonance frequency lower limit value $f_L''$ is set equal to unsprung mass resonance frequency lower limit value $f_L'$. However, when wheel speed v is increased, $f_H''$ and $f_L''$ are each corrected so that $f_H'$ and $f_L'$ are gradually increased.

Correspondingly, as shown in FIG. 57(a), allowable lower limit value $P_0$ and allowable upper limit value $P_z$ are also increased to raise the overall allowable range of the tire air pressure, thereby preventing the bursting or the standing wave phenomenon.

The above-mentioned embodiments are established in view of any single type of tire. However, if any of the tires are different in type, the rating for tire air pressure may also be different. Therefore, the reference value (unsprung mass resonance frequency) for determining decreases in tire air pressure may fluctuate corresponding to tire type.

Figure 58:
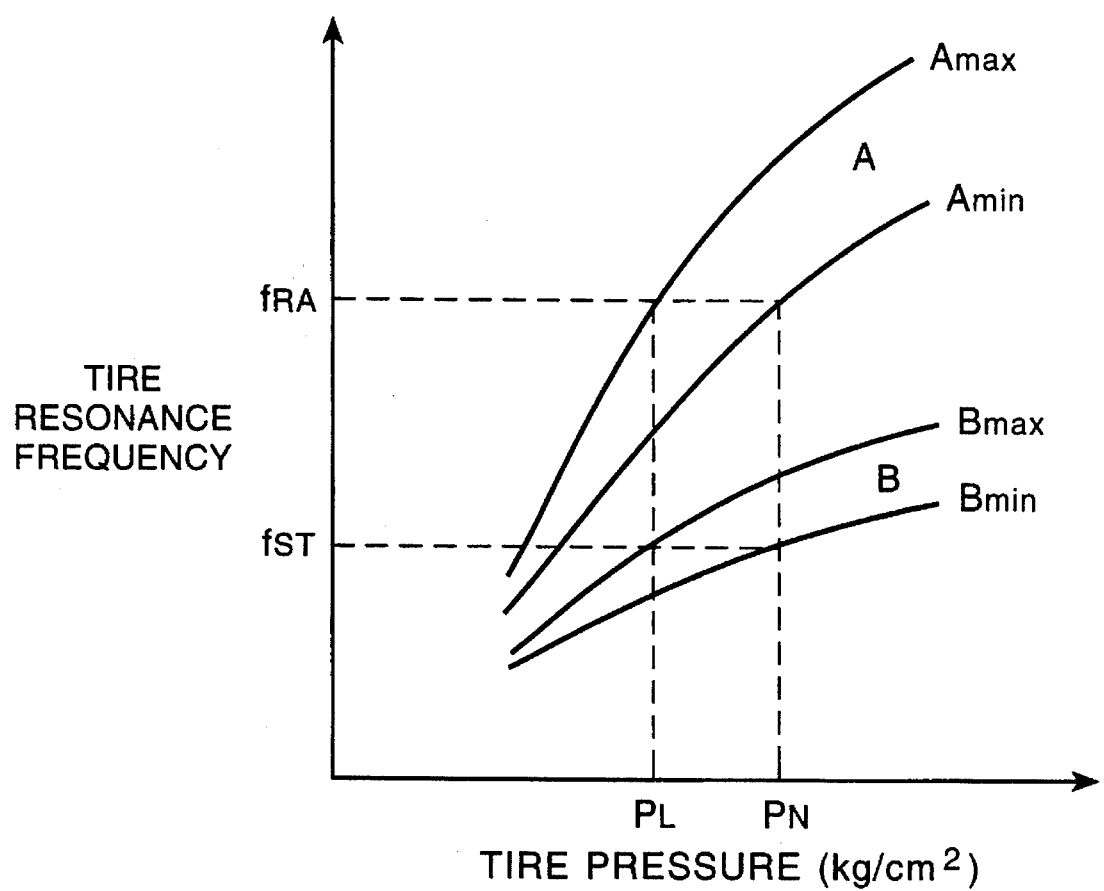
FIG. 58 is a characteristic chart showing a relationship between the tire pressure of the radial tire and stadless tire and resonance frequency in the unsprung mass.

For this reason, the reference value for discriminating abnormalities in the tire air pressure must be determined depending upon the type of tire used. Results of a study made by the inventors indicate that there are definite differences in the tire air pressure, also known as unsprung mass resonance frequency characteristics, between a normal radial tire and a stadless tire (winter tire), as shown in FIG. 58.

Specifically, the fluctuation range of the unsprung mass resonance frequency of the normal radial tire (hereinafter simply referred to as radial tire) is designated by reference A. This range is higher than the fluctuation range of the unsprung mass resonance frequency of the stadless tire, designated by reference B. Note that this difference may depend either on the tire manufacture (brand), or on the weight of the wheel to which the tire is equipped.

$A_{max}$ and $B_{max}$ show the upper limit characteristics of the fluctuation in the case where the lightest wheel is employed, and $A_{min}$ and $B_{min}$ show the lower limit characteristics of the fluctuation in the case where the heaviest wheel is employed. The difference between the maximum and minimum values is a result of the proportional relationship of unsprung mass resonance frequency f to $\sqrt{k/m}$ (where m is an unsprung mass weight, k is a spring constant of the tire).

Assuming that the air pressure limits for ($kg/cm^2$) alarm due to change in tire air pressure are defined by lower limit $P_L$ and upper limit $P_H$, then the reference resonance frequency (unsprung mass resonance frequency) $f_L$ for determining the radial tire air pressure becomes $f_{RA}$. Similarly, the reference resonance frequency $f_L$ of the stadless tire becomes $f_{ST}$. In this case, the minimum air pressure, as defined in JIS standard (1.4 kg/cm2) can be used for $P_L$, and the maximum air pressure, as defined in JIS standard (2.5 kg/cm2) can be used for $P_H$.

In the twenty-second embodiment, using various combinations of two switches, 6a and 6b, the type of the tires equipped on the two front wheels and two rear wheels can be determined. Then, reference resonance frequencies can be correspondingly set. Therefore, even when the type of the tires are changed, the air pressure condition of the tires can be accurately detected.

Figure 59:
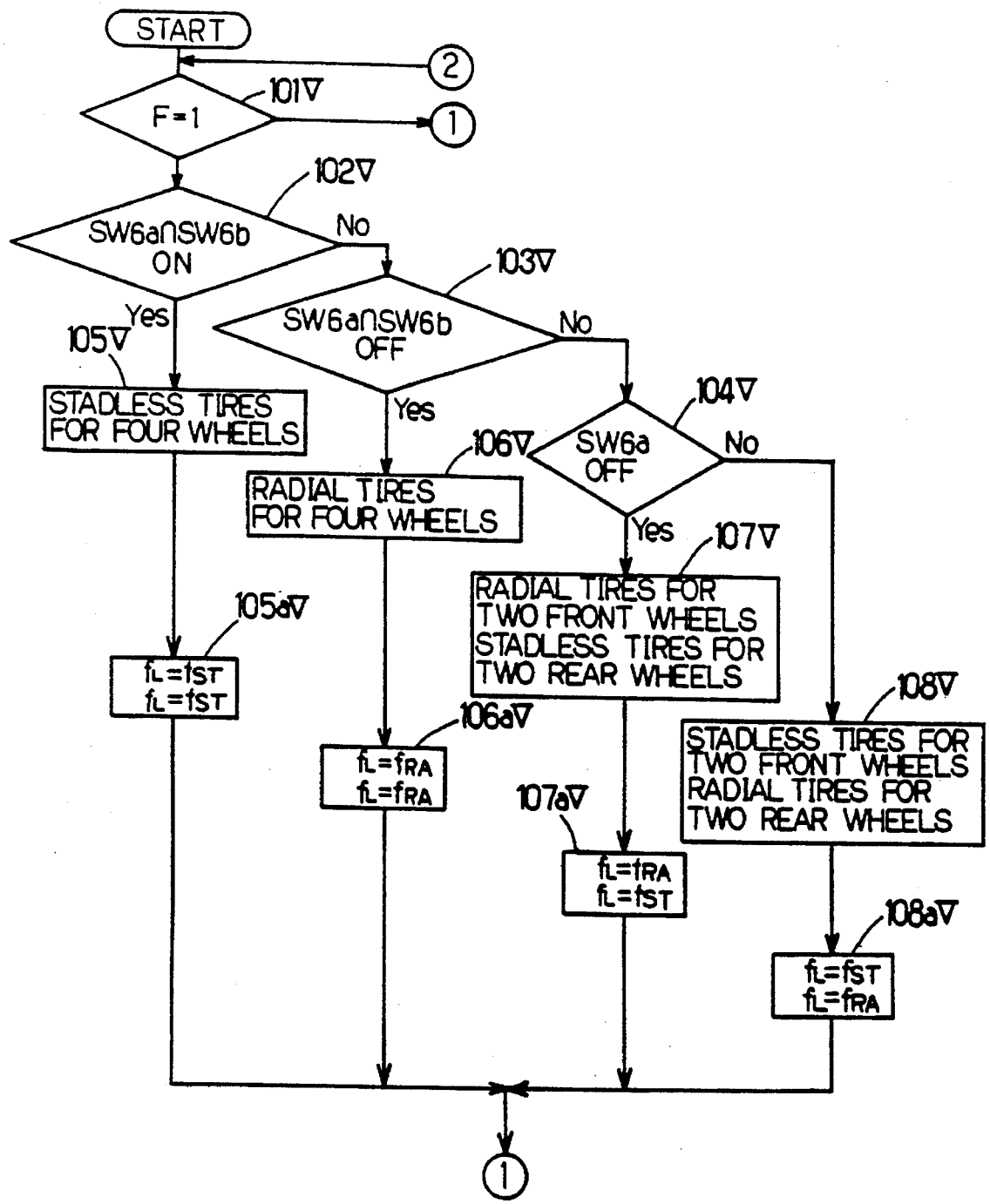
FIG. 59 is a flowchart showing a process of the ECU of the twenty-second embodiment.
Figure 60:
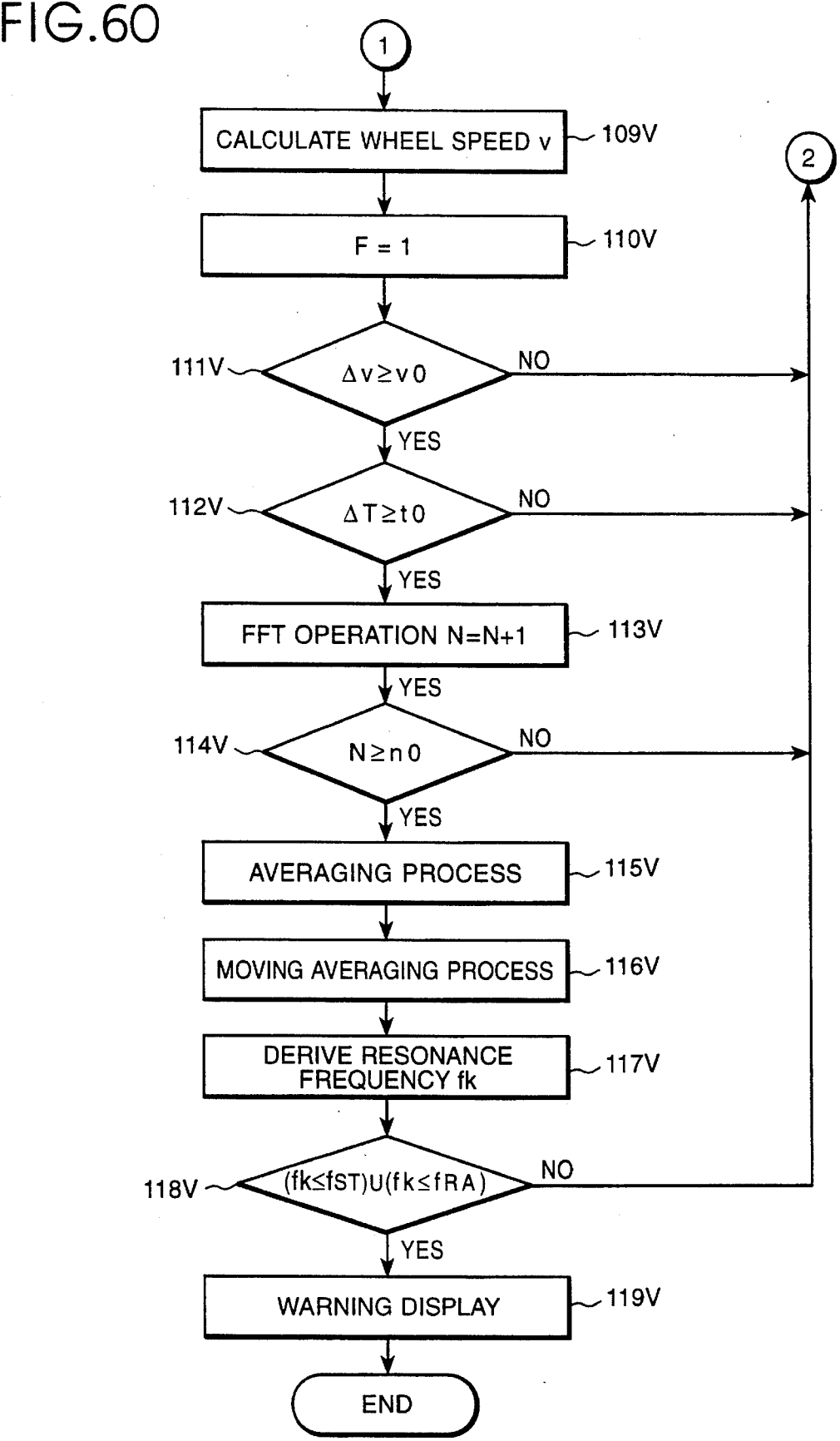
FIG. 60 is a flowchart showing a process of the ECU of the twenty-second embodiment.

An example of the processes performed in the twenty-second embodiment are shown in the flowcharts illustrated by FIGS. 59 and 60.

At step 101V, the status of flag F is checked, where it is reset to "0" only when the ignition switch has been turned OFF. Accordingly, the result of step 101V is negative only immediately after signal processing begins so that the process proceeds to step 102V. Otherwise, the processes of this embodiment are foregone.

At step 102V, determination is made whether both of selection switches, 6a and 6b, are in ON state. If both are in ON state, judgment is made in step 105V that stadless tires are used on all four wheels. Therefore, reference resonance frequency $f_L$ is set equal to $f_{ST}$ for all four wheels at step 105aV.

If both selection switches are not in the ON state at step 102V, the process is advanced to step 103V to determine whether both selection switches 6a and 6b are in the OFF state. If both of the switches are OFF, judgment is made in step 106V that radial tires are used on all four wheels. Therefore, reference resonance frequency $f_L$ is set equal to $f_{RA}$ for all four wheels at step 106aV.

If both selection switches are not in the OFF state, the process is advanced to step 104V. If in step 104V, selection switch 6a is determined to be in the OFF state, selection switch 6b must necessarily be ON from the results of prior tests. If this is the case, the process advances to step 107V, where judgment is made that radial tires are equipped on the two front wheels, and stadless tires are equipped on the two rear wheels. Therefore, reference resonance frequency $f_L$ for the two front wheels is set equal to $f_{RA}$, and reference resonance frequency $f_L$ for the two rear wheels is set equal to $f_{ST}$ in step 107aV.

If in step 104V, selection switch 6a is determined to be in the ON state, judgment is made at step 108V that stadless tires are equipped on the two front wheels, and radial tires are equipped on two rear wheels. Therefore, at step 108aV, resonance frequency $f_L$ for the two front wheels is set equal to $f_{ST}$, and reference resonance frequency $f_L$ for the two rear wheels is set equal to $f_{RA}$.

Consequently, only one portion of the processes described by steps 105V–108V are performed. Further, the processes subsequent to step 108V, illustrated in FIG. 60, are explained with respect to the case where stadless tires are equipped on two front wheels, and radial tires are equipped on two rear wheels.

At steps 109V–117V, similar processes to those of the former embodiments are performed.

However, at step 118V, when derived resonance frequency $f_K$ is lower than, or equal to, reference resonance frequency $f_{ST}$ for the stadless tire, or when $f_K$ is lower than, or equal to, reference resonance frequency $f_{RA}$ for the radial tire, it is determined that the air pressure of at least one tire is below the allowable lower limit value. Thus, the process is advanced to step 119V, where an alarm is displayed to the driver on display portion 5. Otherwise, the process is returned to step 101V.

It should be noted that although the foregoing embodiment employs $f_{ST}$ and $f_{RA}$ as reference resonance frequencies, it is possible to use a difference ($f_{ST0}-f_{KST}$ or $f_{RA0}-f_{KRA}$) between the resonance frequency $f_{ST0}$ or $f_{RA0}$ at the normal air pressure, or to use calculated resonance frequencies $f_{KST}$ and $f_{KRA}$, as reference resonance frequencies.

In the twenty-third embodiment derived resonance frequency $f_K$ is set equal to reference resonance frequency $f_{K0}$ when setting switch 16 is turned on by the driver after a tire changing operation. Therefore, the tire air pressure can be detected with high precision irrespective of the type of new tires used.

Figure 61:
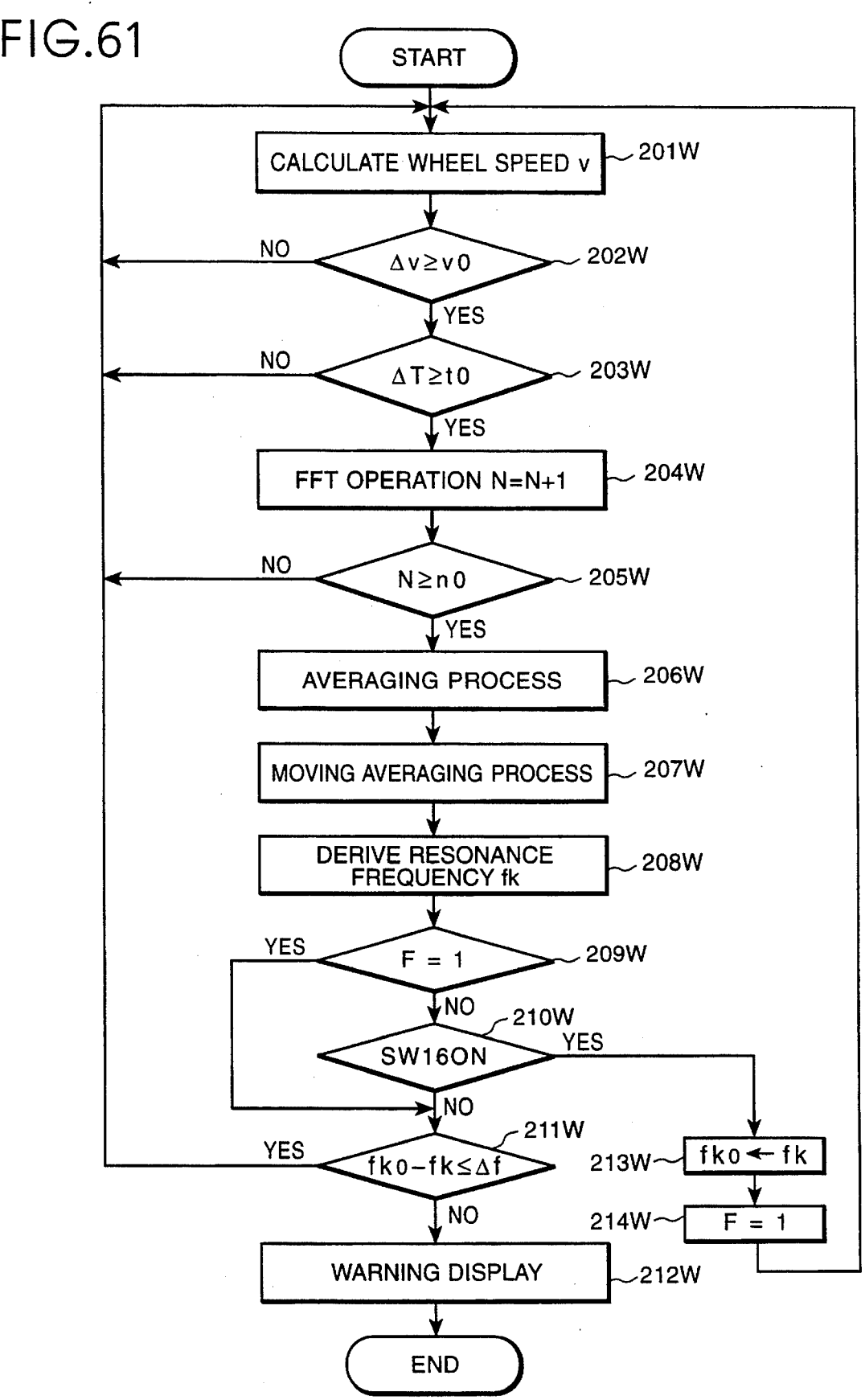
FIG. 61 is a flowchart showing a process of the ECU of the twenty-third embodiment.
Figure 62:
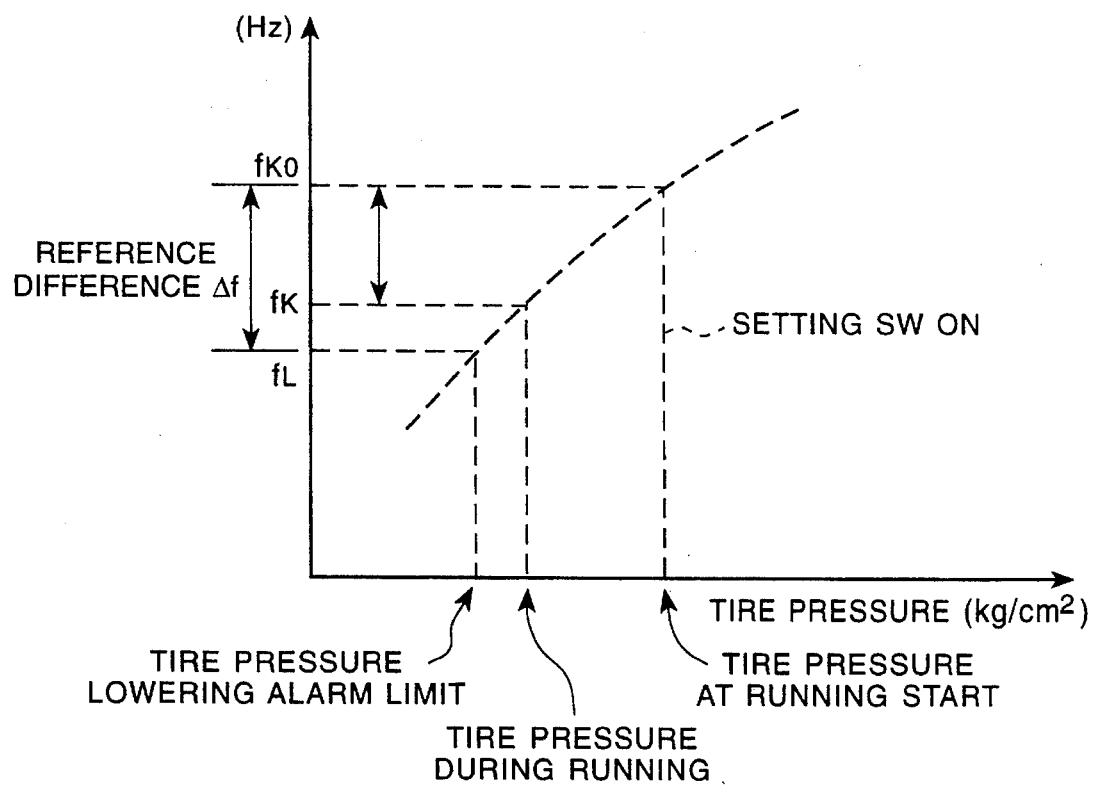
FIG. 62 is an illustration of the relationship between the tire air pressure and the resonance frequency and the tire air pressure.
Figure 63:
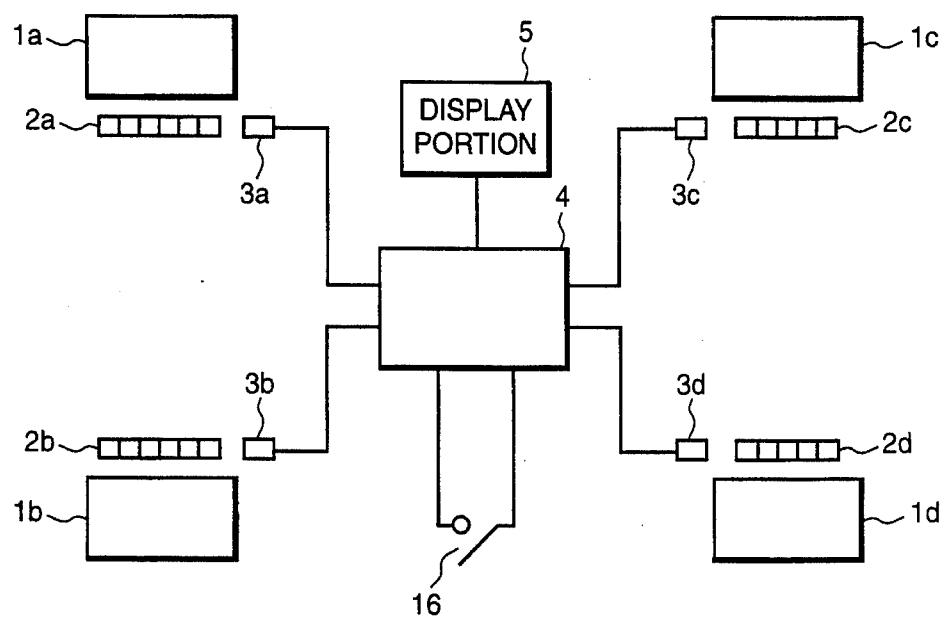
FIG. 63 is an illustration showing an orientation of a tire air pressure detecting device which includes a set switch.

The twenty-third embodiment will be explained with reference to the flowchart of FIG. 61 as well as FIGS. 62 and 63. FIG. 62 is a relationship between the resonance frequency and the tire air pressure.

The processes of steps 201W–208W, are similar to those of the twenty-second embodiment. However, at step 209W, the status of flag F is compared to "1", where the flag F is reset to "0" only when the ignition switch is turned OFF. Therefore, the process is advanced to step 210W only when first tested; otherwise, the process is advanced directly to step 211W. At step 210W, the state of setting switch 16 is determined, where this switch is shown in FIG. 63.

If switch 16 is OFF in step 210W, the lowering difference between resonance frequency $f_K$, and reference resonance frequency $f_{K0}$ is compared to reference difference $\Delta f$ in step 211W, where reference difference $\Delta f$ is between the above-mentioned frequency, $f_{K0}$, and the resonance frequency, $f_L$. Further, this reference difference corresponds to the tire air pressure lowering alarm limit as shown in FIG. 62.

For example, as set forth by step 211W, if the lowering difference is less than, or equal to, the reference difference $[(f_{K0}-f_K) \leq \Delta f]$, the tire pressure is determined to be within the allowable limit, and the process is redirected to step 201W. On the other hand, if the lowering difference is greater than the reference difference $[(f_{K0}-f_K) > \Delta f]$, the tire pressure is determined to be below the allowable value and the process is advanced to step 212W where an alarm is displayed for the driver on display portion 5.

When switch 16 is in the ON state at step 210W, initial resonance frequency $f_K$ is set equal to reference resonance frequency $f_{K0}$ for each of the four wheels independently, at step 213W. Then, at step 214W, flag F is set to "1", and the process returns to step 201W.

Accordingly, after flag F has been set to "1", tire air pressure detection is performed by comparing the difference between newly set reference resonance frequency $f_{K0}$ and sequentially derived resonance frequency $f_K$, with difference $\Delta f$ regardless of the state of switch 16, where reference difference $\Delta f$ is measured between reference resonance frequency $f_{K0}$ and resonance frequency $f_L$. It should be noted that while the reference resonance frequency $f_{K0}$ can be set independently for each of the four wheels as mentioned above, it is also possible to set reference resonance frequency $f_{K0}$ equal to (1) an average value of resonance frequencies $f_K$ derived with respect to each of the four wheels, (2) an average value of two wheels excluding the maximum and minimum values, or (3) the maximum or minimum value of resonance frequencies $f_K$, for each of the respective four wheels.

The twenty-fourth embodiment is directed at performing a similar process as described in the twenty-third embodiment, except that the above-mentioned setting switch 16 is neglected. By setting resonance frequency $f_K$, which is derived immediately after starting the tire pressure detecting process, equal to reference resonance frequency $f_{K0}$, any decrease in tire air pressure which occurs during operation is detected irrespective of the tire type.

Figure 64:
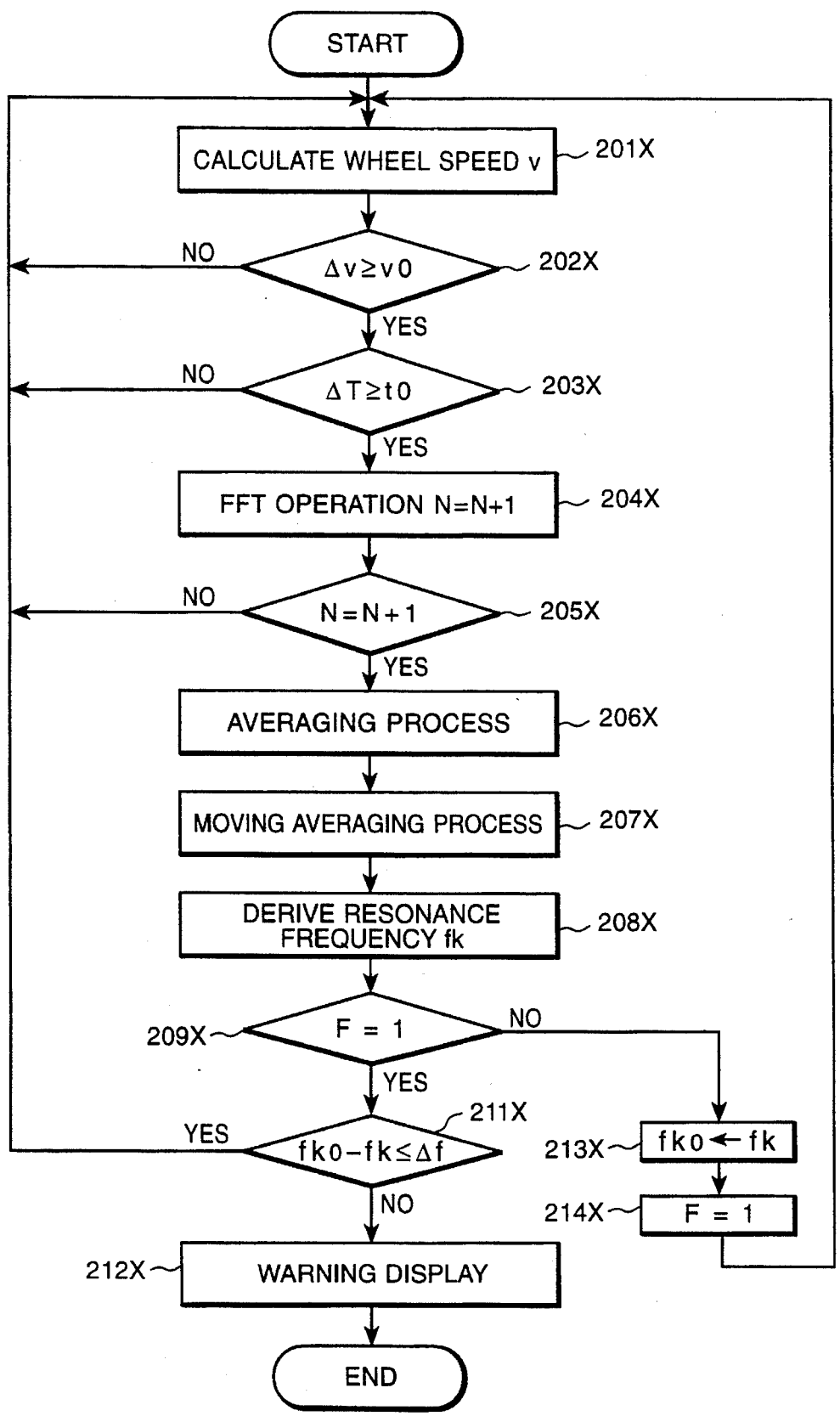
FIG. 64 is a flowchart of the process of the ECU of the twenty-fourth embodiment.

The twenty-fourth embodiment will be explained with reference to the flowchart of FIG. 64, wherein step 210W of the twenty-third embodiment has been deleted as if switch 16 were in the ON state.

Therefore, at step 209X, determination is made whether flag F is set to "1", or not If it is not set to "1", the process is advanced to step 213X so that resonance frequency $f_K$ is set equal to reference resonance frequency $f_{K0}$. On the other hand, when the answer is positive, the process is advanced to step 211X for further processing.

It should be noted that as in the twenty-third embodiment, reference resonance frequency $f_{K0}$ can be set in the abovementioned manner of (1)~(3).

Figure 65:
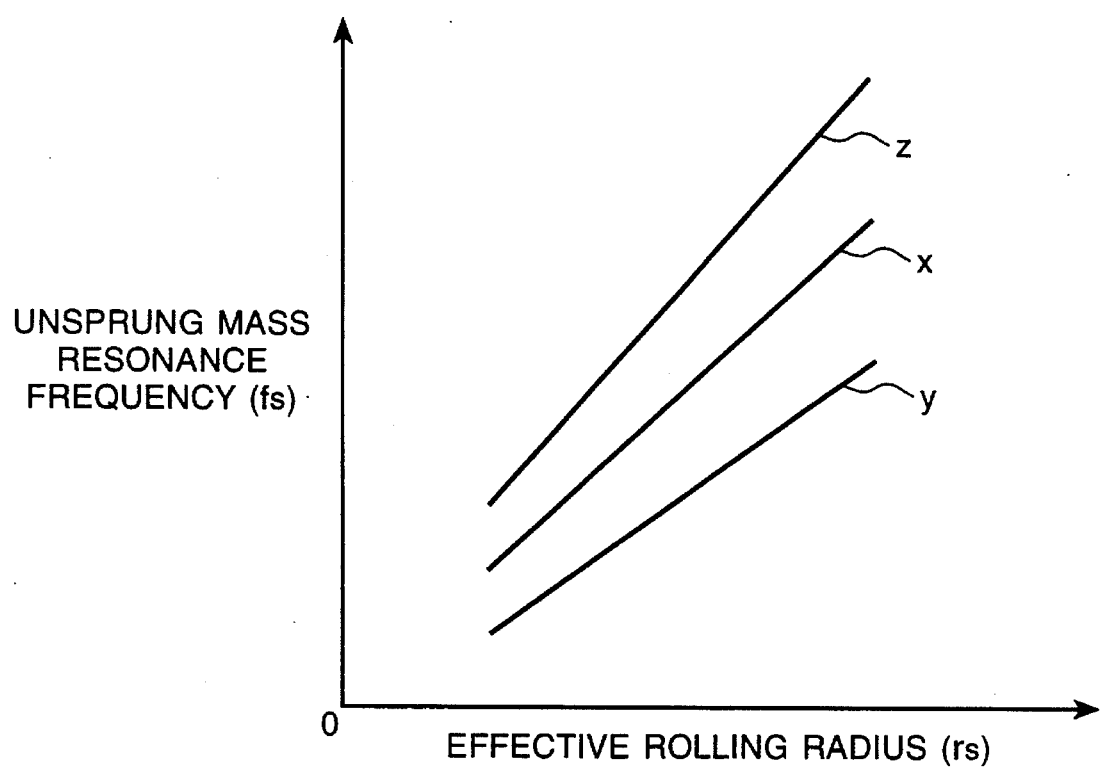
FIG. 65 is a graph showing a relationship of an effective rolling radius and the resonance frequency of the unsprung mass.

The twenty-fifth embodiment uses an effective rolling radius and the unsprung mass resonance frequency to determine the tire type. Namely, as shown in FIG. 65, effective rolling radius $r_s$ and unsprung mass resonance frequency $f_s$ are linearly related based on the type of the tire, where line x is normal radial tire, line y is stadless tire, and line z is a low profile tire, each of which corresponds to the previously explained types of tire. Using a map of this type, the type of the tire can be determined with $r_s$ and $f_s$. For this reason, a tire changing judgment map, similar to that of FIG. 65, is stored in ECU 4.

Figure 66:
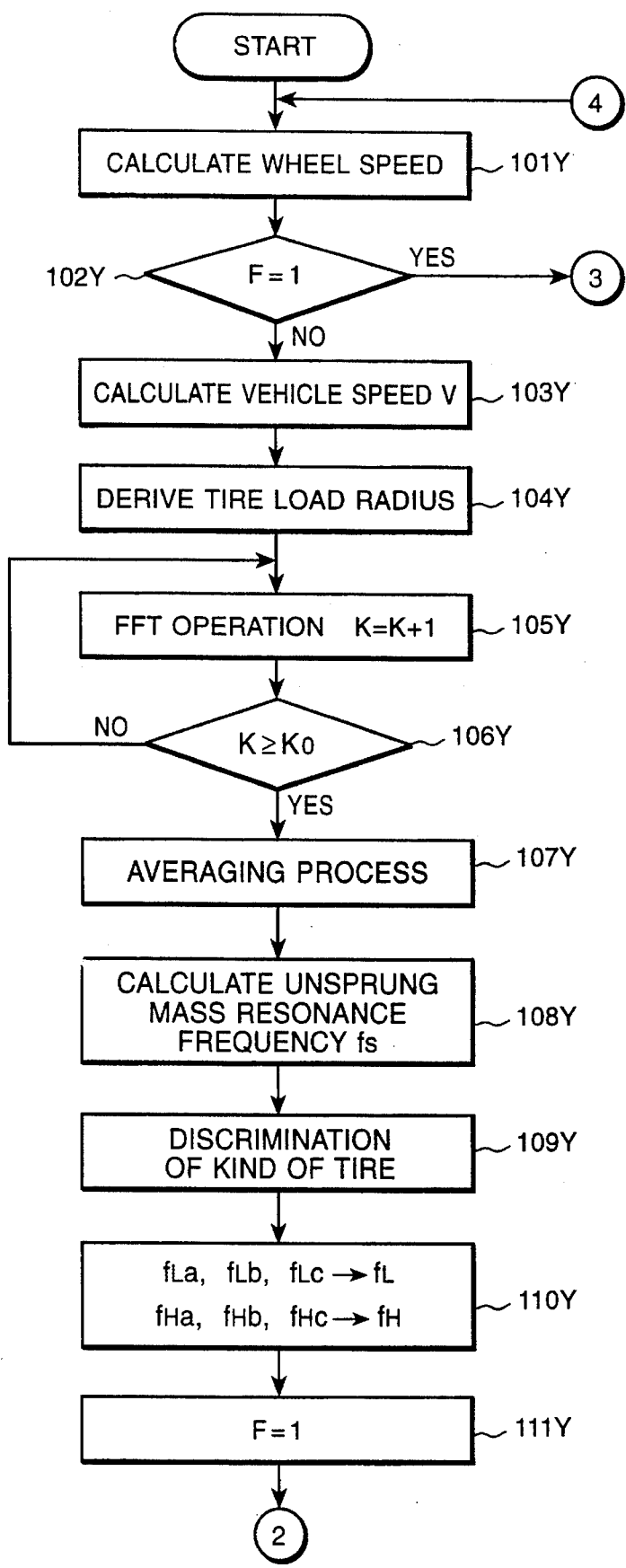
FIG. 66 is a first portion of a flowchart of the signal processing of the electronic control unit in the twenty-fifth embodiment.
Figure 67:
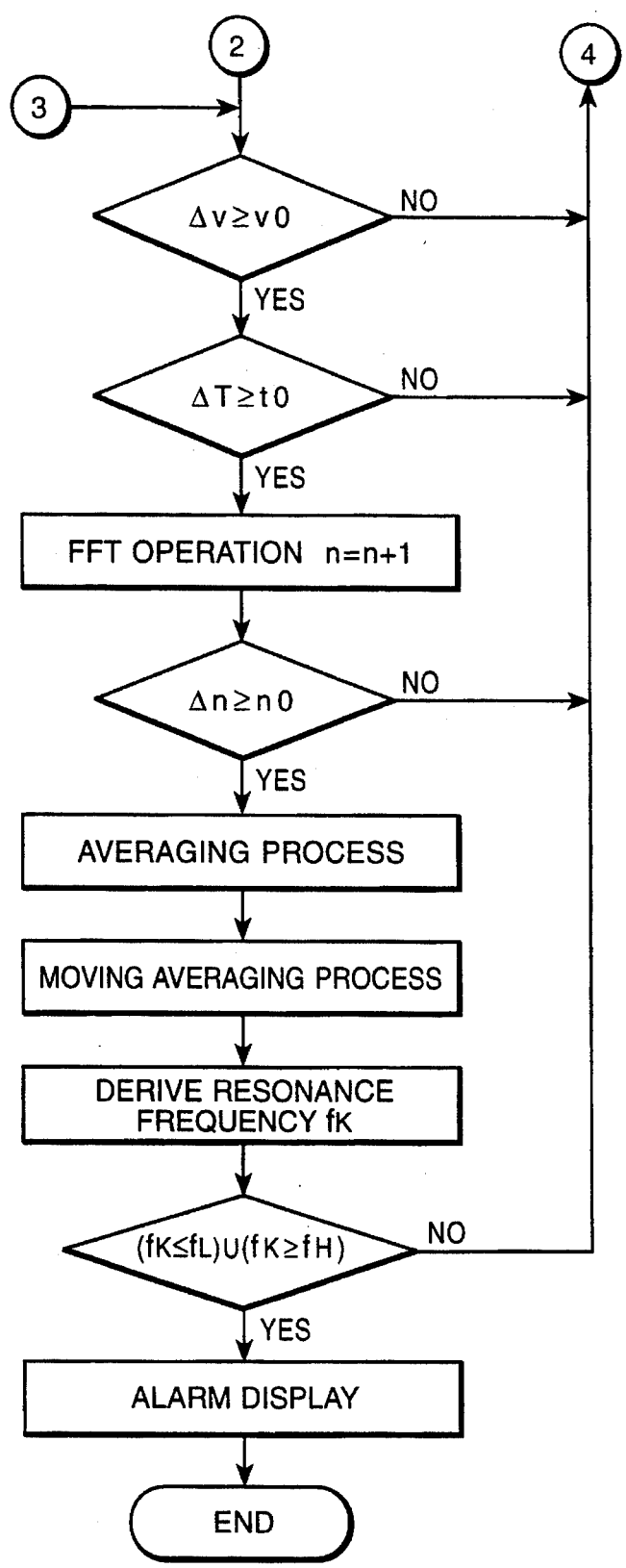
FIG. 67 is a second portion of a flowchart of the signal processing of the electronic control unit in the twenty-fifth embodiment.

The process used to determine effective rolling radius $r_s$ and unsprung mass resonance frequency $f_s$, as well as subsequent determination of tire type, is illustrated by the flowcharts of FIGS. 66 and 67.

At steps 101Y and 102Y, wheel speed v is derived on the basis of the signal from the wheel speed sensor, and flag F is checked, before the tire has been subjected to centrifugal force. It should be noted that wheel speed v is calculated by waveshaping the output signal of the wheel speed sensor, and by dividing the number of the resultant pulses with a corresponding period.

If flag F is not set to "1", the process is advanced to step 103Y. At step 103Y, vehicle speed V may be detected by means of a doppler-type vehicle speed meter, or a rotational speed of a transmission rotary shaft. Then, at step 104Y, tire load radius $r_s$ is derived on the basis of both vehicle speed V and wheel speed v.

At steps 105Y and 106Y, an FFT operation is performed with respect to the wheel speed. The process is repeated until the number of operation cycles of the frequency analysis, K, reaches a predetermined number, $K_0$, at which time it is advanced to step 107Y.

At steps 107Y and 108Y, the results of the frequency analysis are averaged, and unsprung mass resonance frequency $f_s$ is calculated based on this average.

Figure 68:
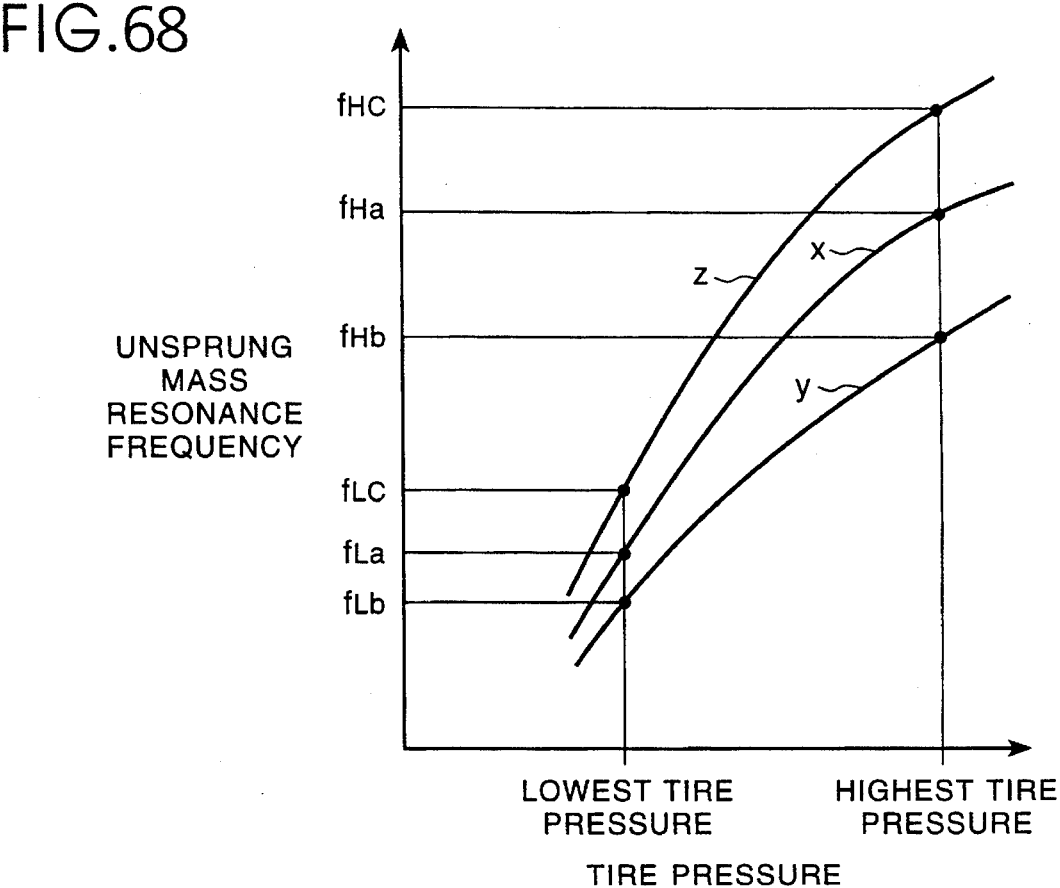
FIG. 68 is a graph showing a relationship of the tire air pressure and the resonance frequency of the unsprung mass.

At step 109Y, a map (FIG. 65) is used in conjunction with effective rolling radius $r_s$ and unsprung mass resonance frequency $f_s$ to determined the type tire. At step 110Y, alarming reference values, $f_L$ and $f_H$, are determined and stored based on the tire type, where the values for each tire are shown on the map of FIG. 68 as $f_{La}, f_{Lb}, f_{Lc}, f_{Ha}, f_{Hb}, f_{Hc}$.

Only then is flag F is set to "1" at step 111Y. Thus, the above-mentioned steps 103Y–110Y for determining tire type are executed only immediately after vehicle ignition. In practice, foregoing step 110Y is executed only when it is determined that all four wheels or at least the two drive wheels have been changed in step 109Y.

It should be noted that each process shown in FIG. 67 has been described in the foregoing embodiments.

Figure 69:
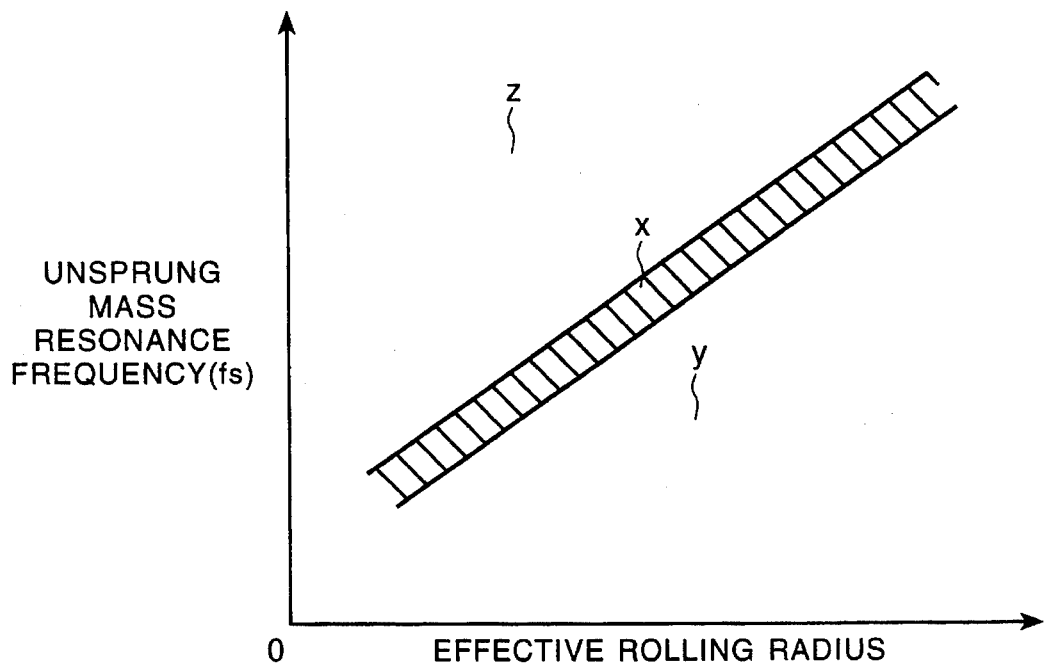
FIG. 69 is a graph showing a relationship of an effective rolling radius and the resonance frequency of the unsprung mass.

It should also be noted that the tire type discrimination of step 109Y may be performed with a regional map as illustrated in FIG. 69, instead of the linear map shown in FIG. 65. Accordingly, discrimination between normal radial, stadless, and low-profile tires is made based on the region mapped to by effective rolling radius $r_s$ and unsprung mass resonance frequency $f_s$.

Furthermore, determination of the tire type can be performed by employing the matrix shown in TABLE 1. Namely, based on variation in effective rolling radius $r_s$ and unsprung mass resonance frequency $f_s$, multiple matrices are formed based on the tire types.

TABLE 1

| | | Tire Load Radius ($r_s$) | | |
|---|---|---|---|---|
| | | Decreased | Unchanged | Increased |
| Unsprung Mass Resonance Frequency | Increased | c (Low Profile Tire) | c (Low Profile Tire) | a (Normal Tire) |
| | Unchanged | c (Low Profile Tire) | a (Normal Tire) | b (Stadless Tire) |
| | Decreased | a (Normal Tire) | b (Stadless Tire) | b (Stadless Tire) |

For instance, if normal radial tires are used, a decrease in the unsprung mass resonance frequency, which is caused by decreased tire air pressure, will lead to a decrease in the effective rolling radius. Conversely, an increase in tire air pressure results in an increase in the effective rolling radius corresponding to an increase in the unsprung mass resonance frequency. These characteristics are designated by an "a" in the matrix shown in TABLE 1.

Rubber used to construct stadless tires is softer and this results in generally lower unsprung mass resonance frequencies. The corresponding behavior is shown in blocks designated with a "b" in TABLE 1.

On the other hand, the low profile tire generally has a high tire spring constant. Therefore, the unsprung mass resonance frequency is generally high, and the corresponding behavior is shown in blocks designated with a "c" in TABLE 1.

It should be noted that when both $r_s$ and $f_s$ are either increased or decreased, it is difficult to discriminate between tire types. However, because changes in tire pressure are generally different, the tire type can often be determined by aggregating the results of discrimination of the other wheels.

For instance, when the unsprung mass resonance frequency and the effective rolling radius are decreased simultaneously at two or four of the wheels, it can be inferred that the tires have been changed to stadless tires. Conversely, when both or all four tires have risen, judgment can be made that the tires have been changed to low profile tires.

Therefore, with the present embodiment, effects similar to those of the foregoing embodiment can be achieved.

It should be noted that an optimal air pressure value for the normal radial tire, or a value measured immediately before the vehicle stops can be used for the above-mentioned reference values, $r_0$ and $f_0$.

Next, the twenty-sixth embodiment will be discussed. Decreased tire air pressure may be caused by natural leakage or puncture. Generally, however, punctures cause these decreases. It is rare that punctures are experienced by both left and right wheels simultaneously. However, changing of the tire or wheel materials results in a variation of the unsprung mass weight which affects the vertical and longitudinal resonance frequency components in the unsprung mass of the vehicle.

By deriving and comparing the resonance frequencies of the left and right wheels with respect to each of the drive wheels and driven wheels, judgment can be made that the tire air pressure has decreased in the tire which has the lowest resonance frequency. That is, only if there is definite difference between the resonance frequencies. In the present embodiment, control is performed in consideration of the above.

Figure 70:
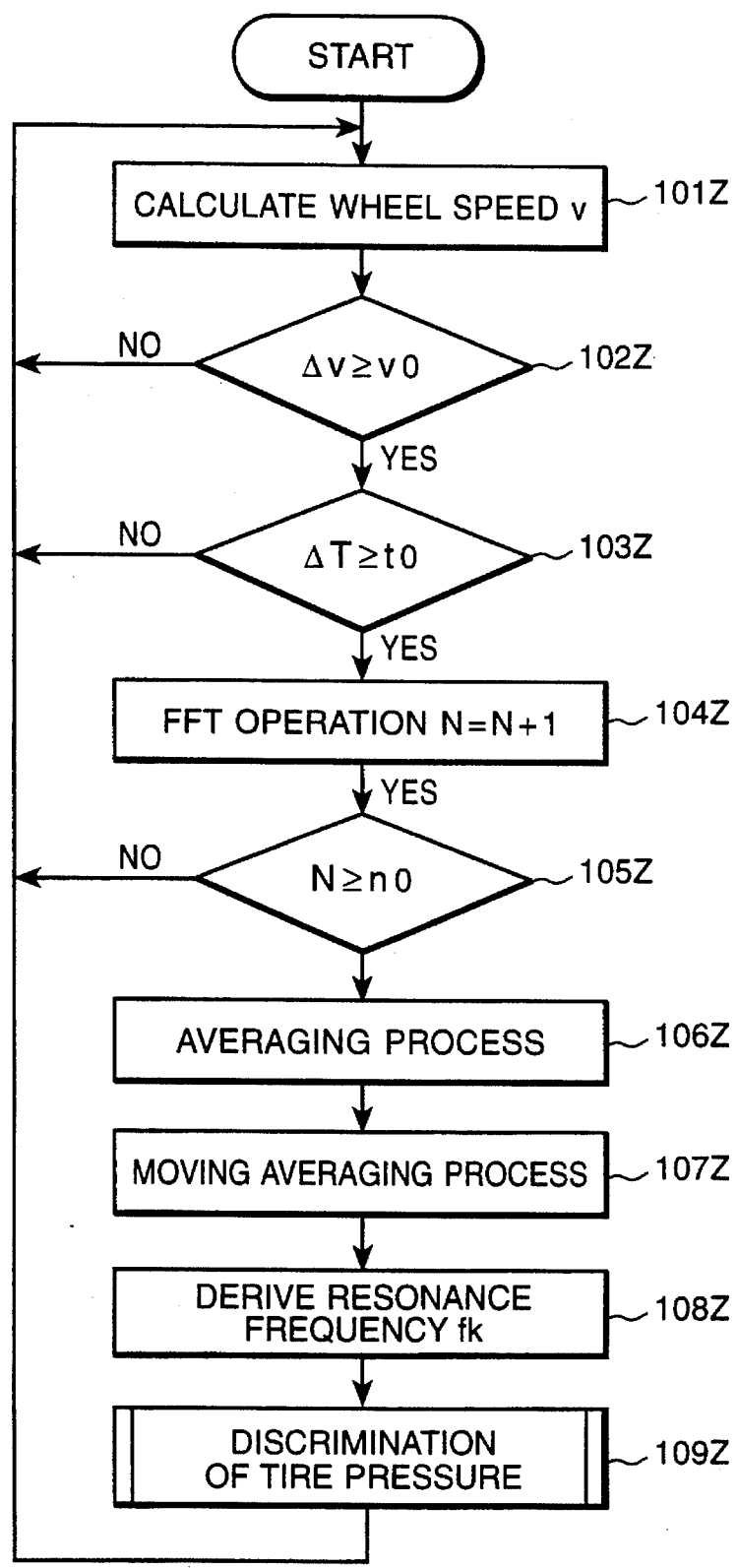
FIG. 70 is a first portion of a flowchart of the signal processing of the electronic control unit in the twenty-sixth embodiment.
Figure 71:
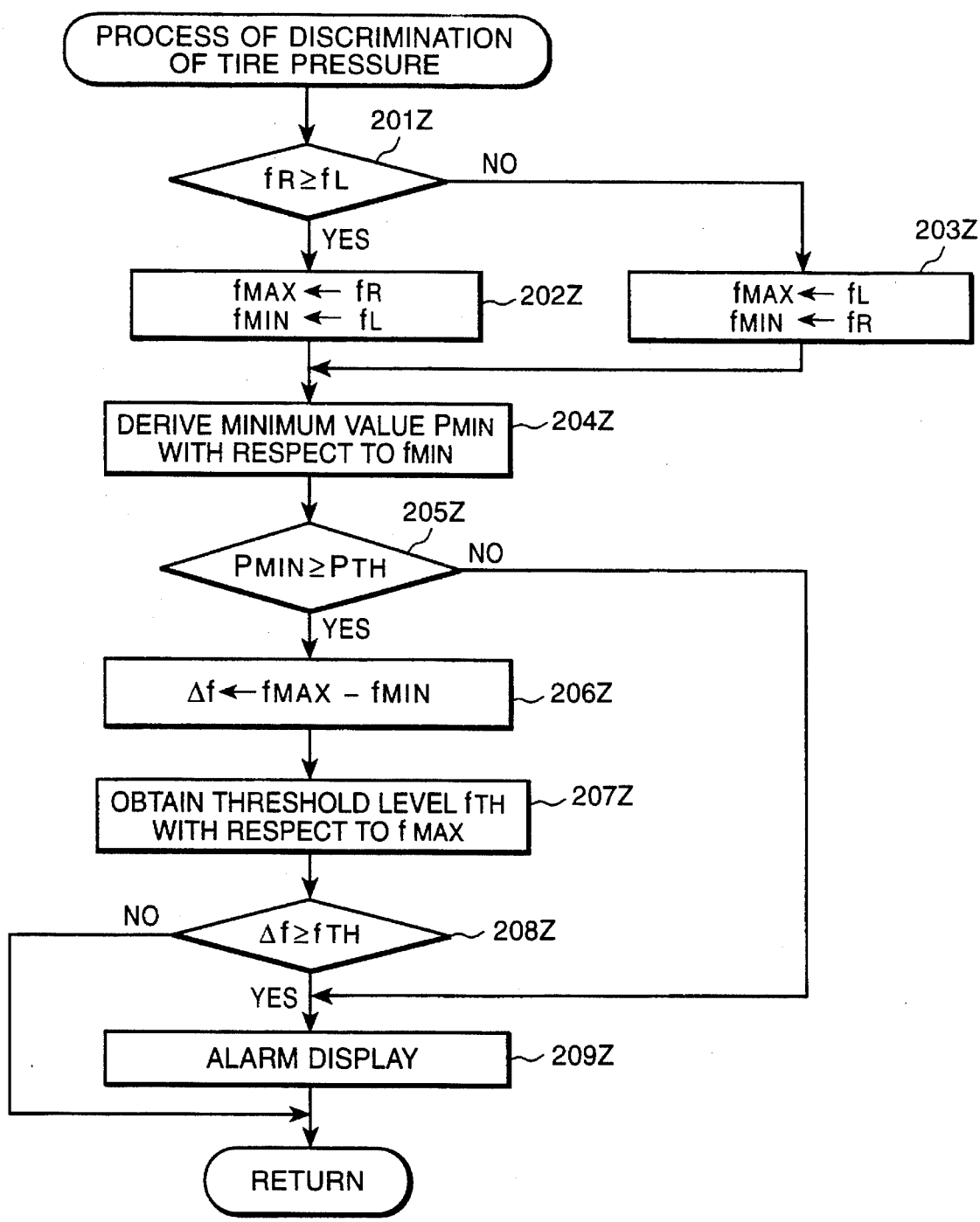
FIG. 71 is a second portion of a flowchart of the signal processing of the electronic control unit in the twenty-sixth embodiment.

The foregoing process is illustrated in the flowcharts shown by FIG. 70, where steps 101Z–108Z are similar to those described in previous embodiments, and step 109Z is further described using the flowchart of FIG. 71.

At step 201Z, resonance frequency $f_L$, which is derived with respect to the left side wheel of the front or rear, is compared with the resonance frequency $f_R$, which is derived with respect to the right side wheel. Then, depending upon the results of comparison between $f_L$ and $f_R$, step 202Z or 203Z is performed to set the higher resonance frequency as $f_{MAX}$, and the lower resonance frequency as $f_{MIN}$.

Figure 72:
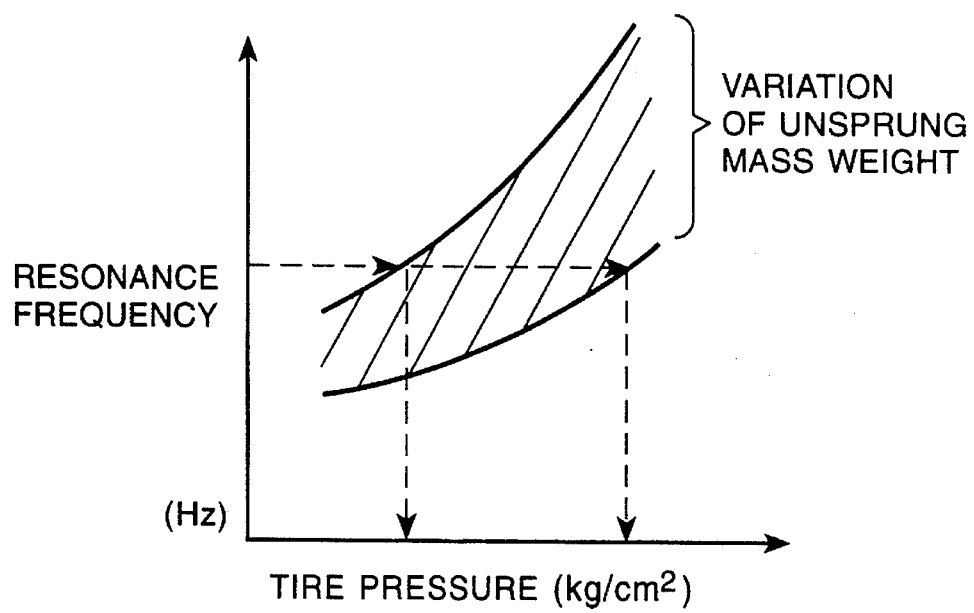
FIG. 72 is a characteristic chart illustrating fluctuation of the tire air pressure with respect to the same resonance frequencies based on the unsprung mass load.

When the unsprung mass weight is varied, the relationship between the resonance frequency and the tire air pressure fluctuates, as shown by the hatched region in FIG. 72. Therefore, any one of a number of tire air pressures may result from one resonance frequency. Thus, in step 204Z, a minimum value of the tire air pressure, $P_{MIN}$, which corresponds to $f_{MIN}$, is derived from a relationship between the resonance frequency (Hz) and the tire air pressure (kg/cm$^2$).

Then, the process is advanced to step 205Z, where minimum value $P_{MIN}$ is compared with threshold level $P_{TH}$ to detect abnormal decreases in tire air pressure.

If $P_{MIN}$ is less than $P_{TH}$, the process jumps to step 209Z to display an alarm indicative of the abnormal decreases in tire air pressure on display portion 5. This process is a preventive measure for the case where the tire air pressures of both of the left and right wheels are lowered simultaneously.

Otherwise, if $P_{MIN}$ is greater than, or equal to $P_{TH}$ at step 205Z, the process is advanced to step 206Z, where difference $\Delta f$ is derived from resonance frequencies $f_{MAX}$ and $f_{MIN}$ of the left and right wheels. As set forth above, when the unsprung mass weight is varied via tire variation, wheel material or so forth, the characteristics between the resonance frequency and the tire air pressure are also varied.

Figure 73:
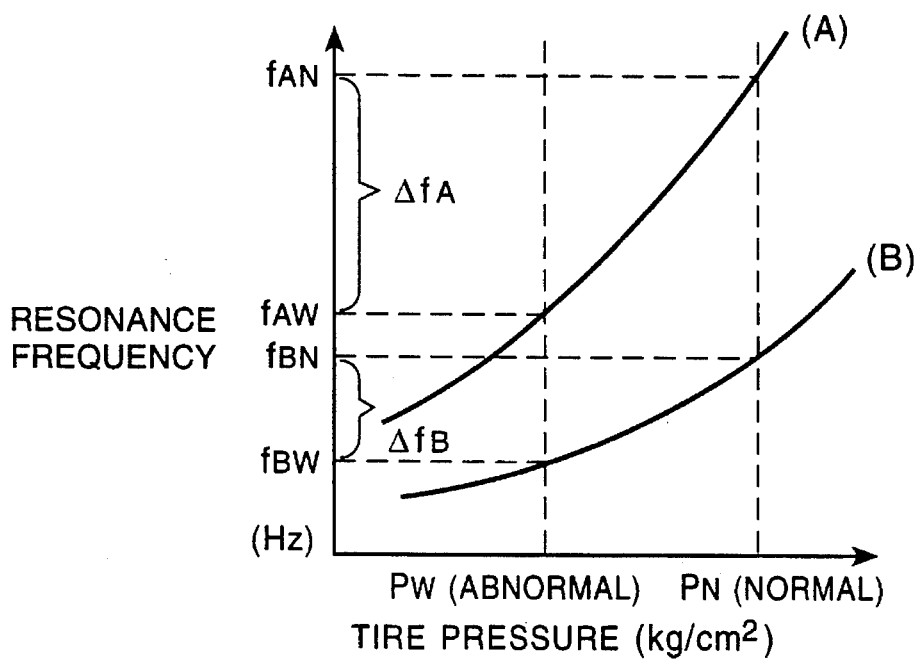
FIG. 73 is a characteristic chart showing a relationship between resonance frequency difference and the tire air pressure.

As shown in FIG. 73, $\Delta f_A$ corresponds to the difference between normal resonance frequency $f_{AN}$ and abnormal resonance frequency $f_{AS}$, where $f_{BN}$ corresponds to normal tire air pressure $P_N$, and resonance frequency $f_{BW}$ corresponds to the abnormally decreasing tire air pressure $P_W$, as shown by characteristic curve (B). Further, $\Delta f_B$ corresponds to the difference between normal resonance frequency $f_{BN}$ and abnormal resonance frequency $f_{BW}$, where $f_{BN}$ corresponds to normal tire air pressure $P_N$, and resonance frequency $f_{BW}$ corresponds to the abnormally decreasing tire air pressure $P_W$, as shown by characteristic curve (B). Because difference $\Delta f_A$ and difference $\Delta f_B$ may be different, abnormal decreases in tire air pressure may be erroneously detected by simply evaluating one or the other difference as $\Delta f$.

Thus, threshold level $f_{TH}$ is unconditionally determined for judgment of abnormally low tire air pressure, where $f_{TH}$ is the difference between the resonance frequencies.

Figure 74:
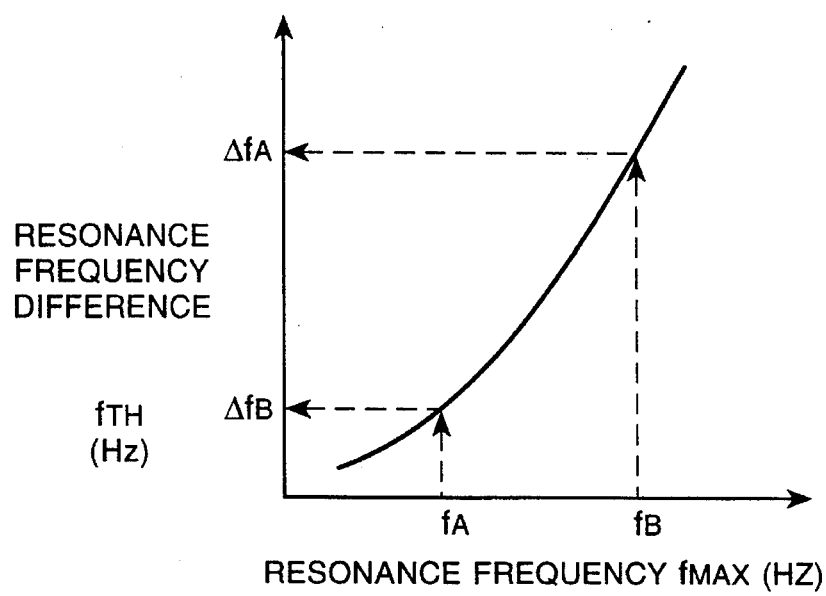
FIG. 74 is a characteristic chart showing a relationship between resonance frequency $f_{MAX}$ and the resonance frequency difference $f_{TH}$.

If the variation of the unsprung mass coefficient factor in the left and right wheels is caused only by the difference of the tire air pressures at those wheels, then the unsprung mass coefficient factors other than the tire air pressure, can absorb the influence for the resonance frequency as follows. Characteristic charts, as shown in FIG. 74, of the relationship between the maximum resonance frequency and a difference of resonance frequencies for each tire type can be detected. For instance, the normal tire air pressure (e.g. 2.0 kg/cm$^2$) and alarming tire air pressure (e.g. 1.4 kg/cm$^2$) are derived with respect to various combinations of tires and wheels. Then, using the characteristic lines indicated by this data, the resonance frequency for each tire type is used to determine the threshold corresponding to the other tire type.

It should be noted that the characteristic chart shown in FIG. 74 is stored in ECU 4. Accordingly, at step 207Z, threshold level $f_{TH}$ is obtained from the map stored in ECU 4 with respect to resonance frequency $f_{MAX}$, and is regarded as normal tire air pressure.

Then, at step 208Z, resonance frequency difference $\Delta f$ is compared with new threshold level $f_{TH}$. If $\Delta f$ is greater than, or equal to $f_{TH}$, the process is advanced to 209Z where an alarm is displayed on display portion 5 to indicate an abnormal decrease in the tire air pressure. On the other hand, if $\Delta f$ is less than $f_{TH}$, the process simply returns to other processing.

Figure 75:
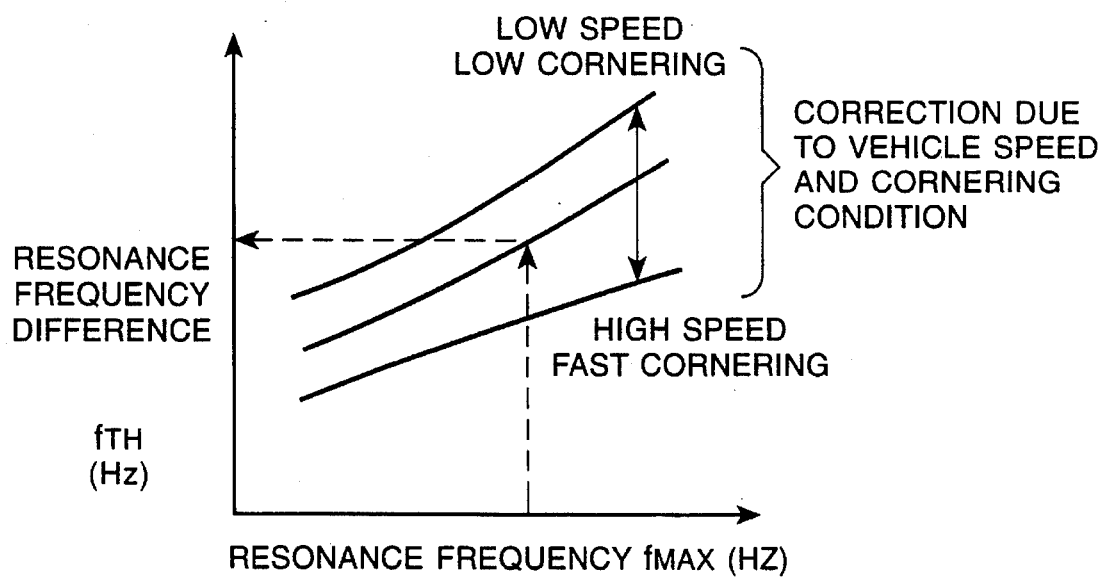
FIG. 75 is a characteristic chart showing a relationship between resonance frequency $f_{MAX}$ and the resonance frequency difference $f_{TH}$.

It should be noted that, depending upon the vehicle speed and traveling condition, a specific tire air pressure may be determined to be either dangerous or not dangerous. However, using a map of many characteristic curves which take into account the vehicle speed and travelling condition (FIG. 75), threshold level $f_{TH}$ may be accurately derived.

It should also be noted that in the foregoing, the decreases in tire air pressure can be determined by employing resonance frequency $f_{MAX}$ instead of resonance frequency $_{MIN}$. Selection of either $f_{MIN}$ or $f_{MAX}$ is made by taking the degree of the tire air pressure decrease for the left and right wheels into consideration. The relationship between the resonance frequency and the tire air pressure shown in FIG. 72, is preliminarily stored in the form of a map in ECU 4.

The foregoing embodiment can improve reliability by avoiding erroneous detection of lowering abnormalities of tire air pressure. Because the relationship between variation magnitude $\Delta f$ and the variation magnitude of the tire air pressure is affected by the unsprung mass coefficient factor, threshold level $f_{TH}$ can be corrected using resonance frequency $f_{MAX}$ which is regarded to be normal tire resonance frequency.

On the other hand, by setting $f_{MAX}$ or $f_{MIN}$ as the threshold value for judgment, natural leakage may be detected when the tire air pressure of left and right wheels are lowered simultaneously. Thus, with respect to fluctuation of the characteristics between the resonance frequency and the tire air pressure which depend upon the type of tire and wheel used, the set threshold value for judgment may be adjusted by selecting from among $f_{MAX}$ and $f_{MIN}$.

The twenty-seventh embodiment is directed at improving detection reliability by using a two-stage judgment to detect for decreases in the tire air pressure. Specifically, after a variation rate of resonance frequency $f_K$ is obtained for a unit period, the variation rate is compared to a judgment value. Then, the number of cycles in which the variation rate is less than this judgment value are compared to predetermined value, Mo. Only after both predetermined values have been exceeded will the alarm be set. Thus, temporary fluctuations which erroneously result in detection of decreased pressure are avoided.

Figure 76:
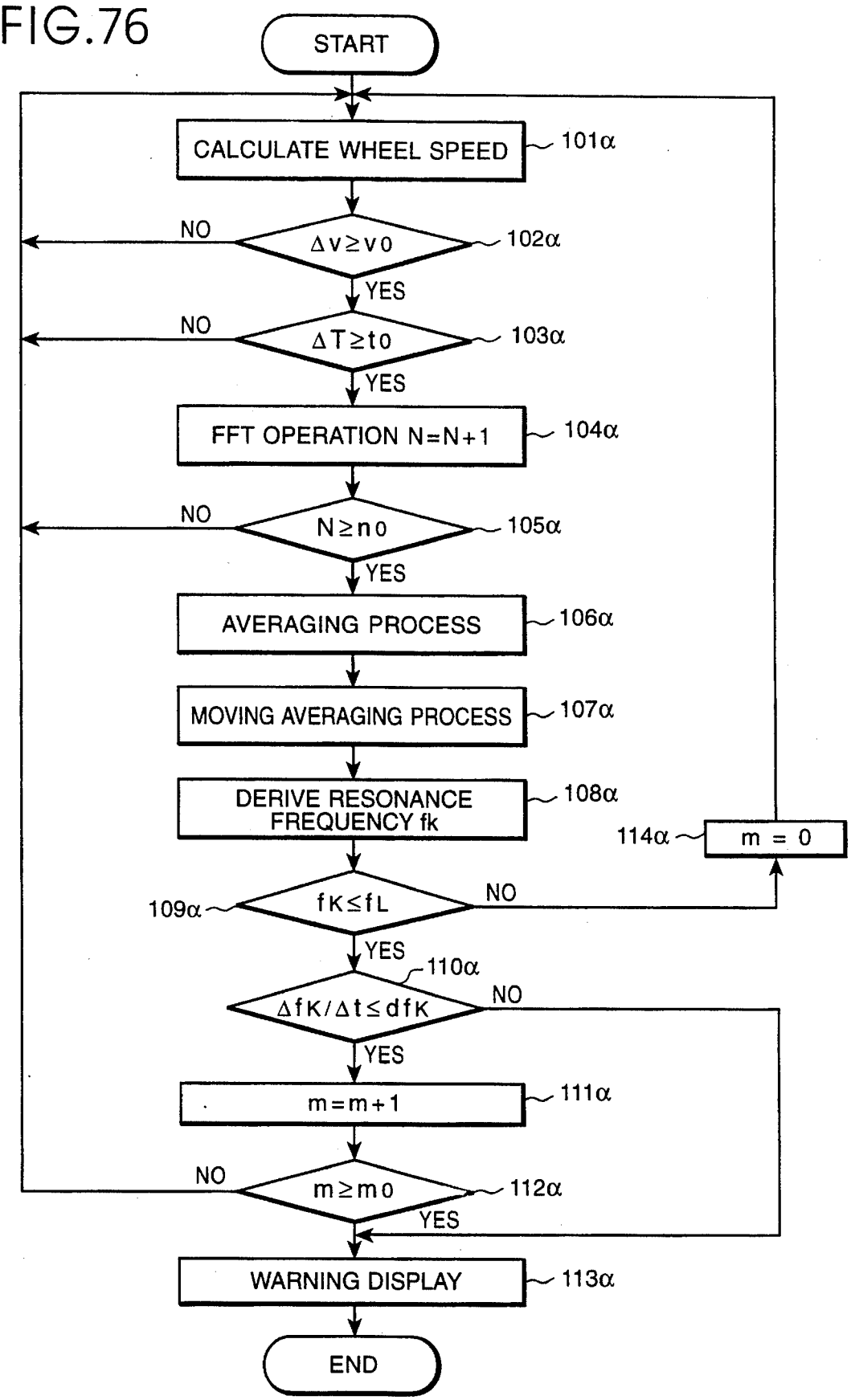
FIG. 76 is a flowchart of the signal processing of the electronic control unit in the twenty-seventh embodiment.

The foregoing embodiment is illustrated by the flowchart of FIG. 76, where steps 101α– 108α are similar to those in former embodiments.

However, at step 109α, derived resonance frequency $f_K$ is compared to predetermined air pressure lowering discrimination value $f_L$.

If $f_K$ is greater than $f_L$, then the process is advanced to step 114α where counter m is reset and the process is returned to step 101α.

However, if $f_K$ is less than, or equal to, $f_L$, the process is advanced to step 110α where resonance frequency variation rate $df_K$ is compared with judgment value ($\Delta f_K/\Delta t$) to determine the degree of decrease in the tire air pressure. It should be noted that $\Delta f_K$ is the difference between the current calculated resonance frequency and previous calculated resonance frequency, and that $\Delta t$ is the elapsed period therebetween.

When variation rate $df_K$ is greater than, or equal to, foregoing judgment value ($\Delta f_K/\Delta t$), the tire air pressure is considered to be gradually decreasing. Therefore, the process is advanced to step 111α to increment counter m. Subsequently, at step 112α, it is determined whether derived variation rate of the derived resonance frequency has maintained a level lower than judgment value for more than $m_o$ cycles.

If it has been lower for $m_o$ cycles, the answer at step 112α is positive, and the process is advanced to step 113α to display the alarm indicating low tire air pressure for the relevant tire.

On the other hand, when it has not been lower for $m_o$ continuous cycles, the answer at step 112α is negative, and the process is returned to step 101α.

Further, when the variation rate $df_K$ of the resonance frequency is less than judgment value ($\Delta f_K/\Delta t$) in step 110α, judgment is made that the tire air pressure is abruptly lowered due to occurrence of abrupt decrease in tire air pressure. Therefore, the process jumps to step 113α to permit alarming display of the foregoing content.

It should be noted that, once initiated, the present embodiment maintains alarming display until the vehicle stops. Then, upon restarting the vehicle, if the initial resonance frequency $f_K$ is higher than the air pressure lowering judging value, the tire air pressure lowering detection state is released to terminate alarming display. However, if the initial resonance frequency $f_K$ is lower than, or equal to, the air pressure lowering judgment value, the alarming display is maintained until the next stop of the vehicle to repeat the foregoing steps.

The twenty-eighth embodiment is directed at determining a reference value for judging abnormality in tire pressure based on characteristics of the tire and wheel in the manner different from the twenty-seventh embodiment.

Figure 77:
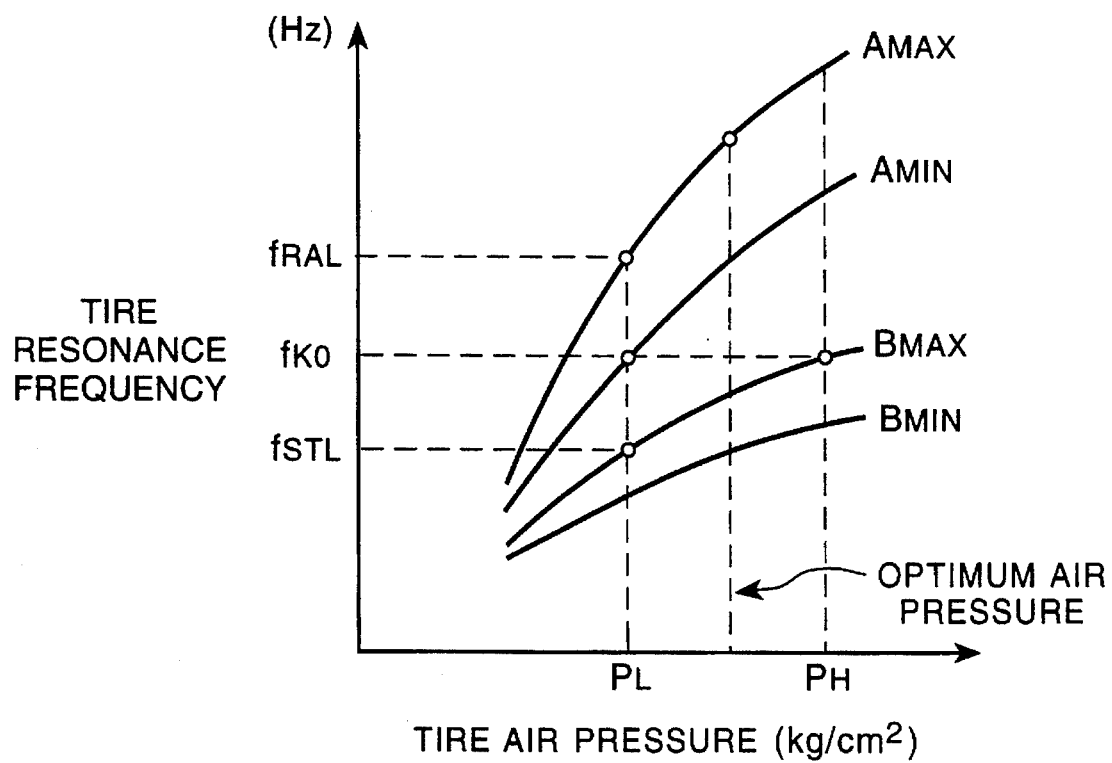
FIG. 77 is a characteristic diagram showing the relationship between the tire pressure and the unsprung resonance frequency for the radial tire and the stadless tire.

As described in the twenty-third embodiment at FIG. 62, the tire pressure, unsprung resonance frequency characteristic is illustrated as shown in FIG. 77.

When the air pressure of the tire which is mounted on the lightest wheel is lowered, the air pressure (kg/cm2) lower limit value and upper limit value are taken as $P_L$ and $P_H$, respectively. Correspondingly, the reference/unsprung resonance frequency $f_L$ for judging the decrease in air pressure in the radial tire is indicated by $F_{RAL}$, and the reference resonance frequency $f_L$ for the stadless tire is indicated by $f_{STL}$. It should be noted that $P_L$ and $P_H$ may be set equal to the minimum and maximum air pressures recited by the JIS, namely 1.4 gk/cm² and 2.5 kg/cm², respectively.

In addition, because $f_{KO}$ is used to determine the type of tire employed, it is desirable to set its value to a value centered between $f_{RAD}$ and $f_{STL}$, where $f_{RAD}$ and $f_{STL}$ are the resonance frequency equivalents to upper limit pressure $P_H$ of the stadless tire, and the lower limit pressure $P_L$ of the radial tire, respectively.

Figure 78:
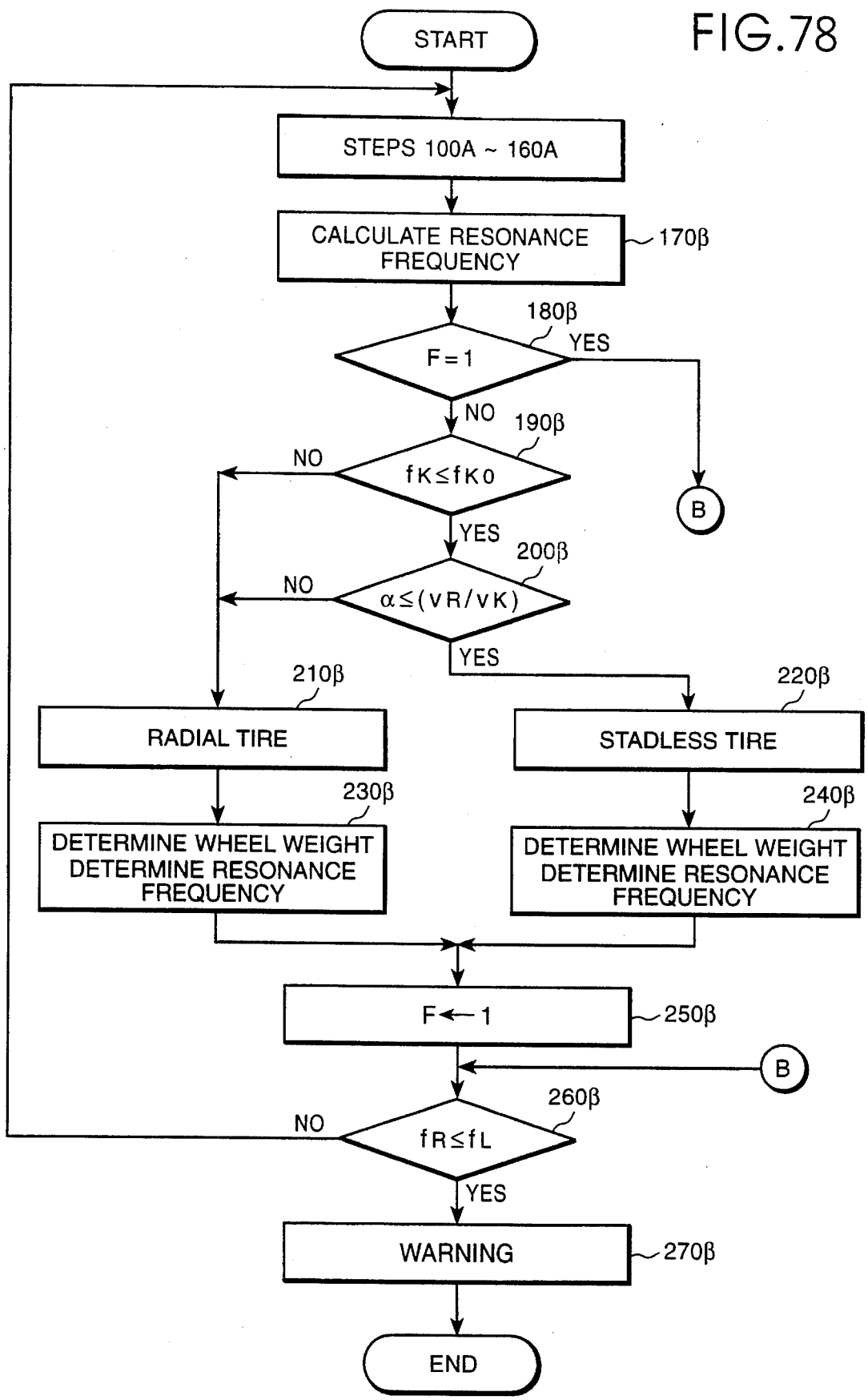
FIG. 78 is a flowchart of the process performed in the twenty-eighth embodiment.

The signal processing performed by ECU 4 in the twenty-eighth embodiment will be described with reference to the flowchart of FIG. 78.

It should be noted that the processes before step 170α are similar to those described by steps 100A to 160A of the first embodiment.

Figure 79:
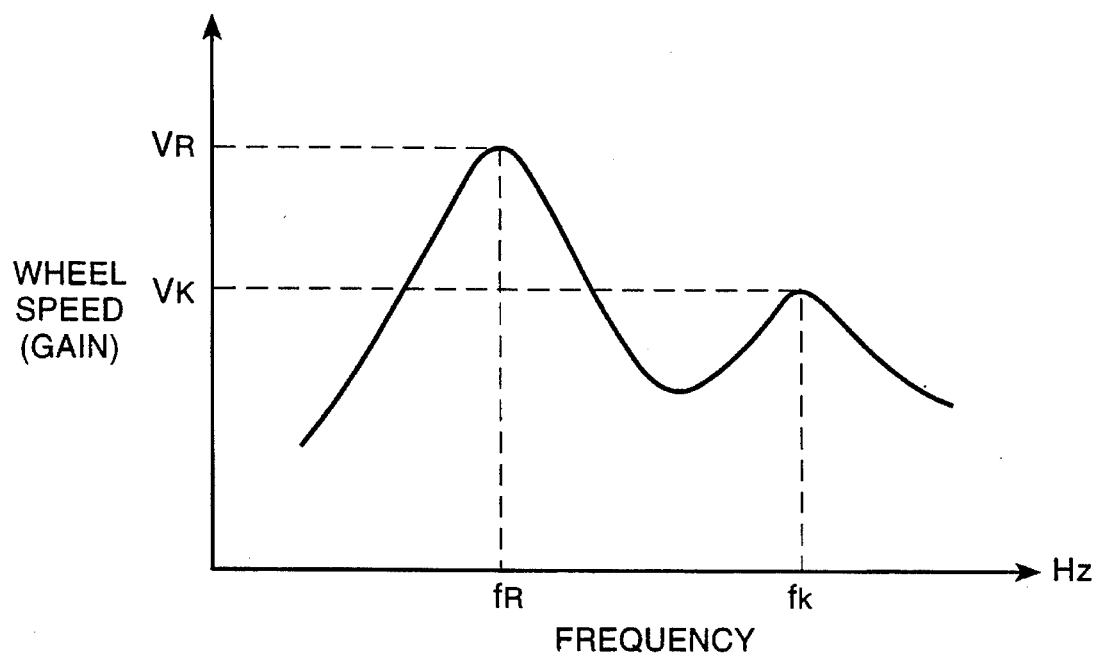
FIG. 79 is a characteristic diagram showing the relationship between the resonance frequency and the wheel speed (gain)

However, in step 170β, longitudinal resonance frequency $f_K$ and vertical resonance frequency $f_R$ of the unsprung vehicle are determined based on the smoothed results of the FFT operation (shown in FIG. 79). At step 180β, the status of flag F is checked, where it is reset to "0" only after the ignition key is turned off.

If flag F does not equal "1", at step 180β, the process proceeds to step 190β where resonance frequency $f_K$ is compared to resonance frequency $f_{KO}$ in order to determine tire type.

As shown in FIG. 77, the operated resonance frequency $f_K$ is less than the resonance frequency $f_{KO}$ when the tire type is a radial tire and the tire pressure is very low, and when the tire type is considered to be stadless. Consequently, when resonance frequency $f_K$ is less resonance frequency $f_{KO}$, the tire type can not be determined based on resonance frequency $f_{KO}$ alone.

Figure 80B:
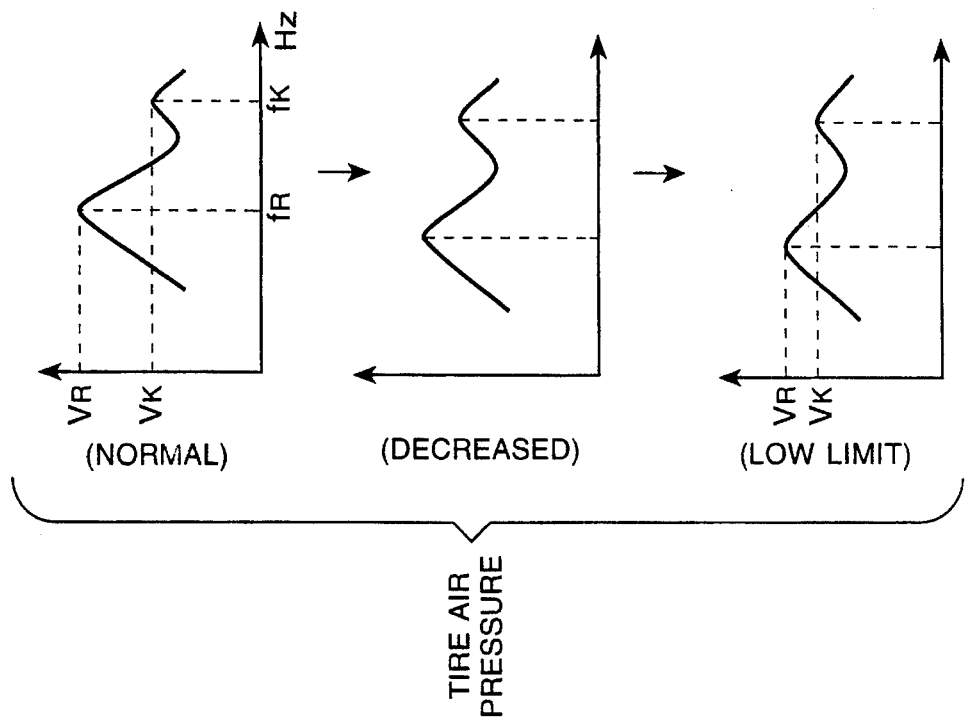
FIGS. 80(a) and 80(b) contain various characteristic diagrams of the relationship between the resonance frequency and the wheel speed (gain)
Figure 80A:
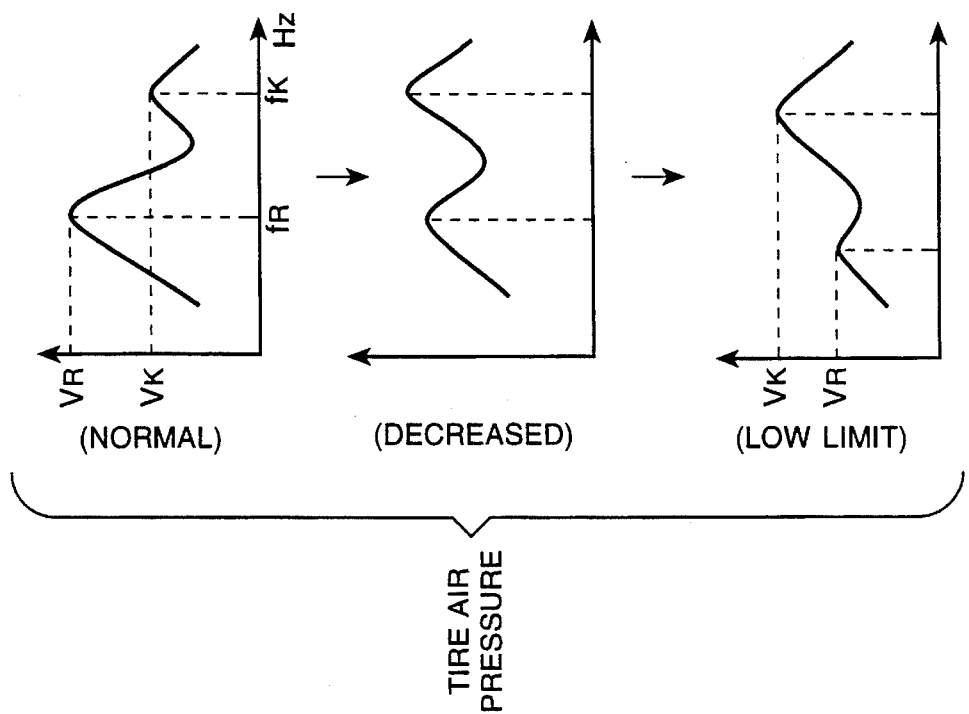

Wheel speeds (gains) $v_R$ and $v_K$, which respectively correspond to resonance frequencies $f_R$ and $f_K$, are shown in FIGS. 80(a) and 80(b). As shown, when the tire pressures of the radial and stadless tires are decreased, the orientation of gains $v_R$ and $v_K$ for the radial tire (see FIG. 80(a)) are reversed, while the orientation of gains $v_R$ and $v_K$ for the stadless tire (see FIG. 80(b)) do not change.

Consequently, using a ratio between the gains ($v_R/v_K$), these tire types can be discriminated from each other.

For this reason, when resonance frequency $f_K$ is less than, or equal to, $f_{KO}$ at step 190β, the process proceeds to the step 200β, where gain ratio $v_R/v_K$ is calculated and compared with predetermined value α. Then, if gain ratio $v_R/v_K$ is greater than, or equal to, α, it is determined that the tire is stadless and the process is advanced to step 220β.

However, if either resonance frequency $f_K$ is greater than $f_{KO}$ at step 190β, or gain ratio $v_R/v_K$ is less than α at step 200β, it is determined that the tire is radial, and the process is advanced to step 210β.

At steps 210β and 230β, the tire weight (wheel weight) M is determined based on the resonance frequency $f_R$. A map is then used to determine judgment resonance frequency $f_L$ corresponding to tire pressure reduction warning pressure $P_L$.

If the tire spring constant and the unsprung weight are taken as k and m, respectively, then the resonance frequency $f_R$ is calculated by the following operational equation:

$$f_R = (1/2\pi) \times \sqrt{k[(1/m)(1/m)]} \quad (4)$$

Figure 81:
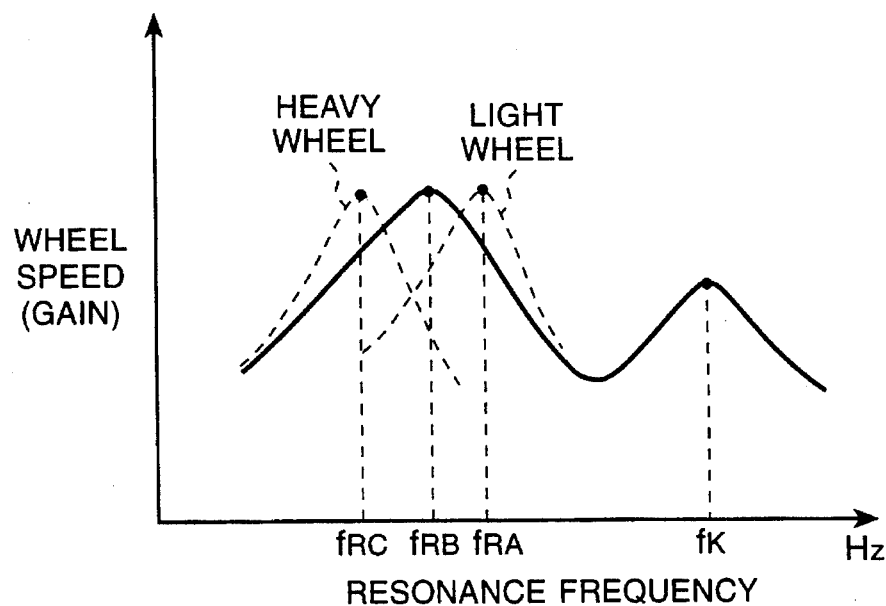
FIG. 81 is a characteristic diagram demonstrating that the relationship between the resonance frequency and the wheel speed (gain)

Because unsprung weight m is a constant value which is determined through vehicular data, when tire spring constant k is specified through the tire air pressure, resonance frequency $f_R$ is based on tire weight m. Thus, for example, three values are determined for vertical resonance frequency $f_R$, namely, $f_{RA}$ corresponding to light tire weight, $f_{RB}$ corresponding to intermediate tire weight, and $f_{RC}$ corresponding to light tire weight (see FIG. 81). Then, the pressure-resonance frequency characteristics are respectively calculated (see FIG. 82), and the resultant map is recorded in ROM of ECU 4.

The values for judgment resonance frequencies $f_{L1}$, $f_{L2}$, and $f_{L3}$ corresponding to tire pressure reduction warning pressure $P_L$ are then determined for resonance frequencies $f_{RA}$, $f_{RB}$, and $f_{RC}$, respectively.

Alternatively, if it is determined in steps 190–200β that stadless tires have been employed, the processes shown by steps 220β and 240β are performed, where these processes are similar to those of steps 210β and 230β.

Figure 82:
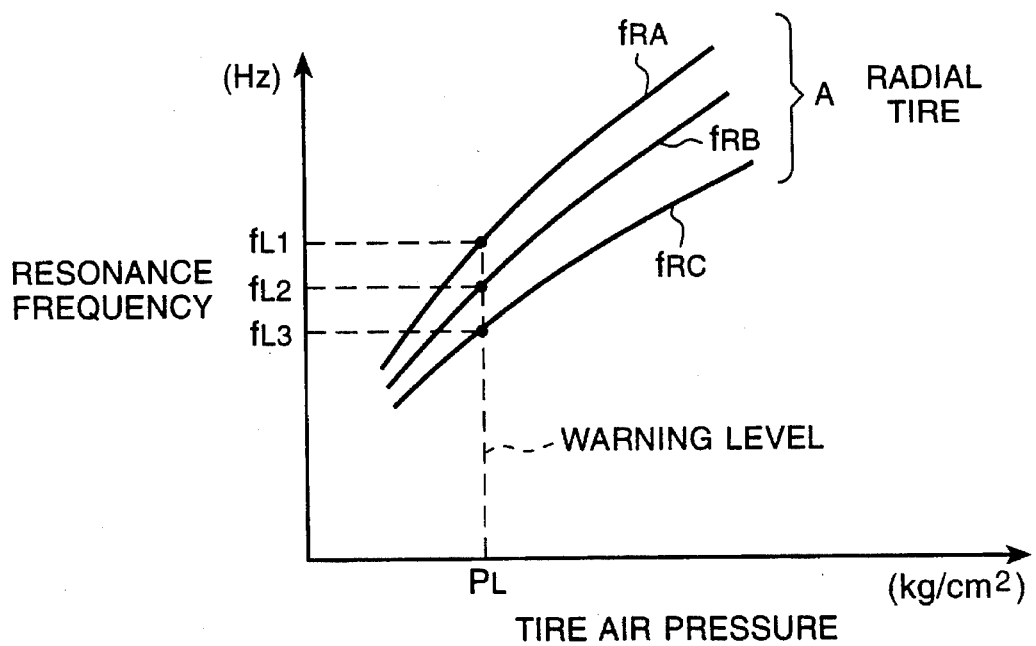
FIG. 82 is a characteristic diagram demonstrating that the relationship between the tire pressure and the judgment resonance frequency.

When the determination of the tire type has been completed, judgment resonance frequency $f_L$ corresponding to the tire pressure reduction warning pressure $P_L$ is determined using the map shown in FIG. 82, and flag F is set at "1" in step 250β. Then, at step 260β, operated resonance frequency $f_R$ is compared with resonance frequency $f_L$.

When $f_R$ is less than, or equal to $f_L$, the tire air pressure is determined to be excessively low, and the process proceeds to step 270β, where a warning is displayed to the driver by display unit 5.

However, when $f_R$ is less than $f_L$, the process is returned to 100A.

It should be noted that because flag F is set equal to "1" after this process has been completed, the processes from step 190β to 250β are omitted after the first cycle.

In the above-described embodiment, the tire type is determined based on a gain ratio between vertical resonance frequency $f_R$ and longitudinal resonance frequency $f_k$. It should be noted that the determination of tire type may also be performed on the basis of either a large or small relationship between resonance frequencies $f_R$ and $f_k$, or the deviation therebetween.

Further, the judgment for the above wheel weight may be performed on the basis of the variation in maximum vertical resonance frequency $f_R$.

Consequently, because determination of the tire type is automatically performed, and because the judgment value used to compare the tire air pressure can be set according to the weight of the wheel used to mount the tire, it is possible to achieve very accurate detection of the tire pressure state.

When a vehicle is operated on a rough road, forces are applied to both the tires and the suspension. Therefore, even if the tire pressure is constant, the vertical or longitudinal resonance frequencies under the unsprung state are decreased due to the influence of non-linear characteristics of bushings and vibration-proof rubber which are used in the suspension.

Additionally, when the vehicular speed is lowered, the signal level (gain) used to determine resonance frequency is reduced. Thus, when braking or slowing down, it may become impossible to accurately detect the resonance point.

Figure 83:
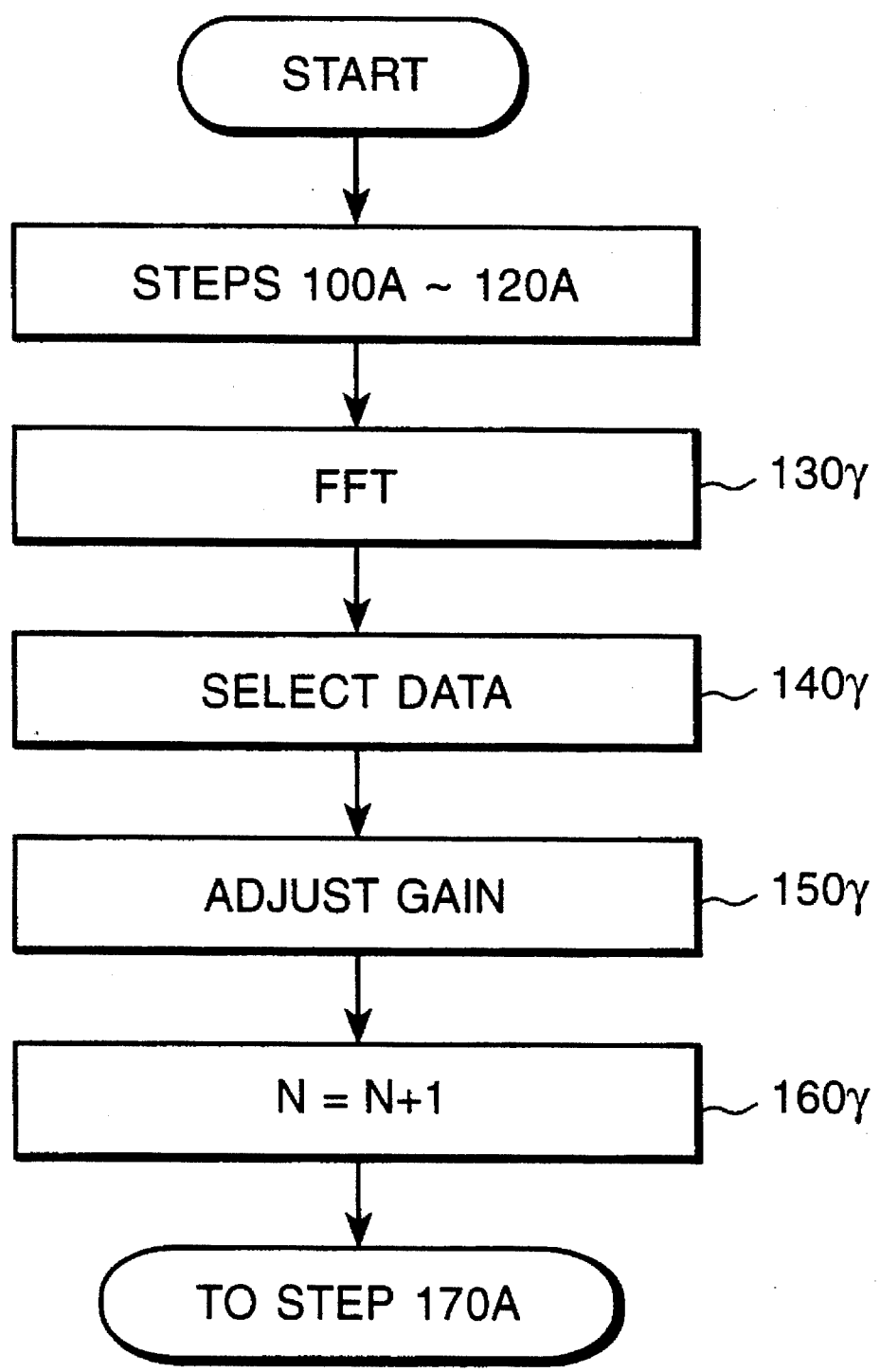
FIG. 83 is a flowchart showing the processes performed in the twenty-ninth embodiment.

The twenty-ninth embodiment is directed at handling the above-described problems through the processes illustrated in FIG. 83.

The processes before step 130τ are similar to steps 100A to 120A of the first embodiment, illustrated in FIG. 10. In subsequent steps 130τ and 140τ, an FFT operation and a data selection process are executed. Specifically, in the data selection processing, a selection lower limit determination value $v_L$ and a selection upper limit determination value $v_H$ are determined based on the waveform of the wheel speed. These values are compared to peak value $v_P$ within predetermined frequency range $f_{1-f2}$.

Figure 84A:
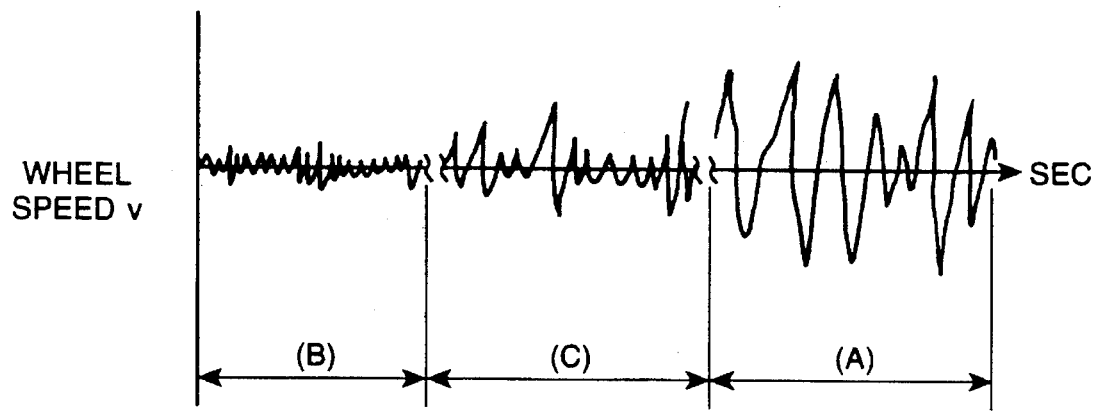
FIGS. 84(a), 84(b) and 84(c) are illustrations of the data selection process in the twenty-ninth embodiment.
Figure 84B:
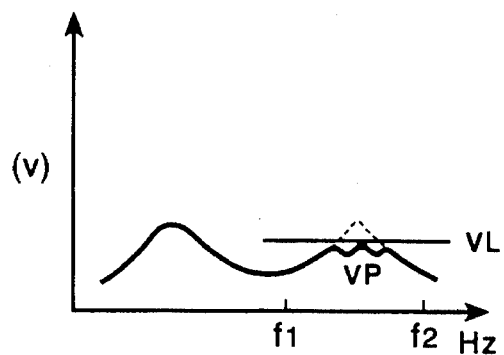
Figure 84C:
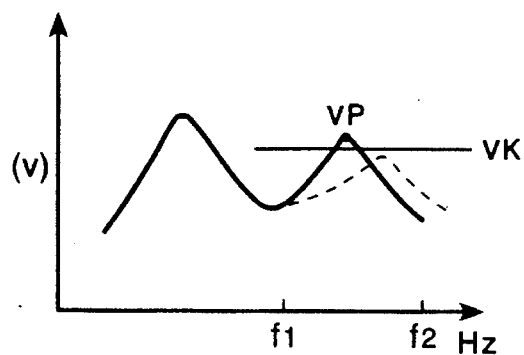

If $v_P$ is less than, or equal to $v_L$ (FIG. 84(b)), or if $v_P$ is less than, or equal to $v_H$ (FIG. 84(c)), then the results of the FFT operation performed on corresponding portions (A) and (B) are not used to determine resonance frequency $f_K$.

In the above step 140τ, data selection is performed based on the upper and lower limit values, $v_H$ and $v_L$. However, even in the data after selection (portion (C) in FIG. 84(a)), the magnitude of the gain resulting from each FFT operation is variable, as shown in FIG. 85. As a result, both the number of averaging processes and the time required to calculate resonance frequency, $f_K$, are increased.

Consequently, in step 150τ, the gain (magnitude) of the wheel speed signal is adjusted by multiplying the result of each FFT operational by a coefficient $K_1, K_2, \ldots K_i$. Therefore, the peak values within the predetermined frequency range ($f_1$ to $f_2$) are set equal to the predetermined value, $v_{PK}$, as shown in the resultant FFT operation waveform.

Finally, in subsequent step 160τ, the FFT operational number N is incremented, and the process is advanced to perform steps similar to those after step 140A of the first embodiment.

Figure 86:
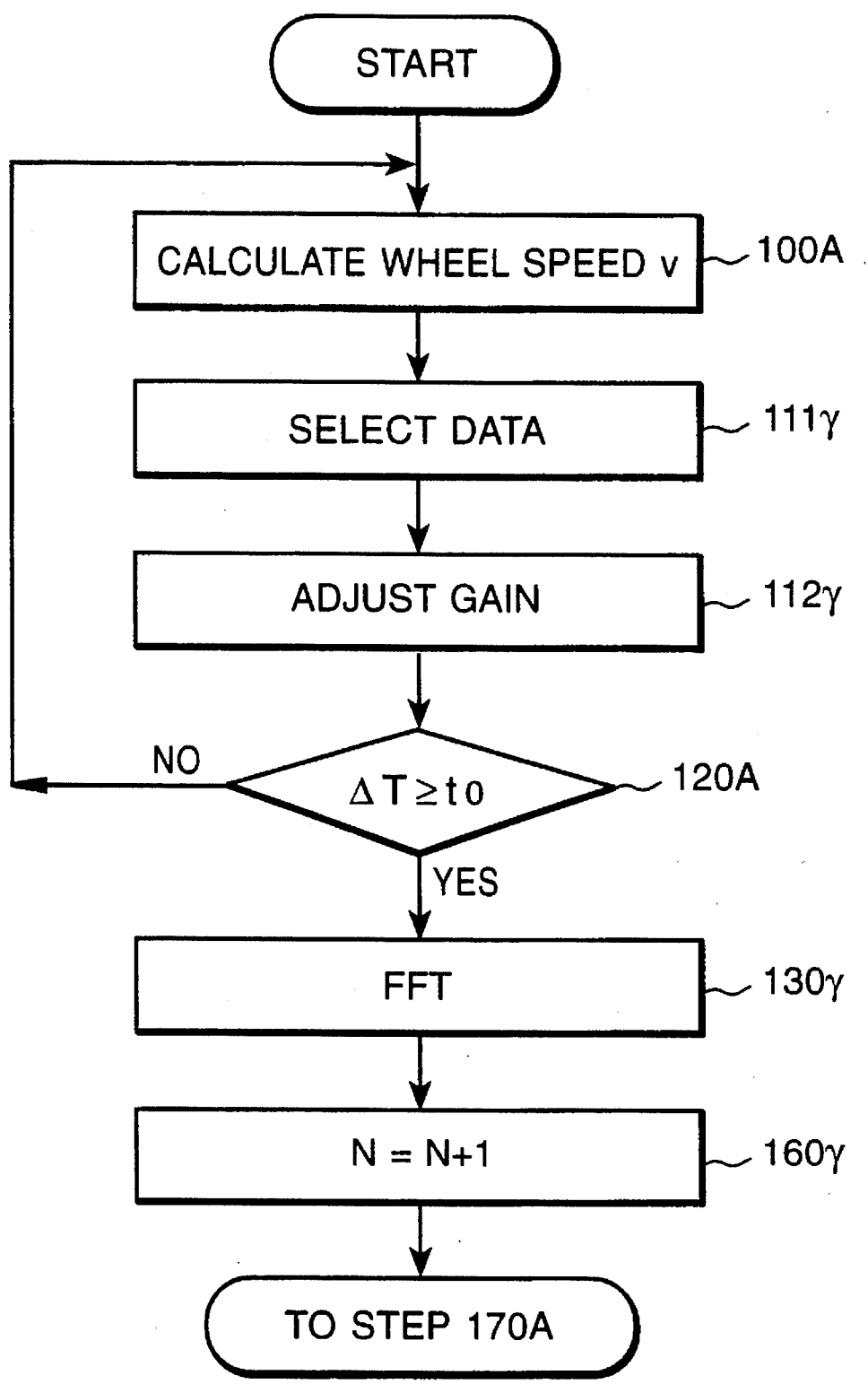
FIG. 86 is a flowchart showing some of the processes performed by and ECU in the thirtieth embodiment.

In the thirtieth embodiment, a different data selection process and gain adjustment process for the time-waveform of the wheel speed v are performed. This process is shown by the flowchart of FIG. 86.

Figure 87:
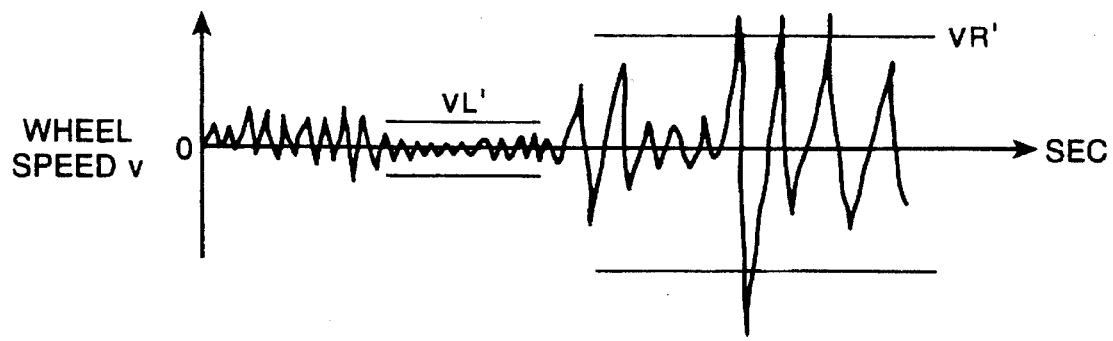
FIG. 87 is an illustration of the data adjustment performed in the thirtieth embodiment.

At step 100A, the wheel speed is calculated. Then, in the data selection process of step 111γ, the selection of lower limit judgment value $|v_L'|$ and the selection of upper limit judgment value $|v_H'|$ are made as shown in FIG. 87. Then, only the time-waveform of wheel speed v having a magnitude within the range of ($-v_H'$ TO $-v_L'$), or ($-v_L'$ TO $-v_H'$) is considered.

Figure 88:
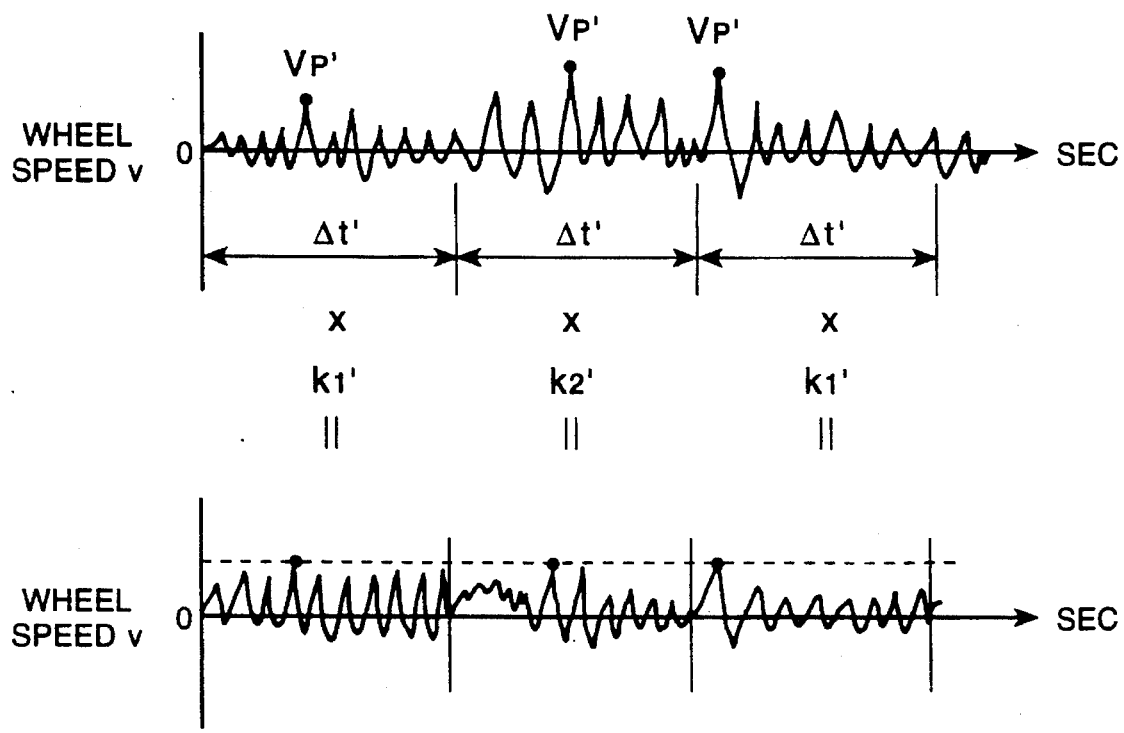
FIG. 88 is an illustration of the gain adjustment process performed in the thirtieth embodiment.

Correspondingly, the gain adjustment in step 112γ, is performed by multiplying wheel speed v within specified time Δt' by coefficient $k_1'$. Then, after the data selection process, the peak value within specified time Δt', which is designated by $v_p'$, is set equal to a predetermined value, as shown in FIG. 88. The processes after step 112γ are then performed, as described with respect to the first embodiment, to detect decreases in the tire pressure as described with respect to the first embodiment.

In the above-described twenty-ninth and thirtieth embodiments, by executing a data selection process, resonance frequency $f_K$ for detecting the tire pressure can be determined without being lowered.

Further, since the gain adjustment process is performed, even when the frequency characteristic is changed, the magnitude of the gain is not variable, as result of each FFT operation. It is therefore impossible to reduce the number of averaging processes required for calculating the average of the FFT operational results. Consequently, in the twenty-ninth and thirtieth embodiments, it is difficult to rapidly detect lowering of the tire pressure.

It should also be noted that in each above-mentioned embodiments, the value of the tire air pressure, as well as the abnormal alarm of the tire air pressure may be displayed directly.

Although the embodiments have been disclosed in detail, the present invention should not be limited to these embodiments. For instance, in FIG. 4, it is possible to detect the tire air pressure on the basis of variation of gain at a specific frequency or variation of the frequency at a specific gain.

As set forth above, according to the present invention, the predetermined frequency component in the tire vibration frequency component varies according to variation of the spring constant of the tire. Therefore, the air pressure condition of the tire is detected based on the variation of the frequency component of a tire. Consequently, the vehicular occupant can monitor the tire air pressure while traveling in the vehicle. In addition, by employing a device which adjusts the tire air pressure during travel, driving performance can be significantly enhanced.

What is claimed is:

1. A tire air pressure detecting device comprising:

output means being installed on a vehicle, for outputting a signal including a vibration frequency component of a tire while said vehicle is moving;

extracting means for extracting a resonance frequency component from said signal including said tire vibration frequency component; and detecting means for detecting a tire air pressure condition based on said resonance frequency component.

2. A tire air pressure detecting device as set forth in claim 1, wherein said outputting means comprises a wheel speed sensor for generating a signal corresponding to a rotation speed of a wheel.

3. A tire air pressure detecting device as set forth in claim 1, wherein said extracting means extracts said resonance frequency component from said signal output by said output means based on vibrations of an unsprung mass of said vehicle which are generated in at least one of a vertical direction and a longitudinal direction.

4. A tire air pressure detecting device as set forth in claim 1, wherein said detecting means preliminarily stores a resonance frequency value as a reference resonance frequency, and detects lowering of said tire air pressure condition based on a variation magnitude of said extracted resonance frequency relative to said stored resonance frequency value.

5. A tire air pressure detecting device as set forth in claim 1, wherein said detecting means preliminarily stores a relationship between said tire air pressure and said resonance frequency component, and predicts said tire air pressure from said extracted resonance frequency based on said stored relationship.

6. A tire air pressure detecting device as set forth in claim 1, further comprising an alarming means for alarming a driver when a decrease in said tire air pressure condition to a level below a lower limit air pressure is detected by the detecting means.

7. A tire air pressure detecting device as set forth in claim 1, further comprising removing means for removing higher order components from said signal containing said tire vibration frequency component, said higher order components including noise components appearing at frequencies which are integer multiples of a frequency corresponding to a number of wheel rotations within a unit period of time.

8. A tire air pressure detecting device as set forth in claim 1, wherein said extraction means includes an extraction period varying means for modifying an extraction period.

9. A tire air pressure detecting device as set forth in claim 1, wherein said detecting means includes correcting means for correcting said reference value used to detect low tire air pressure based on a vehicle traveling speed.

10. A tire air pressure detecting device as set forth in claim 1, which further comprises tire type selection means for selecting a type of tire which is equipped on said vehicle.

11. A tire air pressure detecting device as set forth in claim 1, which further comprises tire type selection means for selecting a type of tire which is equipped on said vehicle, where said tire type selection means is a switch to be operated by a vehicular occupant.

12. A tire air pressure detecting device as set forth in claim 1, which further comprises tire type selection means for selecting a type of tire which is equipped on said vehicle, where said tire type selection means selects said type of tire based on a tire load radius.

13. A tire air pressure detecting device as set forth in claim 1, wherein said detecting means comprises resonance frequency difference deriving means for deriving a difference between resonance frequencies for left and right wheels from said respective resonance frequencies, and judgment means for comparing said derived difference in resonance frequency with a judgment value.

14. A tire air pressure detecting device as set forth in claim 1, wherein said detecting means determines tire air pressure abnormalities based on said resonance frequency component and outputs an abnormality signal when an abnormal tire air pressure is detected for more than a predetermined number of processing cycles.

15. An apparatus for detecting a tire air pressure according to claim 1, further comprising tire type selection means for selecting a type of tire which is equipped on said vehicle, wherein said tire type selecting means determines said tire type based on a ratio between gains of a resonance frequency based on vibrations in a vertical direction and gains of a resonance frequency based on vibrations in a longitudinal direction.

16. An apparatus for detecting a tire air pressure according to claim 1, further comprising tire type selection means for selecting a type of tire which is equipped on said vehicle, wherein said tire type selecting means determines said tire type based on a deviation between a resonance frequency based on vibrations in a vertical direction and a resonance frequency based on vibrations in a longitudinal direction.

17. An apparatus for detecting tire air pressure according to claim 1, further comprising a weight judging means for judging a weight of a wheel which is mounted to said vehicle.

18. An apparatus for detecting a tire air pressure according to claim 1, further comprising a judging means for judging a weight of a wheel which is mounted on said vehicle, wherein said judging means determines said weight of said wheel based on an amount of variation in a resonance frequency based on vibrations in a vertical direction.

19. An apparatus for detecting a tire air pressure according to claim 1, further comprising a signal selecting means for selecting the signal containing the resonance frequency component which is used to determine a resonance frequency of said tire.

20. An apparatus for detecting a tire pressure according to claim 1, further comprising signal selecting means for selecting signal containing the resonance frequency component which is used to determine a resonance frequency of said tire, and a signal adjusting means for adjusting a signal level of said signal containing said resonance frequency component selected by said signal selecting means.

21. A tire air pressure detecting device comprising:
   output means being installed on a vehicle, for outputting a signal including a vibration frequency component of a tire while said vehicle is moving;
   extracting means for extracting a resonance frequency component from said output signal;
   storing means for storing at least a reference value, said reference value being based on a resonance frequency at normal tire air pressure; and
   detecting means for detecting a tire air pressure condition by comparing said extracted resonance frequency component with said stored reference value.

22. A tire air pressure detecting device as set forth in claim 21, wherein said storing means preliminarily stores a resonance frequency value as said reference value, and wherein said detecting means detects lowering of said tire air pressure based on a variation magnitude of said extracted resonance frequency component relative to said resonance frequency value.

23. A tire air pressure detecting device as set forth in claim 21, wherein said storing means preliminarily stores a relationship between tire air pressure and resonance frequency, and said detecting means predicts said tire air pressure from said extracted resonance frequency component based on said stored relationship.

24. A tire air pressure detecting device comprising:
   output means being installed on a vehicle, for outputting a signal including a vibration frequency component of a tire while said vehicle is moving;
   extracting means for extracting a resonance frequency component from said output signal; and
   detecting means for detecting a tire air pressure condition based on said resonance frequency component of said signal, said detection being made independent of resonance frequency components corresponding to other tires on said vehicle.

* * * * *